US007616864B2

(12) United States Patent
Tanaka et al.

(10) Patent No.: US 7,616,864 B2
(45) Date of Patent: Nov. 10, 2009

(54) PLAYBACK APPARATUS FOR PERFORMING APPLICATION-SYNCHRONIZED PLAYBACK

(75) Inventors: Keiichi Tanaka, Hyogo (JP); Hidetaka Ohto, Hyogo (JP); Masahiro Oashi, Kyoto (JP)

(73) Assignee: Panasonic Corporation, Osaka ( * ) Notice: Subject to any disclaimer, the term of this patent is extended or adjusted under 35 U.S.C. 154(b) by 318 days.

(21) Appl. No.: 10/596,109

(22) PCT Filed: Jul. 21, 2005

(86) PCT No.: PCT/JP2005/013785

§ 371 (c)(1),
(2), (4) Date: Aug. 23, 2006

(87) PCT Pub. No.: WO2006/009305

PCT Pub. Date: Jan. 26, 2006

(65) Prior Publication Data

US 2007/0086727 A1    Apr. 19, 2007

(30) Foreign Application Priority Data

| Jul. 22, 2004 | (JP) | ............................. 2004-214916 |
| Sep. 15, 2004 | (JP) | ............................. 2004-268512 |
| Oct. 5, 2004 | (JP) | ............................. 2004-293043 |
| Dec. 21, 2004 | (JP) | ............................. 2004-369701 |
| Mar. 30, 2005 | (JP) | ............................. 2005-099410 |

(51) Int. Cl.
*H04N 7/00* (2006.01)

(52) U.S. Cl. ...................................... 386/95

(58) Field of Classification Search .................. 386/95, 386/125–126, 111–112, 1, 46, 33
See application file for complete search history.

(56) References Cited

U.S. PATENT DOCUMENTS

| 5,644,782 A | 7/1997 | Yeates et al. |
| 6,125,373 A | 9/2000 | Momoh et al. |
| 6,553,180 B1 * | 4/2003 | Kikuchi et al. ................. 386/95 |
| 6,604,236 B1 | 8/2003 | Draper et al. |

(Continued)

FOREIGN PATENT DOCUMENTS

EP    1463314    9/2004

(Continued)

*Primary Examiner*—Thai Tran
*Assistant Examiner*—Tat Chi Chio
(74) *Attorney, Agent, or Firm*—Greenblum & Bernstein, P.L.C.

(57) ABSTRACT

A playback apparatus for playing a digital stream in conjunction with an application includes a package management unit operable to generate package information by merging files recorded on a first recording medium and a second recording medium, in accordance with merge management information, and a selection unit operable to detect a plurality of playable titles from the package information, and select one of the detected titles as a current title. After the application requests the package management unit to update the merge management information, by specifying new merge management information, the package management unit changes a file referenced from the newly specified merge management information to read-only before updating the package information, and at a point at which digital stream playback stops due to a current title change by the selection unit, the package management unit generates new package information by combining files recorded on the first and second recording media, in accordance with the newly specified merge management information.

3 Claims, 46 Drawing Sheets

U.S. PATENT DOCUMENTS

| | | | |
|---|---|---|---|
| 2001/0002846 A1* | 6/2001 | Onishi | 348/231 |
| 2002/0199205 A1 | 12/2002 | Sonawane et al. | |
| 2004/0223726 A1 | 11/2004 | Lee | |
| 2004/0240863 A1* | 12/2004 | Nishizawa | 386/125 |
| 2005/0105888 A1 | 5/2005 | Hamada et al. | |
| 2005/0131858 A1 | 6/2005 | Seo et al. | |

FOREIGN PATENT DOCUMENTS

| | | |
|---|---|---|
| EP | 1513152 | 7/2005 |
| EP | 1551027 | 7/2005 |
| EP | 1553769 | 7/2005 |
| JP | 2001-517836 | 10/2001 |
| WO | 99/15994 | 4/1999 |
| WO | 2004/025651 | 3/2004 |
| WO | 2004/049710 | 6/2004 |
| WO | 2004/030356 | 8/2004 |
| WO | 2005/036383 | 4/2005 |
| WO | 2005/055206 | 6/2005 |

* cited by examiner

FIG.12

INFO ASSOCIATING
Java APPL. WITH STREAM ··· BD-JObject XXXXX.BOBJ

| REF. VALUE OF PL INFO ID |
|---|
| APPL. MGMT TABLE (SHOWS Java APPL. WHOSE LIFE CYCLE IS Title DEFINED BY BD-J Object) |

FIG.17

MERGE MANAGEMENT INFORMATION FILE

| STORAGE LOCATIONS IN LOCAL STORAGE | IDS IN Virtual Package |
|---|---|
| /organization #1/disc #1/00002.mpls | BDMV/PLAYLIST/00002.mpls |
| /organization #1/disc #1/00002.clpi | BDMV/CLIPINF/00002.clpi |
| /organization #1/disc #1/00003.clpi | BDMV/CLIPINF/00003.clpi |
| ... | ... |

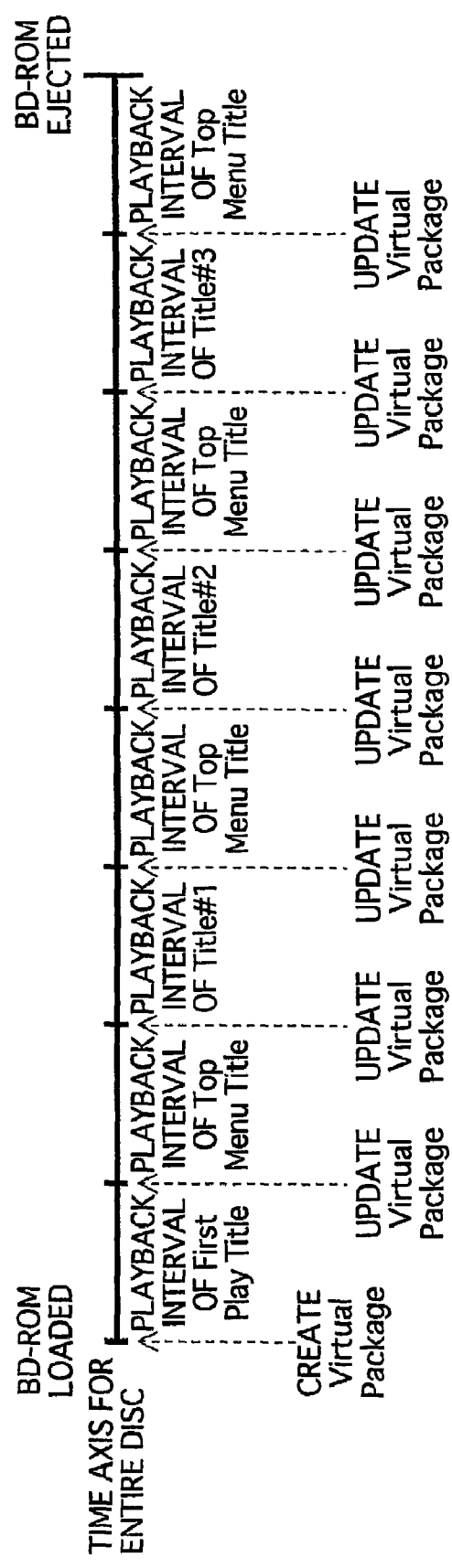

MERGE MANAGEMENT INFORMATION

| Disc ID | MERGE TARGET DIRECTORY | UPDATED ON |
|---|---|---|
| disc #1 | /organization #1/disc #1/content #1 | 2004/01/01 |
| disc #1 | /organization #1/disc #1/content #2 | 2004/02/01 |
| disc #1 | — | 2004/03/01 |
| disc #1 | /organization #1/disc #1/content #3 | 2004/04/01 |

PLAYBACK APPARATUS FOR PERFORMING APPLICATION-SYNCHRONIZED PLAYBACK

TECHNICAL FIELD

The present invention belongs to the technical field of digital streams and application-synchronized playback.

BACKGROUND ART

Application-synchronized playback is technology for playing digital streams while at the same time running Java (registered trademark) applications in a playback apparatus or the like for playing video, and belongs to a technical field that will attract a great deal of attention in consumer device manufacturing from now on. Applications and digital streams for synchronizing are associated with one another in units of playback called "titles". The following describes a conventional playback apparatus. A conventional playback apparatus is constituted from a virtual filesystem unit, a module manager, a playback unit, and a platform unit.

The virtual filesystem unit manages a plurality of recording media accessible by the playback apparatus such as optical recording media (e.g. DVD-ROM, BD-ROM, the latter of which is described later by way of example) and magnetic recording media (e.g. hard disk), and generates package information integrally showing the recorded content of these recording media.

Each piece of package information, called a virtual package, is submitted in the playback/execution of digital streams and application programs (hereinafter simply "applications") recorded on these recording media just as if they were actually recorded in a single package.

The module manager selects one of a plurality of titles as a current title.

The playback unit plays a digital stream (i.e. recorded on an optical or magnetic recording medium) constituting the current title from digital streams shown by the package information.

The platform unit runs an application (i.e. recorded on an optical or magnetic recording medium) constituting the current title from applications shown by the package information.

According to the above structure, digital streams and applications recorded on different recording media such as BD-ROM and hard disk can be treated as a single (virtual) package, and the playback apparatus is able to realize playback controls in units of titles.

Titles in the above structure target not only digital streams recorded on BD-ROM for playback but also digital streams recorded on hard disk. Since hard disk is a rewritable recording medium, the compositional elements of a title may possibly be replaced partway through playback in cases such as when package information is newly generated using a newly acquired digital stream.

Such a replacement is largely thought to bring about situations that are difficult to restore such as video blackout during playback resulting from abnormal operation of the playback unit.

The replacement of the playback object partway through playback can be anticipated if the playback unit in the playback apparatus sequentially checks the sameness of elements such as streams and playback control information targeted for playback. However, given the diverse types of information that require checking, this places a great burden on the playback unit.

To be absolutely sure of the device's stable operation, it is desirable to reboot the device itself when there has been a change in the recorded content on hard disk, as you would when installing software. However, given that rebooting the device takes anywhere from a few seconds to a few minutes processing time, this is not something that the user undertakes lightly.

DISCLOSURE OF THE INVENTION

An object of the present invention is to provide a playback apparatus capable of realizing stable playback even if there is a change in the playback object.

To resolve the above problems, the present invention is a playback apparatus that plays a digital stream in conjunction with an application, and includes a package management unit operable to generate package information by merging files recorded on a first recording medium and a second recording medium, in accordance with merge management information, and a selection unit operable to detect a plurality of playable titles from the package information, and select one of the detected titles as a current title. After the application requests the package management unit to update the merge management information, by specifying new merge management information, the package management unit changes a file referenced from the newly specified merge management information to read-only before updating the package information, and at a point at which digital stream playback stops due to a current title change by the selection unit, the package management unit generates new package information by combining files recorded on the first and second recording media, in accordance with the newly specified merge management information.

The present invention, as a result of having the above structure, guarantees that in the case of an application requesting the package management unit to update the merge management information by specifying new merge management information, the content of a file referenced from the newly specified merge management information is not altered from the time the update request is made until the when the current title is changed, since the package management unit sets the file referenced from the newly specified merge management information to read-only before updating the package information. Also, by updating package information at the point at which digital stream playback is stopped due to a current title change, abnormal operation of the playback apparatus is not brought about even when, for instance, the digital stream or application targeted for playback/execution is replaced as a result of updating.

Thus, the breadth of expression with movie works is expanded since playback controls can be realized by dynamically merging files recorded on both first and second recording media while securing the stable operation of the playback apparatus.

Here, the package management unit may be configured to update package information if information in a permission tag of an application that requested the updating indicates that the application has been assigned the right to update the package information, and to reject the update request and perform exception processing if this information indicates that the right to update has not been assigned.

This structure enables the updating of package information requested by unauthorized applications to be prevented.

BRIEF DESCRIPTION OF THE DRAWINGS

FIG. 12 shows an internal structure of a BD-J object;

FIG. 17 shows an exemplary internal structure of a merge management information file;

FIG. 23A shows a time axis for an entire disc;

FIG. 23B shows the structure of the time axis for the entire disc;

BEST MODE FOR CARRYING OUT THE INVENTION

Embodiment 1

Figure 1:
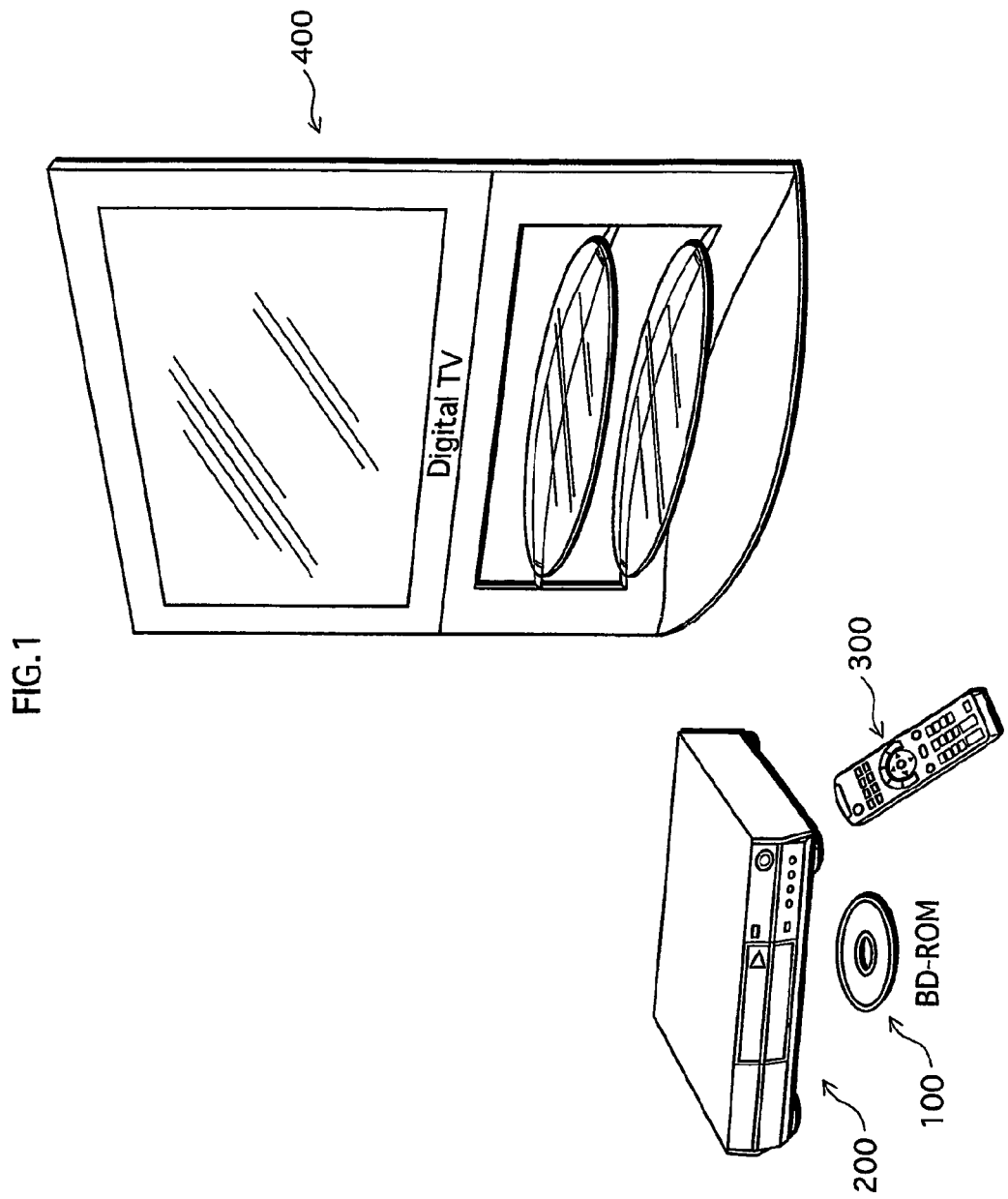
FIG. 1 is a system diagram.

The following describes embodiments of recording media pertaining to the present invention. Firstly, a form of use out of the forms of the implementation of a playback apparatus pertaining to the present invention is described. FIG. 1 shows an exemplary form of use of a playback apparatus pertaining to the present invention. In FIG. 1, a playback apparatus pertaining to the present invention is a playback apparatus 200. Playback apparatus 200 is submitted for use in supplying movie works in a home theater system composed of a playback apparatus 200, a remote control 300, and a television 400, for example.

Figure 2:
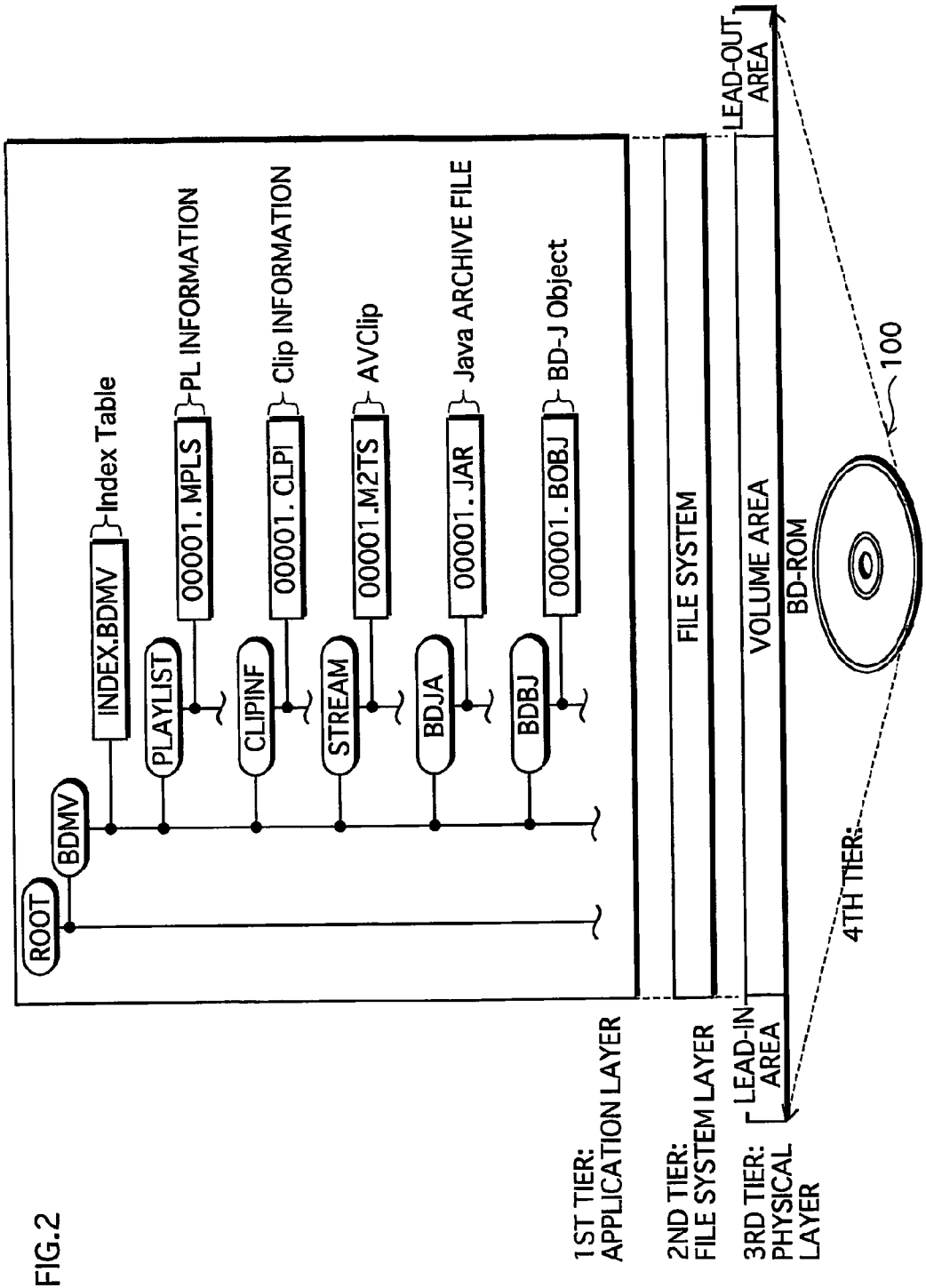
FIG. 2 shows an internal structure of a BD-ROM 100.

An exemplary form of use of a playback apparatus pertaining to the present invention is as described above. Described next is a recording medium targeted for playback by a playback apparatus pertaining to the present invention. In the given example, the recording medium played by a playback apparatus pertaining to the present invention is a BD-ROM 100 (optical recording medium). FIG. 2 shows an internal structure of BD-ROM 100.

BD-ROM 100 is shown at the 4th tier in FIG. 2, while a track on the BD-ROM is shown at the 3rd tier. The track depicted in FIG. 2 results from a track spiraling from the inner circumference to the outer circumference of the BD-ROM having been drawn out to the sides. This track consists of a lead-in area, a volume area, and a lead-out area. The volume area in FIG. 2 has a layered structure made up of a physical layer, a filesystem layer, and an application layer. Expressing the application format of the BD-ROM using a directory structure gives the 1st tier in FIG. 2. A BDMV directory is placed under a ROOT directory at the 1st tier in the BD-ROM.

An INDEX.BDMV file is disposed in the BDMV directory, and under the BDMV directory exist five subdirectories known as a PLAYLIST directory, a CLIPINF directory, a STREAM directory, a BDJA directory-, and a BDBJ directory.

The STREAM directory stores a file forming the main digital stream, the extension "m2ts" being assigned to this file (00001.m2ts)

In the PLAYLIST directory exists a file (00001.mpls) with the extension "mpls".

In the CLIPINF directory exists a file (00001.clpi) with the extension "clpi".

In the BDJA directory exists a file (00001.jar) with the extension "jar".

In the BDBJ directory exists a file (00001.bdbj) with the extension "bdbj".

These files are described next.

AVClips

Figure 3:
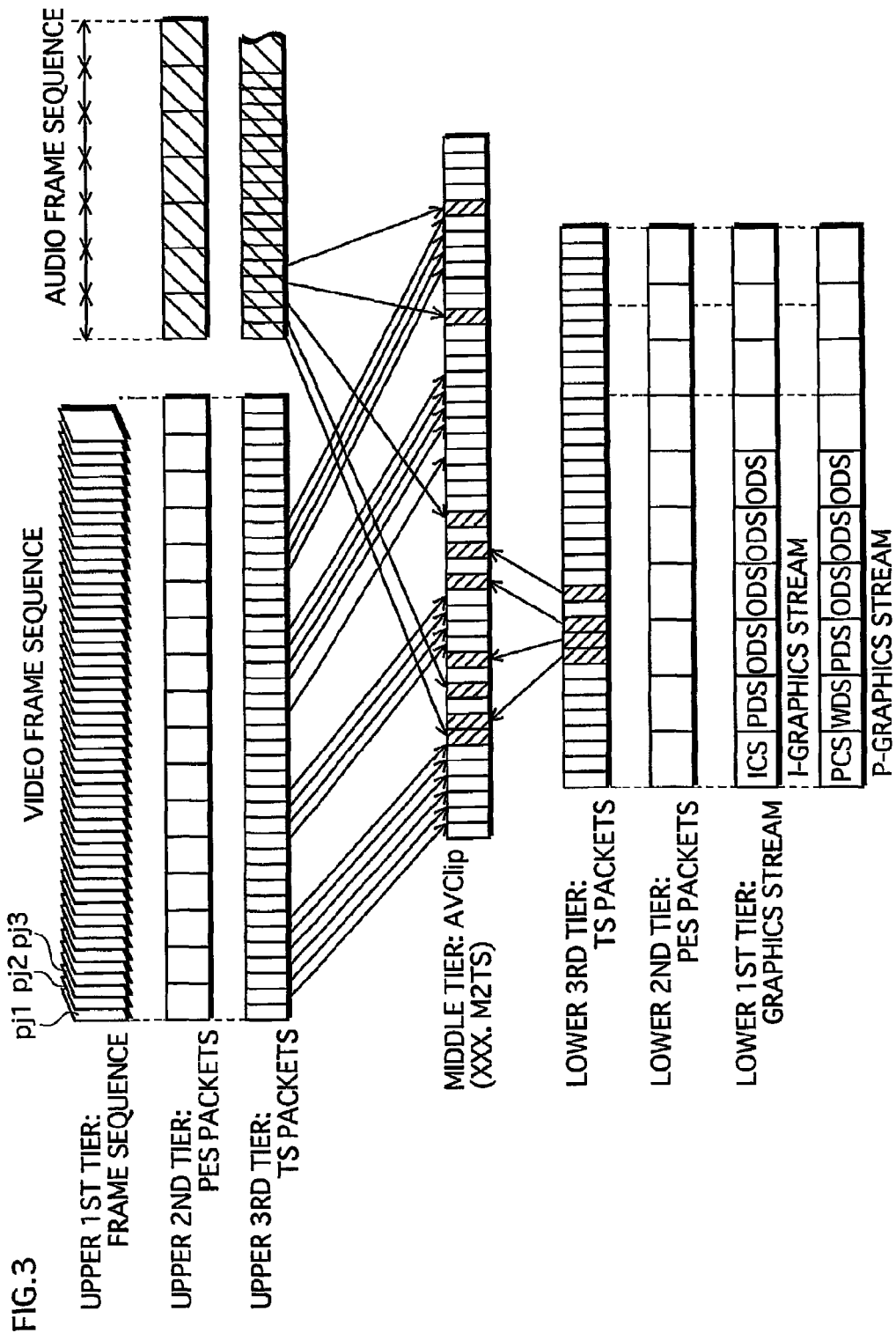
FIG. 3 systematically shows how a file with the extension "m2ts" is structured.

The file with the extension "m2ts" (00001.m2ts) is described firstly. FIG. 3 systematically shows how a file with the extension "m2ts" is structured. This file stores an AVClip. The AVClip (middle tier) is constituted by multiplexing TS packets resulting from the conversion of a video stream composed of a plurality of video frames (pictures pj1, pj2, pj3) and an audio stream composed of a plurality of audio frames (upper $1^{st}$ tier) firstly to PES packets (upper $2^{nd}$ tier) and then to TS packets (upper $3^{rd}$ tier) and the conversion of a subtitle presentation graphics (P-graphics or PG) stream (lower $1^{st}$ tier) and a dialogue interactive graphics (I-graphics or IG) stream (lower $1^{st}$ tier) to TS packets (lower $3^{rd}$ tier) in the same manner.

Apart from the AVClip obtained through multiplexing as shown in FIG. 3/there also exist AVClips that do not result from multiplexing. These are called SubClips, and include AVClips constituting an audio stream, a graphics stream, or a text subtitle stream (TextST stream) etc.

Clip Information

The file with the extension "clpi" (00001.clpi) is a piece of clip information corresponding to an AVClip. Clip information, being management information, contains an EP_map showing the head location of a GOP and information such as the encoding format, frame rate, bit rate and resolution etc. of streams in the AVClip.

PL Information

Figure 4:
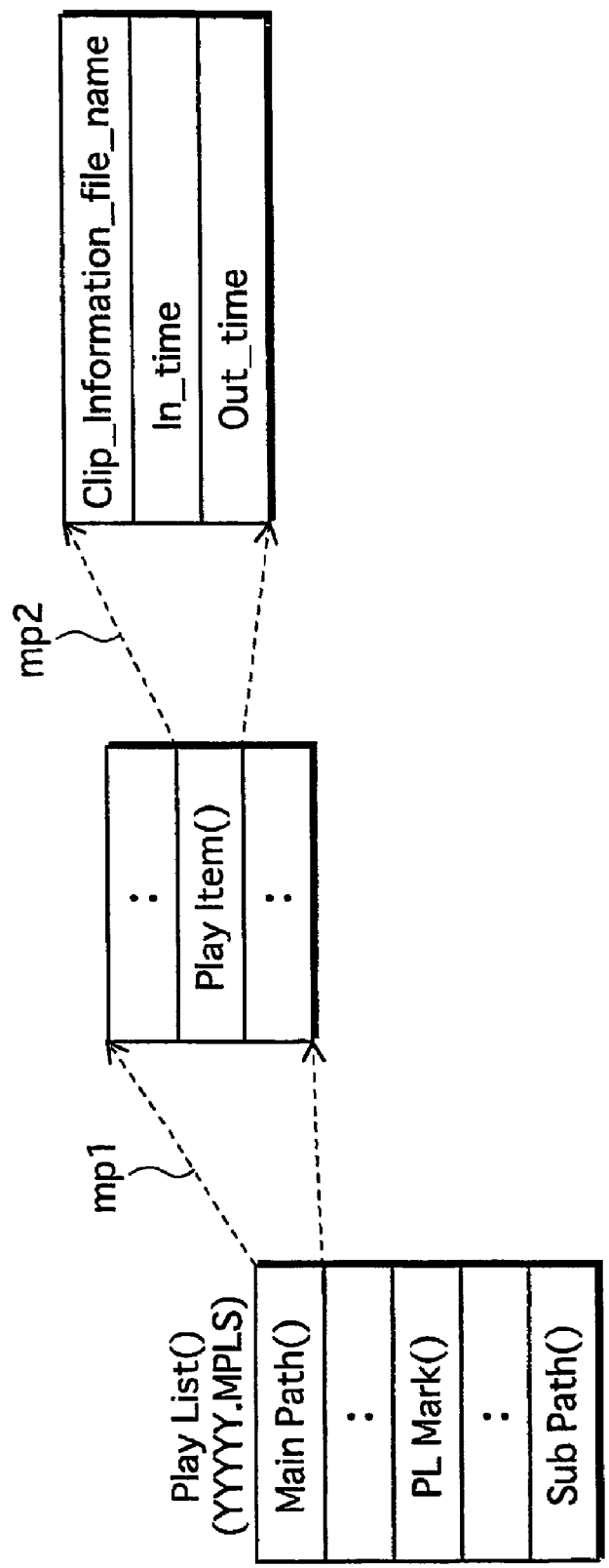
FIG. 4 shows the structure of PL information.

The file with the extension "mpls" (00001.mpls) stores PlayList (PL) information. PL information defines a playlist by referring to AVClips. FIG. 4 shows the structure of PL information, which, as shown on the left side of the diagram, is constituted from MainPath information, PLMark information, and SubPath information.

Figure 5:
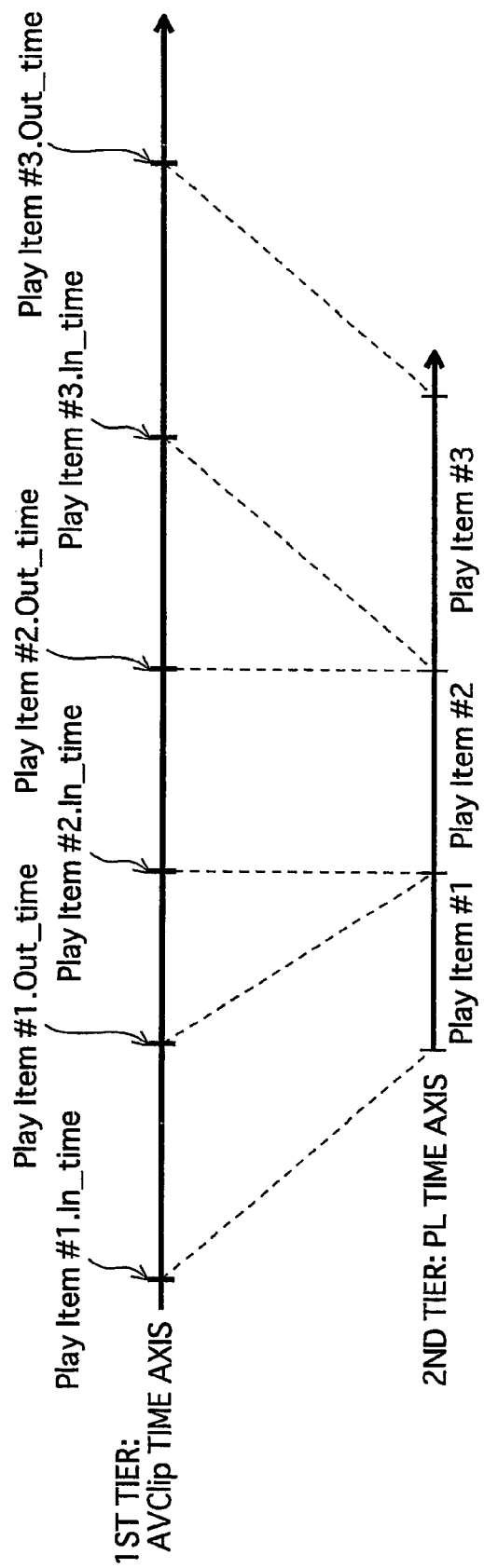
FIG. 5 shows the relation between an AVClip and a PL.

MainPath information "MainPath( )" is composed of PlayItem information "PlayItem( )", as indicated by the arrows mp1. A playitem is a playback interval defined by specifying an In_time and an Out_time on one or more AVClip time axes. A playlist composed of a plurality of playback intervals is defined by the placement of plural pieces of PlayItem information. The arrows mp2 in FIG. 4 shows a close up of the internal structure of PlayItem information. As shown in FIG. 4, PlayItem information is composed of an In_time, an Out_time, and a Clip_Information_file_name showing a corresponding AVClip. FIG. 5 shows the relation between an AVClip and a PL. The $1^{st}$ tier shows the time axis of the AVClip, while the $2^{nd}$ tier shows the time axis of the PL. The PL information includes three pieces of PlayItem information (PlayItems#1-#3), with three playback intervals being defined by the In_times and Out_times of PlayItems#1, #2 and #3. A different time axis to the AVClip is defined when these playback intervals are arranged in line. This is the PL time axis shown at the $2^{nd}$ tier. Defining a different time axis to the AVClip is thus enabled by the definitions in the PlayItem information.

Figure 6:
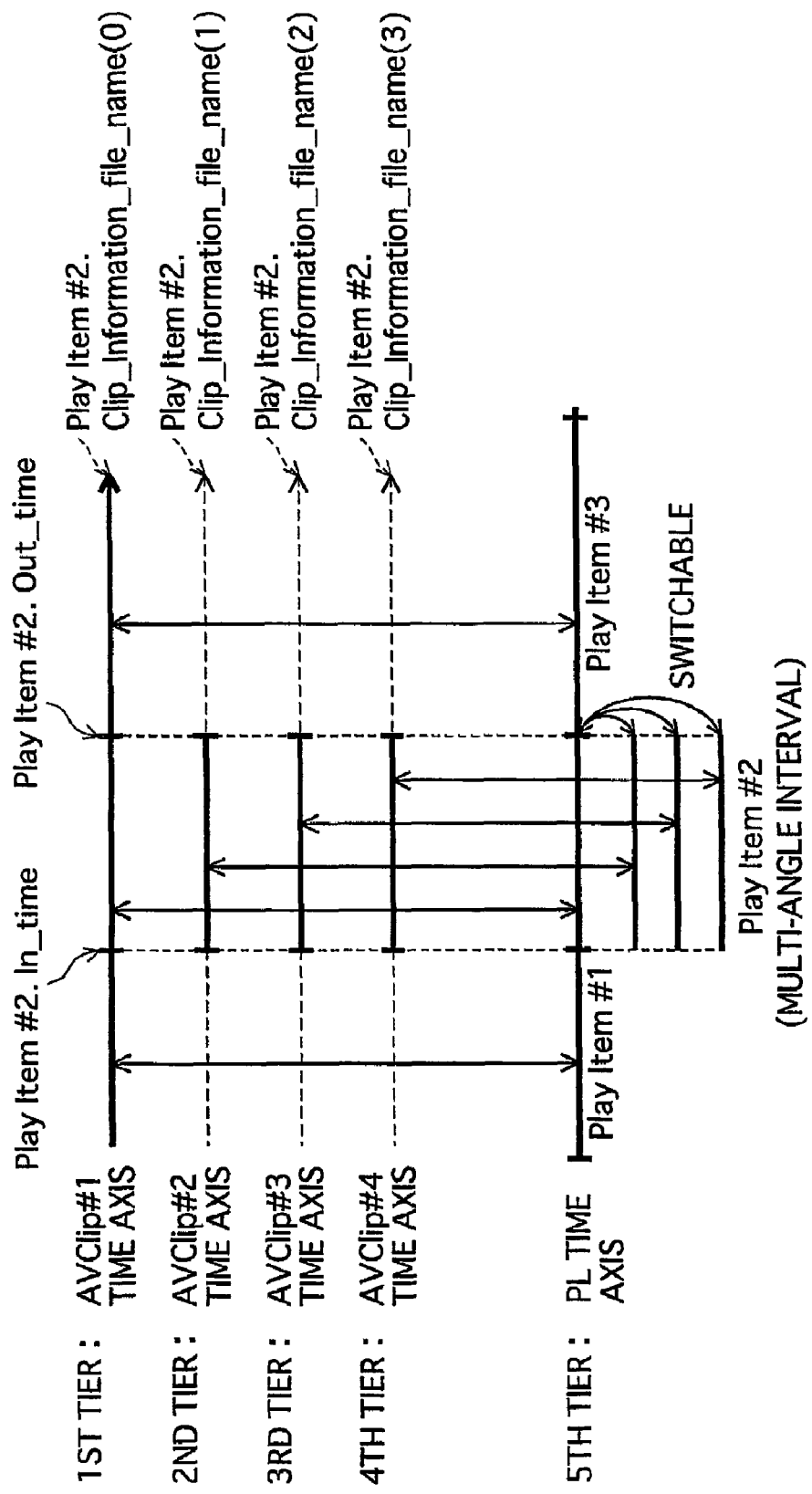
FIG. 6 shows batch specification using four Clip_Information_file_names.

As a rule, one AVClip is specified at any one time, though batch specification of a plurality of AVClips is also possible. Batch specification of AVClips is performed using Clip_Information_file_names in PlayItem information. FIG. 6 shows the batch specification of AVClips using four Clip_Information_file_names. The $1^{st}$ to $4^{th}$ tiers in the diagram show four AVClip time axes (time axes of AVClips#1-#4), while the $5^{th}$ tiers show the PL time axis. Four time axes are specified with these four Clip_Information_file_names included in PlayItem information. This allows, four alternatively playable playback intervals to be defined by In_times and Out_times. As a result, an interval composed of plural piece of switchable angle video (so-called multi-angle interval) is defined on the PL time axis.

Figure 7:
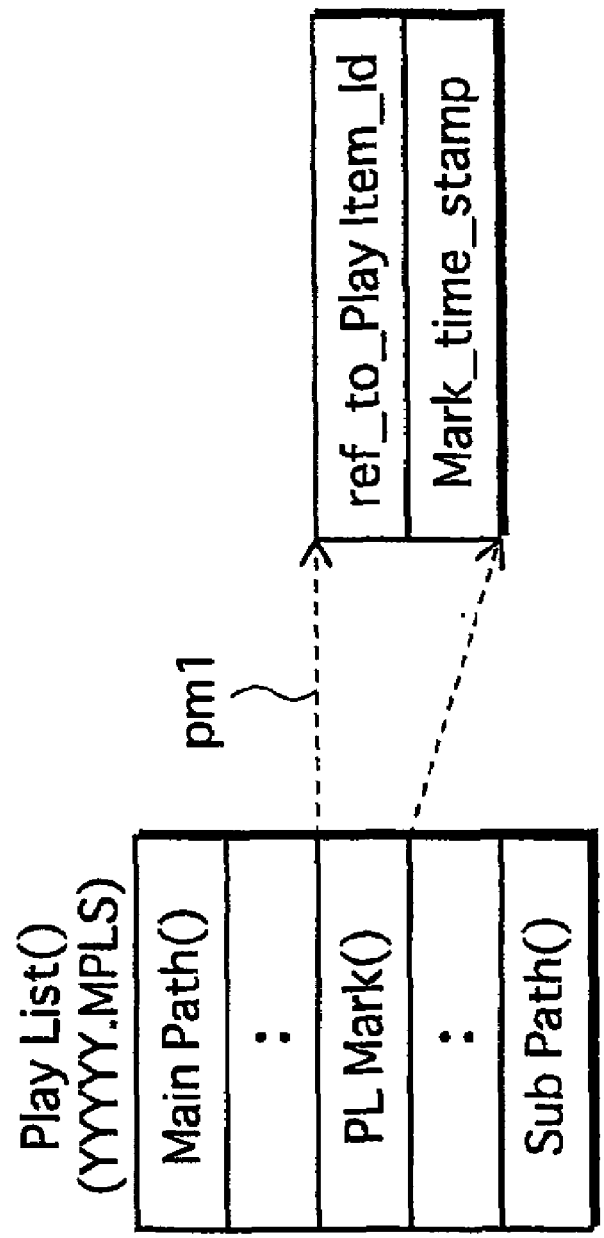
FIG. 7 shows an internal structure of PLMark information.
Figure 8:
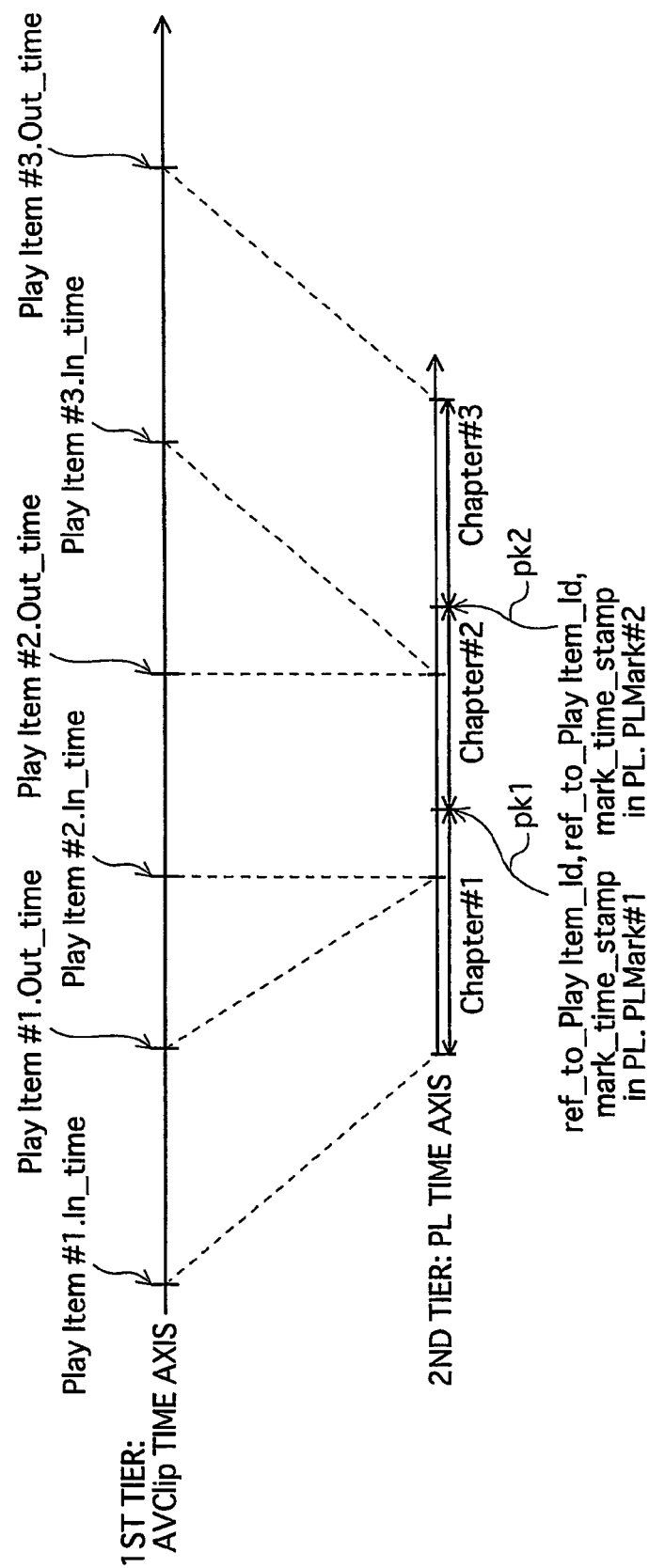
FIG. 8 shows chapter definitions using PLMarks.

PLMark information "PLMark( )" specifies an arbitrary interval on a PL time axis as a chapter. FIG. 7 shows the internal structure of PLMark information, which includes a ref_to_PlayItem_Id and a Mark_time_stamp, as indicated by the arrows pm1. FIG. 8 shows the definition of chapters using PLMarks. The $1^{st}$ tier in FIG. 8 shows the AVClip time axis, while the $2^{nd}$ tier shows the PL time axis. The arrows pk1 and pk2 in FIG. 8 show the specification of a playitem (ref_to_PlayItem_Id) and a point in time (Mark_time_stamp) in PLMarks. Three chapters (Chapters#1-#3) are defined on the PL time axis as a result of these specifications. This completes description of PLMarks.

SubPath information is described next.

Figure 9:
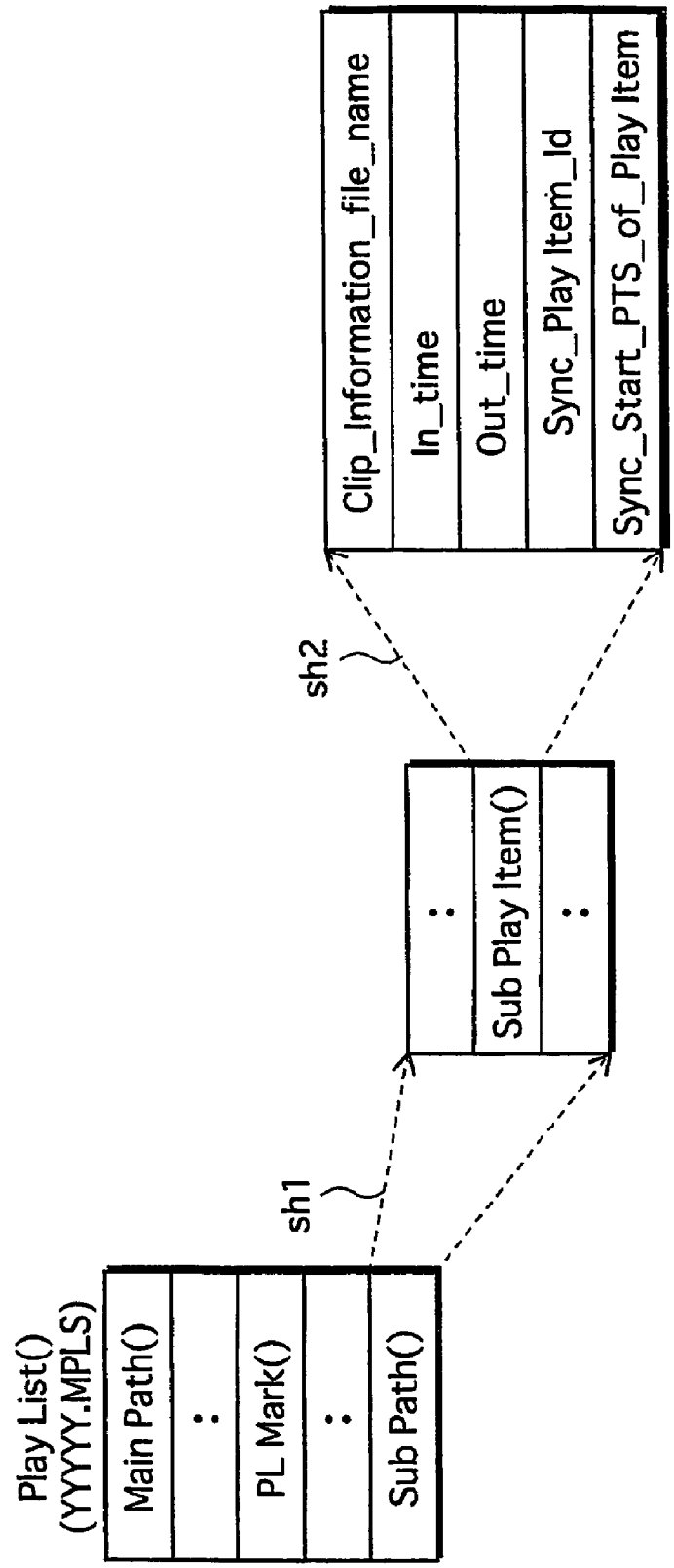
FIG. 9 shows an internal structure of SubPath information.

SubPath information "SubPath( )" defines one or more playback intervals by specifying an In_time and an Out_time on a SubClip time axis, and has the internal structure shown in FIG. 9. SubPath information is composed of SubPlayItem information "SubPlayItem( )" as indicated by the arrows sh1. In the close up marked by the arrows sh2, SubPlayItem information is composed of a Clip_Information_file_name, an In_time, an Out_time, a Sync_PlayItem_Id, and a Sync_Start_PTS_of_PlayItem. In_times and Out_times on the SubClip time axis are specified using Clip_information_file_name/In_time, and Out_time included in SubPlayItem information. Sync_PlayItem_Id and Sync_Start_PTS_of_PlayItem are for synchronizing playback intervals on the SubClip time axis with the PL time axis. This allows processing on both the SubClip time axis and the PL time axis to proceed in sync with one another.

Figure 10:
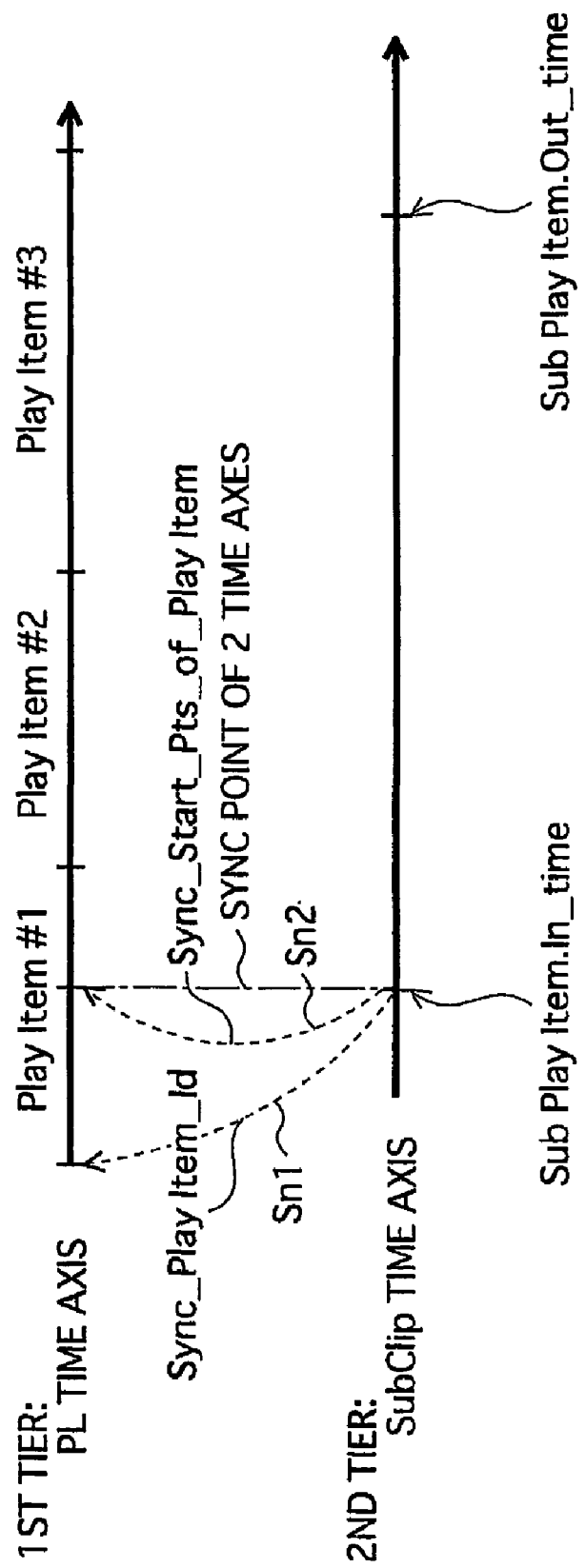
FIG. 10 shows sync specification and playback interval definitions on a SubClip time axis.

FIG. 10 shows sync specification and the definition of playback intervals on the SubClip time axis. The $1^{st}$ tier in FIG. 10 shows the PL time axis, while the $2^{nd}$ tier shows the SubClip time axis. The SubPlayItem. In_time and SubPlayItem. Out_time in FIG. 10 show respectively the start and end of a playback interval. Thus it is apparent that a playback interval is also defined on the SubClip time axis. Sync_PlayItem_Id marked by the arrow Sn1 shows the sync specification of a playitem, while Sync_Start_PTS_of_PlayItem marked by the arrow Sn2 specified a point during the playitem on the PL time axis.

A feature of PL information in BD-ROM is that it makes possible the definition of multi-angle intervals that enable AVClips to be switched and sync intervals that enable AVClips and SubClips to be synchronized. Clip information and PL information are classified as "static scenarios".

The following describes "dynamic scenarios". Here, "dynamic" refers to the fact that the content of playback controls changes due to user key events and status changes in playback apparatus 200 etc. With BD-ROM, playback controls can be described using the same description as Java applications. That is, with BD-ROM, Java applications act as dynamic scenarios.

Java Applications

The following describes Java applications. A Java application is composed of a one or more xlet programs loaded in a heap area (also called working memory) of a virtual machine. An application is constituted from the xlet programs loaded in working memory as well as data. The Java application structure is as described above.

Figure 11A:
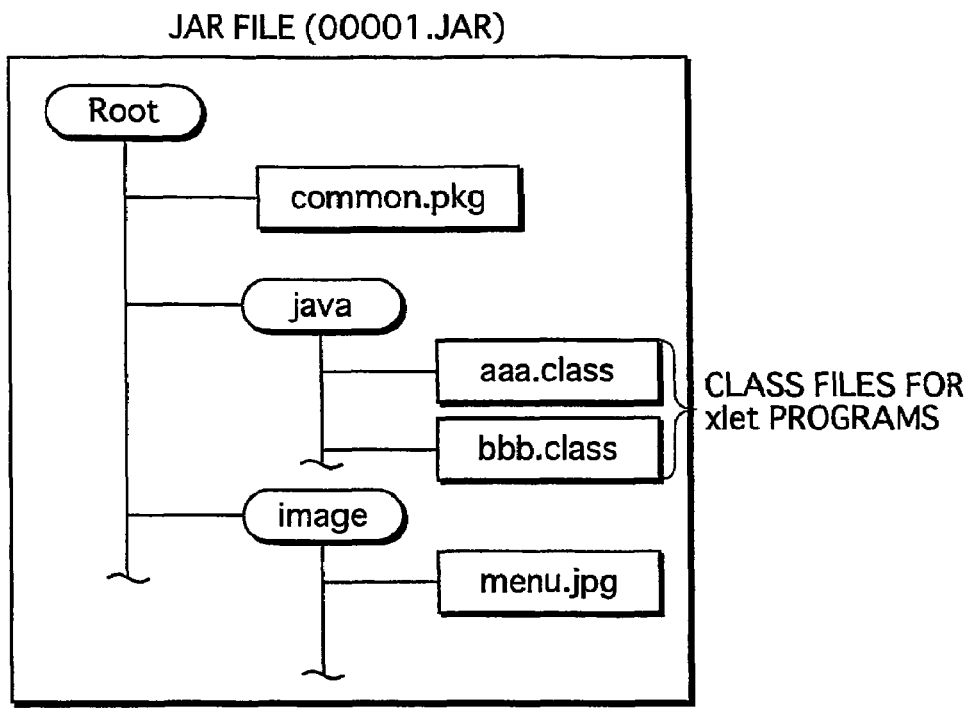
FIG. 11A shows program data housed in an archive file.
Figure 11B:
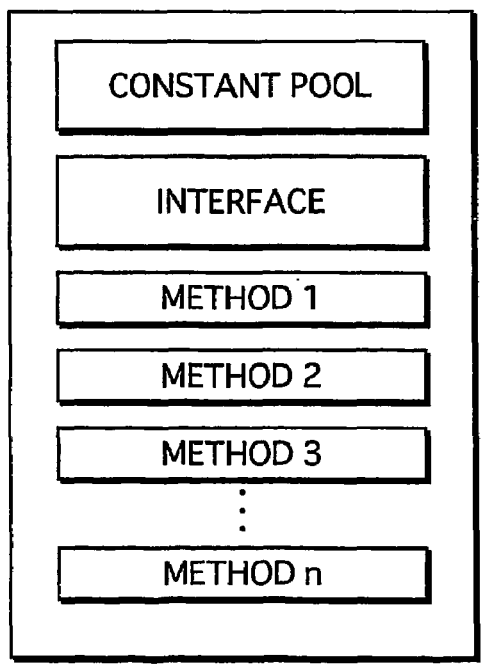
FIG. 11B shows an internal structure of a class file.

An actual Java application is the Java archive file (00001.jar) stored in the BDJA directory under the BDMV directory in FIG. 2. Java archive files are described below with reference to FIG. 11.

Java Archive Files

The Java archive file (00001.jar in FIG. 2) is a collection of one or more class files and data files etc. Fig. UA shows programs and data collected in the archive file. The data in Fig. HA is a plurality of files collected by a Java archiver and arranged into the directory structure shown within the frame. This directory structure consists of a Root directory, a Java directory, and an image directory, with a common.pkg file, class files (aaa.class, bbb.class), and a menu, jpg file being placed within respective directories. The Java archive file is the result of the Java archiver having collected these files together. The class files and data are expanded when read from BD-ROM to a cache, and treated in the cache as a plurality of files existing in directories. The five-digit numerical value "00001" in the filename of the Java archive file shows the identifier (ID) of the Java archive file, and the BD-J object uses this value to refer to the Java archive file. By referring to this numerical value in the filename when a Java archive file has been read to the cache, it is possible to extract data as well as programs constituting arbitrary Java applications.

The class files (aaa.class, bbb.class) in Fig. HA correspond to the above xlet programs. Playback procedures in an operating mode (BD-J) supported by the Java platform are defined using xlet programs (i.e. instances) of these class files. An xlet program is a Java program capable of using a Java media framework (JMF) interface, and performs processing based on key events in accordance with JMF etc.

Furthermore, xlet programs can also execute procedures for accessing websites and downloading contents. This enables playback of original works created by mixing downloaded contents with playlists.

The class file of an xlet program is described next. Fig. HB shows the internal structure of a class file. As shown in Fig. HB, this class file, similar to a normal class file, is composed of a constant pool, an interface, and methods 1, 2, 3 . . . n. The methods in a class file include those (EventListeners) that are triggered by preregistered key events and those for calling Application Programming Interface (API) functions in playback apparatus 200. Computation procedures and the like in these methods are described by employing local variables allocated to a given method and arguments occurring when the method is called. A Java archive file is as described above.

The file with the extension "bdbj" is described next. This file (00001.bdbj) stores a BD-J object. A BD-J object is information defining a title by associating AVClips defined in PL information with applications. FIG. 12 shows the internal structure of a BD-J object. The BD-J object shows an application management table and a PL information reference value. The application management table shows Java applications whose lifecycle is the title defined by the BD-J object through enumerating the ID of individual Java applications (application IDs) and the IDs of the Java archive files belonging to particular applications. In other words, each application is constituted from one or more Java archive files.

The PL information reference value shows PL information to be played when the title is started.

The file with the extension "bdbj" is as described above.

The INDEX.BDMV file is described next.

INDEX.BDMV is management information relating to the entire BD-ROM. This file contains information such as organization IDs identifying the providers of movie works and disc IDs allocated to individual BD-ROMs provided by the providers. A disc is uniquely recognized in the playback apparatus by firstly reading INDEX.BDMV after the disc has been loaded. INDEX.BDMV may additionally include a table that maps a plurality of playable titles in BD-ROM to BD-J objects defining individual titles. The following describes the types of titles recordable to BD-ROM, which include a FirstPlayTitle, a Top_menuTitle, and Titles#1-#3.

FirstPlayTitle is charged with playing a dynamic trademark, of a BD-ROM when the BD-ROM is loaded before doing anything else. FirstPlayTitle thus realizes the practice of playing a dynamic trademark symbolizing the creator and/or distributor of a movie work when a BD-ROM is loaded.

Top_menuTitle is composed of AVClips and applications for playing the menu positioned at the very top of the menu hierarchy in a BD-ROM.

Titles#1, #2 and #3 correspond to general movie works.

In other words, INDEX.BDMV shows the correspondence of FirstPlayTitle, Top_menuTitle and Titles#1-#3 with individual BD-J objects.

Figure 13:
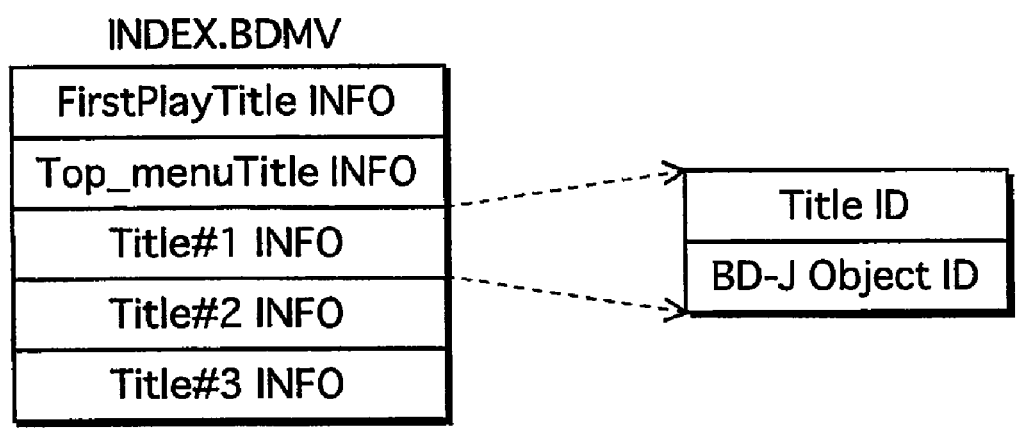
FIG. 13 shows an internal structure of INDEX.BDMV.

FIG. 13 shows the internal structure of INDEX.BDMV. This files shows the correspondence of FirstPlayTitle information, Top_menuTitle information, Title#1 information, Title#2 information, and Title#3 information with title IDs and BD-J objects defining these titles. BD-J objects defining the titles can be identified using the title information, while PL information and applications for synchronizing can be derived from these BD-J objects. This completes description of BD-ROM.

BD-ROM is not the only recording media targeted by a playback apparatus pertaining to the present invention.

A hard disk (local storage) integral to the playback apparatus is also targeted during playback. The following describes data recorded in local storage.

Figure 14:
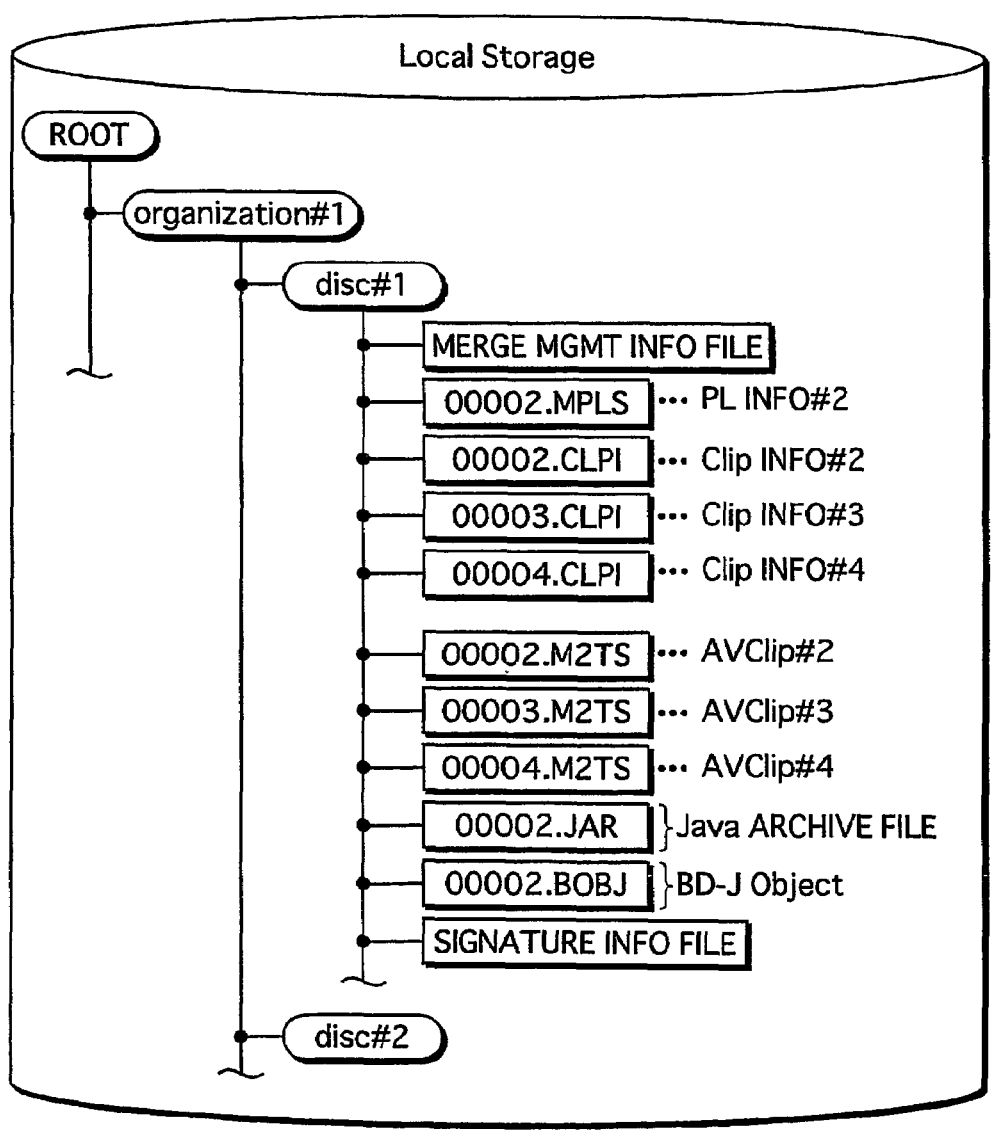
FIG. 14 shows a directory structure in local storage.

FIG. 14 shows a directory structure in local storage. In this directory structure, a subdirectory "organizationa#1" is located under a ROOT directory, and under this are the subdirectories "disc#1" and "disc#2". The "organization#1" directory is allocated to a specific provider of movie works. The disc#1 and disc#2 directories are allocated to different BD-ROMs provided by each provider. The organization ID and disc ID shown in the INDEX.BDMV file in respective BD-ROMs are employed in these directory names.

Providing directories that correspond to BD-ROMs in directories corresponding to specific providers allows downloaded data relating to individual BD-ROMs to be stored separately. Under these subdirectories are stored PL information, clip information, and AVClips, similar to what is stored on BD-ROM. There also additionally exist a Java archive file, a BD-J object, a merge management information file, and a signature information file.

In comparison to PL information on a BD-ROM, which refers only to AVClips on the BD-ROM, PL information in local storage includes information that refers to both AVClips on BD-ROM and in local storage; that is, PL information newly added as a virtual package, a specific example of which is PL INPO#2 in FIG. 14.

Here, PL information in local storage is constituted from four pieces of PlayItem information (PlayItem information#1-#4). This PL information can, in the case of the head piece (PlayItem informational) referring to clip information on BD-ROM and the remaining three pieces (PlayItem information#2-#4, referring to clip information in local storage, define a single stream sequence from the AVClips on BD-ROM and in local storage, as shown in FIG. 15.

Figure 15:
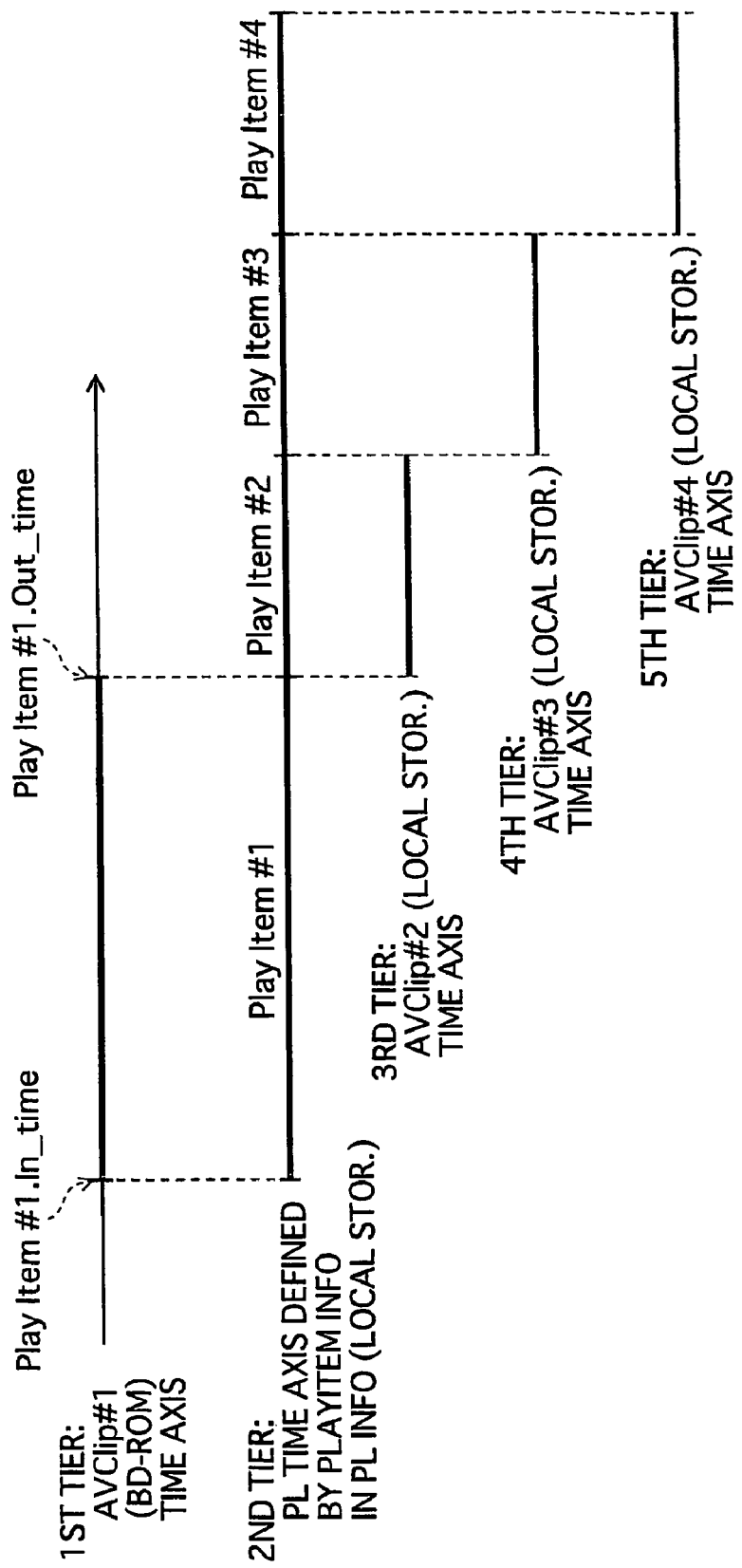
FIG. 15 shows the kinds of playlist playback time axes defined by PL information stored in local storage.

FIG. 15 shows the kinds of playlist playback time axes defined by PL information stored in local storage. The $1^{st}$ tier shows the playback time axis of an AVClip#1 stored on BD-ROM/while the $2^{nd}$ tier shows the playback time axis of a playlist defined in PL information stored in local storage. The $3^{rd}$, $4^{th}$ and $5^{th}$ tiers show respectively the playback time axes of AVClips#2, #3 and #4 stored in local storage.

In the case of PlayItem information#2, #3 and #4 specifying AVClips#2, #3 and #4 as playback intervals, the PL information in local storage is able to define both AVClips on BD-ROM and in local storage as a single stream sequence.

Figures 16A, 16B:
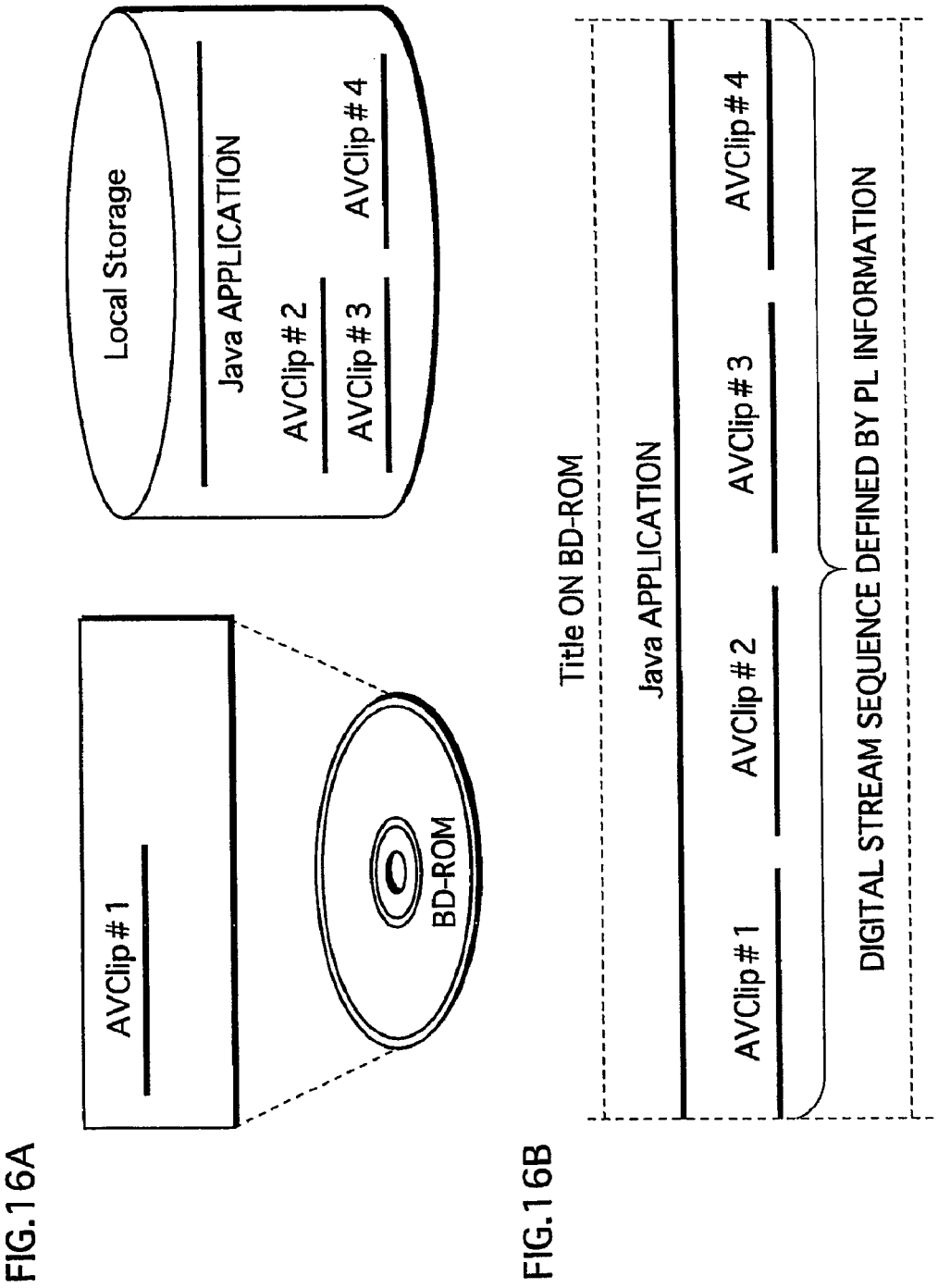
FIG. 16A shows an AVClip stored on BD-ROM and a Java application and AVClips stored in local storage.
FIG. 16B shows the Java application and AVClips#1-#4 being treated as a single title.

As illustrated above, AVClips on BD-ROM and in local storage can be defined as a single stream sequence, and by merging this stream sequence with applications on BD-ROM or in local storage, a single title can be constituted from AVClips and from applications recorded on BD-ROM or in local storage. In the case of AVClip#1 being recorded on BD-ROM, and AVClips#2 to #4 and a Java application being recorded in local storage as shown in FIG. 16A, these AVClips and the Java application can, as shown in FIG. 16B, be treated as a single title.

Merge management information is described next. Merge management information uniquely shows all of files in the discs #1 and #2 directories in local storage that constitute a virtual package, and is stored in a prescribed file (hereinafter "merge management information file"). FIG. 17 shows an exemplary internal structure of a merge management information file. A merge management information file is composed of storage location information for each file in local storage constituting a virtual package. Storage location information is composed of identifiers for accessing respective files as a virtual package and file paths indicating the storage locations of respective files in local storage.

Signature information files are described next. A signature information file shows the electronic signature of a provider on a merge management information file. The electronic signature generally employed is obtained by computing a hash value for information that requires tamper-proofing and encrypting the hash value using some sort of secret key.

This completes description of local storage.

Figure 18:
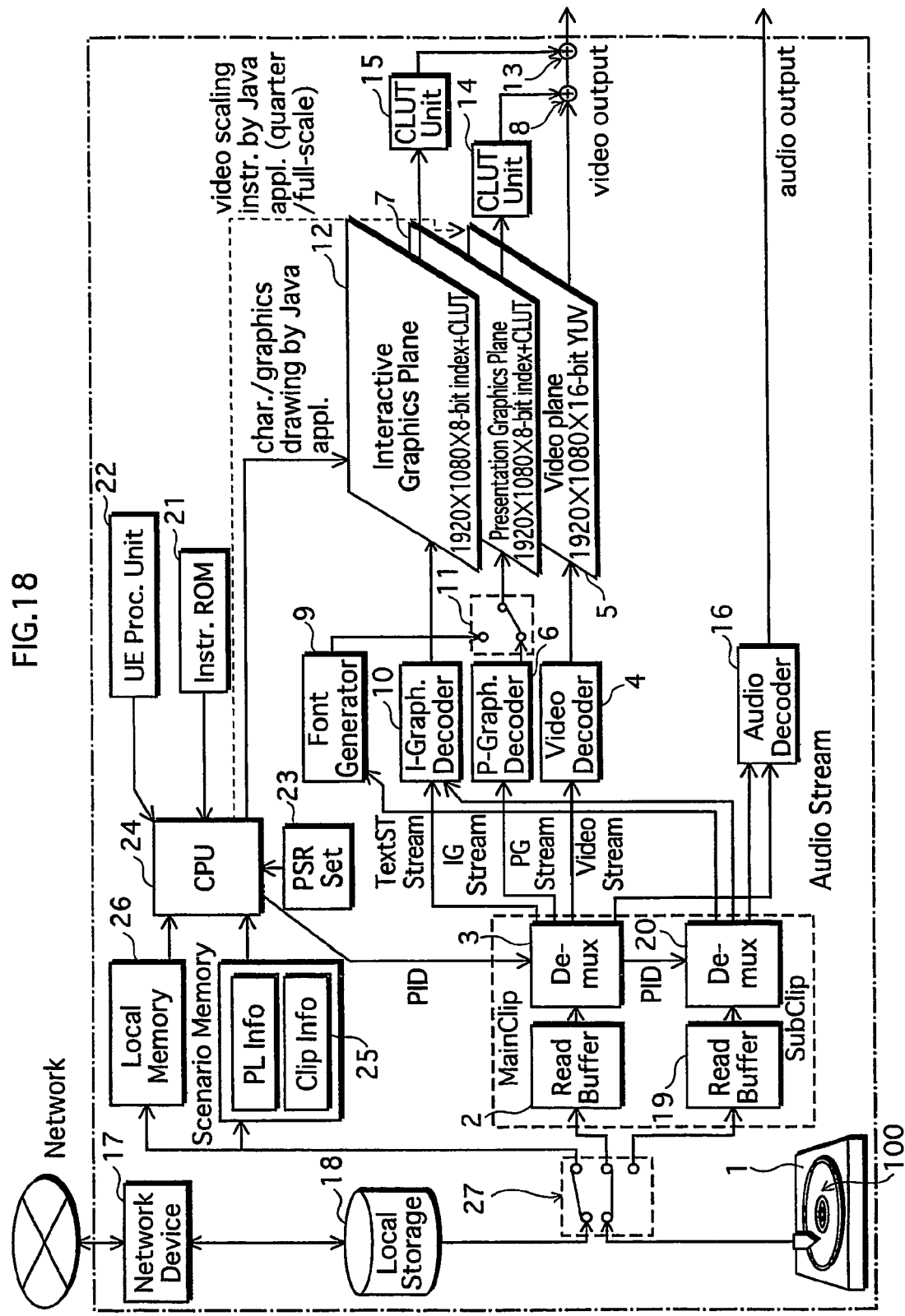
FIG. 18 shows the hardware configuration of a playback apparatus.

The following describes an embodiment of a playback apparatus pertaining to the present invention. FIG. 18 shows a hardware configuration of the playback apparatus. The playback apparatus is constituted from a BD-ROM drive 1, a read buffer 2, a demultiplexer (demux) 3, a video decoder 4, a video plane 5, a presentation graphics (P-graphics) decoder 6, presentation graphics (P-graphics) plane 7, a composition unit 8, a font generator 9, an interactive graphics (I-graphics) decoder 10, a switch 11, an interactive graphics (I-graphics) plane 12, a composition unit 13, a color lookup table (CLUT) unit 14, a color lookup table (CLUT) unit 15, an audio decoder 16, a network device 17, a local storage 18, a read buffer 19, a demultiplexer (demux) 20, an instruction ROM 21, a user event (UE) processing unit 22, a player status register (PSR) set 23, a central processing unit (CPU) 24, a scenario memory 25, a local memory 26, and a switch 27.

The elements (BD-ROM drive 1-audio decoder 16) pertaining to playback of AVClips recorded on BD-ROM 100 are described firstly.

BD-ROM drive 1 loads/ejects BD-ROMs, and accesses BD-ROM 100.

Read buffer 2 is a first-in first-out (FIFO) memory in which transport stream (TS) packets read from BD-ROM 100 or local storage 18 are stored on a first-in first-out basis.

Demux 3 reads TS packets from read buffer 2 and converts these TS packets to packetized elementary stream (PES) packets. PES packets having packet identifiers (PIDs) set by CPU 24 are then output to one of video decoder 4, P-graphics decoder 6, I-graphics decoder 10, and audio decoder 16.

Video decoder 4 decodes PES packets output from demux 3 to obtain pictures in uncompressed format, and writes these pictures to video plane 5.

Video plane 5 is for storing uncompressed pictures. A plane is a memory area in a playback apparatus for storing one screen worth of pixel data. Video plane 5 has a 1920×1080 resolution, with stored picture data being constituted from pixel data expressed by 16-bit YUV. In video plane 5, playback video in a video stream can be scaled per frame. Scaling involves changing playback video per frame to either ¼ (quarter) or ⅟₁ (full-scale) of the entire video plane 5. Scaling is executed in BD-J mode in accordance with instructions from CPU 24, enabling screen production whereby the playback images of video streams are relegated to a corner of the screen or projected over the whole screen.

P-graphics decoder 6 decodes P-graphics streams read from BD-ROM and writes the uncompressed graphics to P-graphics plane 7. Subtitles appear on screen as the result of a graphics stream being decoded.

P-graphics plane 7, being a memory with room for one screen worth of data, is able to store one screen worth of uncompressed graphics. This plane has a 1920×1080 resolution, with pixels of the uncompressed graphics in P-graphics plane 7 being expressed by 8-bit index color. Uncompressed graphics stored in P-graphics plane 7 are submitted for display by converting the index colors using a CLUT.

Composition unit 8 composites uncompressed picture data stored in video plane 5 with the stored content of P-graphics plane 7.

Font generator 9 uses a character font to expand text code included in TextST streams in a bitmap, and writes the expanded code to P-graphics plane 7.

I-graphics decoder 10 decodes I-graphics streams read from BD-ROM or local storage 18 in DVD-like mode, and writes the uncompressed graphics to I-graphics plane 12.

Switch 11 selectively writes one of a font sequence generated by font generator. 9 and graphics resulting from the decoding by P-graphics decoder 6 to P-graphics plane 7.

I-graphics plane 12 is written with uncompressed graphics resulting from the decoding by I-graphics decoder 10. Characters and graphics drawn by an application are written into I-graphics plane 12 in BD-J mode using αRGB full color.

Composition unit 13 composites the storage content of I-graphics plane 12 with composite images output from composition unit 8 (i.e. composition of uncompressed picture data and storage content of P-graphics plane 7). This compositing enables characters and graphics written to I-graphics decoder 10 by an application to be overlaid on uncompressed picture data and displayed.

CLUT unit 14 converts index colors in uncompressed graphics stored in video plane 5 to Y/Cr/Cb.

CLUT unit 15 converts index colors in uncompressed graphics stored in I-graphics plane 15 to Y/Cr/Cb when operating in DVD-like mode (i.e. mode for playing digital streams like conventional DVD). When operating in BD-J mode (i.e. mode for playing digital streams in sync with Java application)/CLUT unit 15 converts αRGB full color to Y/Cr/Cb.

Note that a Java application may be bound or unbound to a title, as well as being bound or unbound to a disc.

Audio decoder 16 decoded PES packets output from demux 3 and outputs uncompressed audio data.

The elements pertaining to AVClip playback are as described above. The following describes elements pertaining to operations in BD-J mode (network device 17-demux 20).

Network device 17 realizes communication functions in the playback apparatus. In the case of an application specifying an URL in BD-J mode, network device 17 establishes a transmission control protocol (TCP) or file transfer protocol (FTP) connection etc. with the website indicated by the URL. Java applications are made to download from the website as the result of a connection being established.

Local storage 18 is a hard disk for storing contents downloaded from a website via a connection established by network device 17, and contents supplied from communication and recording media other than BD-ROM, together with metadata. Metadata is information for binding and managing downloaded contents in local storage 18. By accessing local storage 18, applications in BD-J mode can perform a variety of processing using downloaded contents. Local storage 18 also holds merge management information files.

Read buffer 19 is a FIFO memory that stores TS packets constituting SubClips on a first-in first-out basis in the case of SubClips being included in downloaded contents stored on BD-ROM 100 or in local storage 18.

Demux 20 reads TS packets from read buffer 19 and converts the read TS packets to PES packets. PES packets having specific PIDs are then output to P-graphics decoder 6, font generator 9, and audio decoder 16.

The above elements 17 to 20 enable contents downloaded by a Java application via a network to be played in a similar manner to contents recorded on BD-ROM. The following describes elements (instruction ROM 21-switch 27) for realizing collective controls in the playback apparatus.

Instruction ROM 21 stores software that defines controls relating to the playback apparatus.

UE processing unit 22, in response to key operations of a remote controller or the front panel of the playback apparatus, outputs user events for performing these operations to CPU 24.

PSR set 23 is a set of resisters internal to the playback apparatus composed of 64 player status registers (PSRs) and 4096 general purpose registers (GPRs). PSRs 4-8 are used to express the current playback point.

PSR 4 indicates the title of the current playback point as a result of having been set to a value from 1-100. Setting PSR 4 to "0" indicates that the current playback point is the top menu.

PSR 5 indicates the chapter number of the current playback point as a result of having been set to a value from 1-999. Setting PSR 5 to "0xFFFF" indicates a null chapter number in the playback apparatus.

PSR 6 indicates the number of the PL (current PL) to which the current playback point belongs as a result of having been set to a value from 0-999.

PSR 7 indicates the number of the playitem (current playitem) to which the current playback point belongs as a result of having been set to a value from 0-255.

PSR 8 indicates the current playback point (current presentation time or "PTM") using 45-KHz time accuracy, as a result of having been set to a value from 0-0xFFFFFFFF. PSRS 4-8 enable the current playback point to be identified on a time axis for the entire BD-ROM shown in FIG. 23A.

CPU 24 runs software stored in instruction ROM 21 to execute controls relating to the entire playback apparatus. These controls change dynamically depending on user events output from UE processing unit 22 and the PSR values in PSR set 23.

Scenario memory 25 is for storing current PL information and current clip information. Current PL information is the piece of PL information recorded on BD-ROM that is currently targeted for processing. Current clip information is the piece of clip information recorded on BD-ROM that is currently targeted for processing.

Local memory 26 is a cache memory for temporarily storing the recorded content of BD-ROM, given the slow reading speed from BD-ROM. The provision of local memory 26 allows applications in BD-J mode to run efficiently.

Switch 27 selectively delivers data read from BD-ROM and local storage 18 to one of read buffer 2, read buffer 19, scenario memory 25 and local memory 26.

The hardware configuration of a playback apparatus pertaining to the present embodiment is as described above. The following describes the software structure in a playback apparatus pertaining to the present embodiment.

Figure 19:
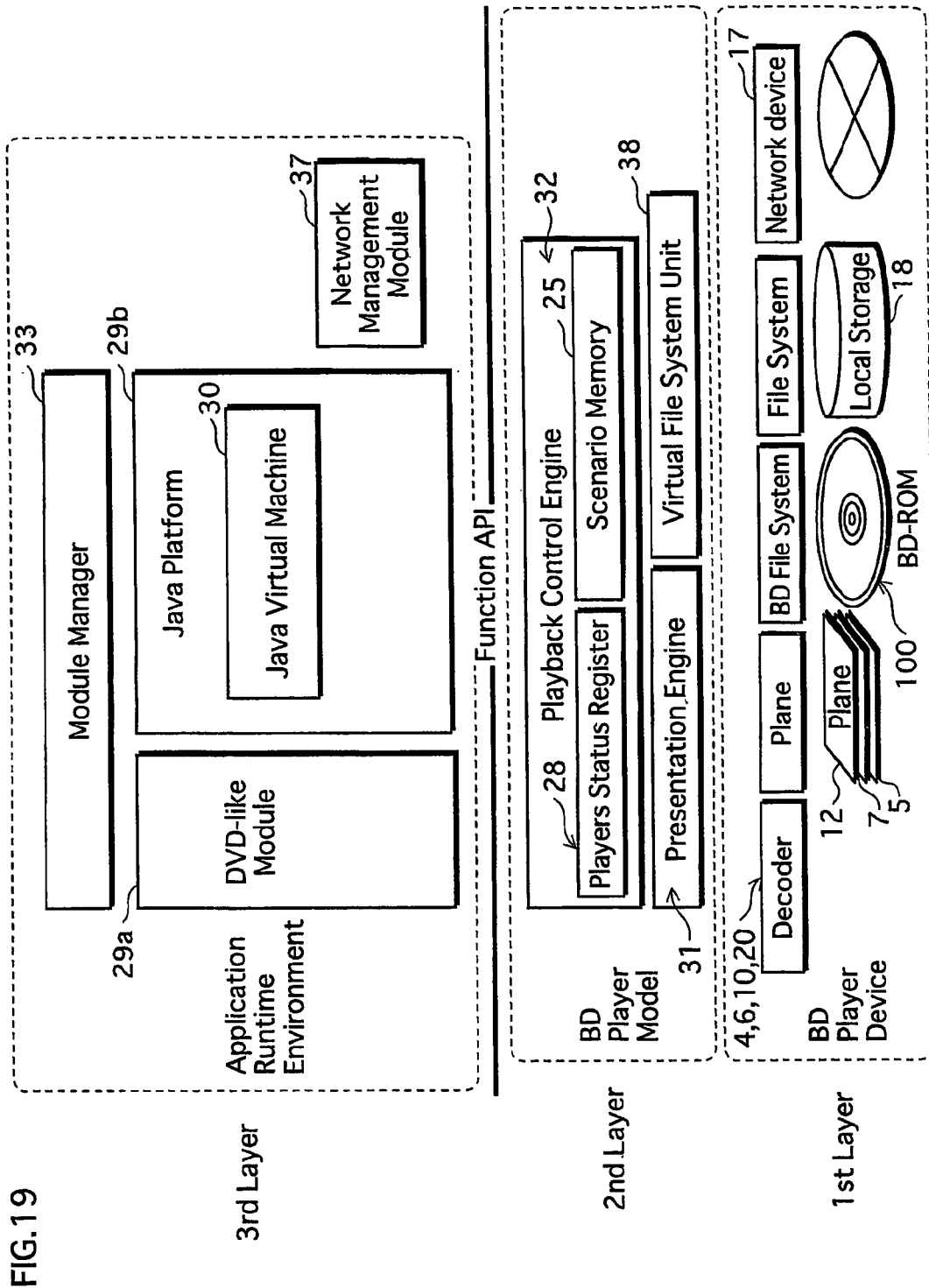
FIG. 19 depicts elements composed of hardware and software stored on instruction ROM 21 rearranged in a layer structure.

FIG. 19 depicts elements composed of hardware and software stored on instruction ROM 21 rearranged in a layer structure. As shown in FIG. 19, the layer structure of the playback apparatus is composed of a 1st layer (BD player), a 2nd layer (BD player model), and a 3rd layer (application runtime environment).

The hardware configuration of the playback apparatus shown in FIG. 18 belongs to the 1st layer. Of this hardware configuration, the "BD player" at the 1st layer in FIG. 19 includes a "decoder" composed of video decoder 4, P-graphics decoder 6, I-graphics decoder 10 and audio decoder 16, a "plane" composed of video plane, P-graphics plane 7 and I-graphics plane 12, BD-ROM 100 and relating filesystem, local storage 18 and relating filesystem, and network device 17.

The "BD player model" at the 2nd layer is composed of a lower layer for a presentation engine 31 and a virtual filesystem unit 38 and an upper layer for a playback control engine 32, with API functions being provided in relation to higher levels.

PSR set 23 and scenario memory 25 shown in FIG. 18 exist inside playback control engine 32.

The "application runtime environment" at the 3rd layer is composed of a layer that includes a module manager 33 stacked on a layer that includes a DVD-like module 29*a* and a Java platform 29*b*.

The following describes the elements in this software structure.

DVD-like Module 29*a*, Java Platform 29*b*

DVD-like module 29*a* decodes navigation commands and executes function calls in, relation to playback control engine 32 based on the decoding result.

Java platform 29*b* is a so-called Java platform having a hierarchical structure composed of a Java virtual machine 30 and middleware for the Java virtual machine to operate (not depicted):

Java Virtual Machine 30

Java virtual machine 30 loads xlet programs constituting applications into a work memory, decodes the xlet programs, and performs controls on lower layers in accordance with the decoding results. To perform these controls, Java virtual machine 30 issues a method to the middleware, has the middleware replace the method with a function call corresponding to a BD playback apparatus, and issues the function call to playback control engine 32.

Internal Structure of Java Virtual Machine 30

Figure 20:
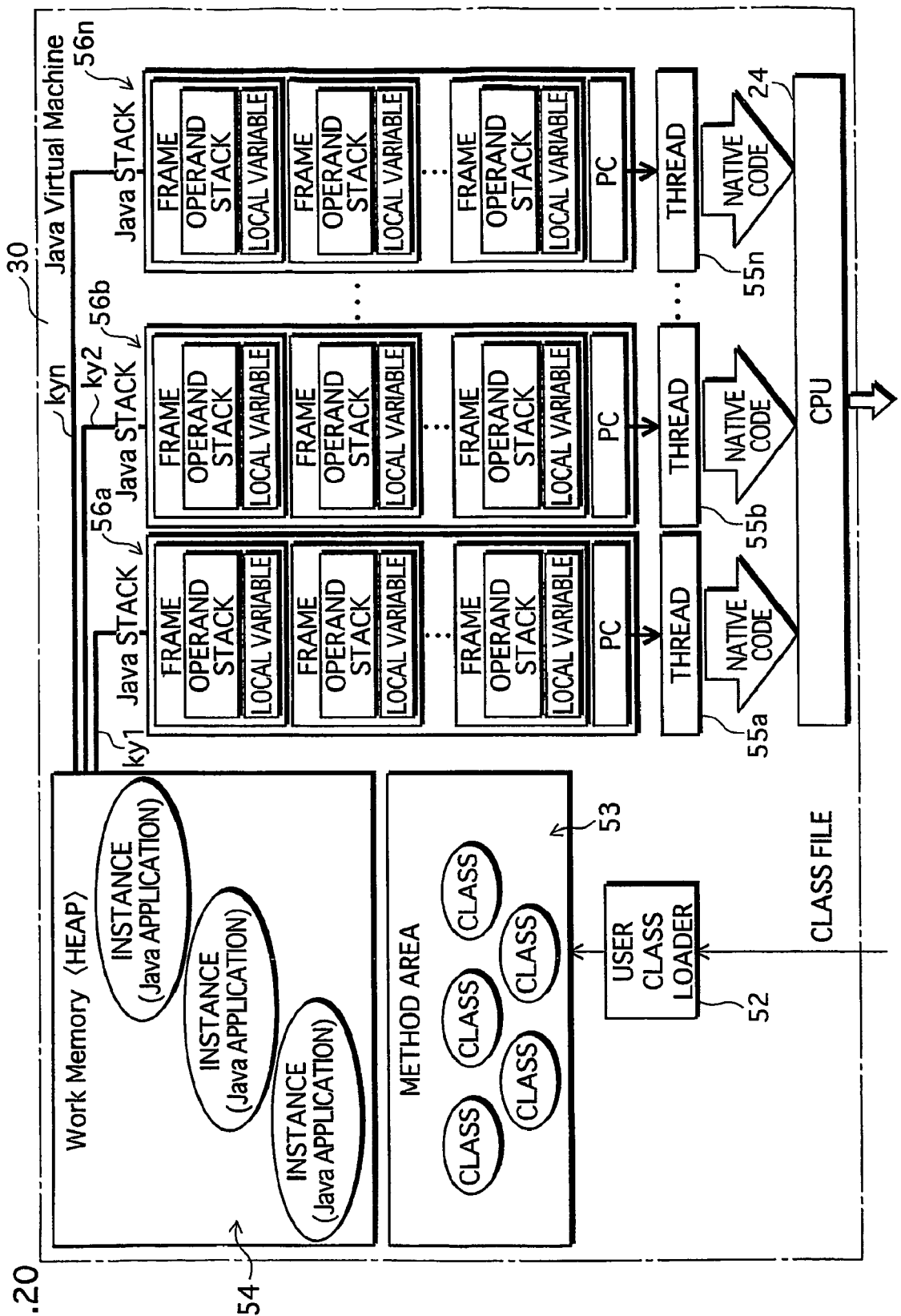
FIG. 20 shows an internal structure of a Java virtual machine 30.

The following describes the internal structure of Java virtual machine 30. FIG. 20 shows the internal structure of Java virtual machine 30. As shown in FIG. 20, Java virtual machine 30 is constituted from CPU 24, a user class loader 52, a method area 53, a work memory 54, threads 55*a*, 55*b*, . . . 55*n*, and Java stacks 56*a*, 56*b*, . . . 56*n*.

User class loader 52 reads class files in Java archive files in the BDJA directory from local memory 26 or the like and stores the read class files in method area 53. The reading of a class file by user class loader 52 is performed as a result of module manager 33 sending a read instruction specifying a file path to user class loader 52. If the file path indicates local memory 26, user class loader 52 reads a class file in a Java archive file constituting an application from local memory 26 to work memory 54. If the file path indicates a directory in a filesystem, user class loader 52 reads a class file in a Java archive file constituting an application from BD-ROM or local storage 18 to work memory 54.

Method area 53 stores class files read from local memory 26 by user class loader 52.

Work memory 54 is a so-called heap area storing the instances of various class files. Work memory 54 stores instances corresponding to resident applications and class files read to method area 53. An instance is an xlet program constituting an application that is made executable by placing the xlet program in work memory 54.

Threads 55*a*, 55*b*, . . . 55*n* are logical execution entities for executing methods stored in work memory 54. They perform calculations using local variables and arguments stored in operand stacks as operands, and store calculation results in local variables or operand stacks. The arrows ky1, ky2, and kyn in FIG. 20 symbolically indicate the supply of methods from work memory 54 to threads 55*a*, 55*b*, . . . 55*n*. Whereas the CPU is the sole physical execution entity, there may be up to 64 logical execution entities or threads in Java virtual machine 30. Threads can be newly created and existing threads deleted within this numerical limit, and the number of operational threads can be varied while Java virtual machine 30 is operating. Being able to appropriately increase the number of threads also makes it possible to run instances in parallel using a plurality of threads for each instance, and thereby speed up the execution of instances.

Java stacks 56*a*, 56*b*, . . . 56*n* exist in a one-to-one ratio with threads 55*a*, 55*b*, . . . 55*n*, and each has a program counter ("PC" in FIG. 20) and one or more frames. The program counters show which part of an instance is currently being executed. A frame is a stack-type area allocated to each call for a method, and is composed of an operand stack for storing arguments occurring at the time of the call and a local variable stack ("local variable" in FIG. 20) for use by the called method. Since frames are stacked on Java stacks 56*a*, 56*b*, . . . 56*n* whenever a call is made, the frames of a method that calls itself recursively also get stacked one on top of the other.

The internal structure of the Java virtual machine is as described above. A Java virtual machine having the above structure serves as an event-driven execution entity. This completes description of the Java virtual machine.

Presentation Engine 31

Presentation engine 31 executes AV playback functions. The AV playback functions of a playback apparatus are a traditional group of functions inherited from DVD players and CD players, including PLAY, STOP, PAUSE ON, PAUSE OFF, STILL OFF, FAST FORWARD PLAY (×2, ×4 etc.), FAST BACKWARD PLAY (×2, ×4 etc.), AUDIO CHANGE, SUBTITLE CHANGE, and ANGLE CHANGE. To realize these AV playback functions, presentation engine 31 controls video decoder 4, P-graphics decoder 6, I-graphics decoder 10 and audio decoder 16 to decode the portion of an AVClip read to read buffer 2 that corresponds to a desired time. By having the place indicated by PSR 8 (current PTM) decoded as the desired time, arbitrary points in an AVClip can be rendered playable.

Playback Control Engine 32

Playback control engine 32 executes various functions including (i) playback controls on playlists and (ii) acquiring/setting the status of PSR set 23. The playback control function involves having presentation engine 31 execute PLAY and STOP out of the above AV playback functions, in accordance with current PL information and clip information. Functions (i) and (ii) are executed according to function calls from DVD-like module 29*a* and Java platform 29*b*.

Synchronization of the processing by playback control engine 32 with the processing by the Java virtual machine is described next. Playback control engine 32 executes processing based on PL information when a function is called. This processing is performed for the duration of the AVClip for playback, whether the playback time is 15 minutes or 30 minutes. A problem here is the time lag between when Java virtual machine 30 returns a success response and when playback control engine 32 actually ends the processing. Java virtual machine 30, being an, event-driven execution entity, returns a response indicating whether playback was successful or not immediately after the call, whereas playback control engine 32 ends playback of the AVClip and playitems after the 15 or 30-minute playback duration has elapsed. Thus, the time at which a success response is returned to an application cannot be used as a basis for gauging the end of processing 15 or 30 minutes later. Gauging the end of processing becomes all the more difficult when fast-forwarding or rewinding is performed during PL playback since the playback time of 15 or 30 minutes is then subject to change. In view of this, playback control engine 32 outputs events indicating the end of playitem and AVClip playback to an application when playback of a respective playitem or AVClip ends. This output enables the application to know the points at which playback control engine 32 concluded playitem and AVClip playback.

Module Manager 33

Module manager 33 reads INDEX.BDMV and chooses one of the pieces of title information in INDEX.BDMV as current title information. Module manager 33 reads a BD-J object indicated by the current title information and controls playback control engine 32 to perform playback controls based on PL information described in the BD-J object. Module manager 33 also controls Java virtual machine 30 to read and execute Java archive files described in the BD-J object.

If playback of a digital stream based on PL information and execution of the applications ends or if the user calls a menu, module manager 33 reads title information defining another title and chooses this piece of title information as the current title information. The choosing of another piece of title information as the current title information according to digital stream playback or a user menu call is called a "title change".

Figure 21:
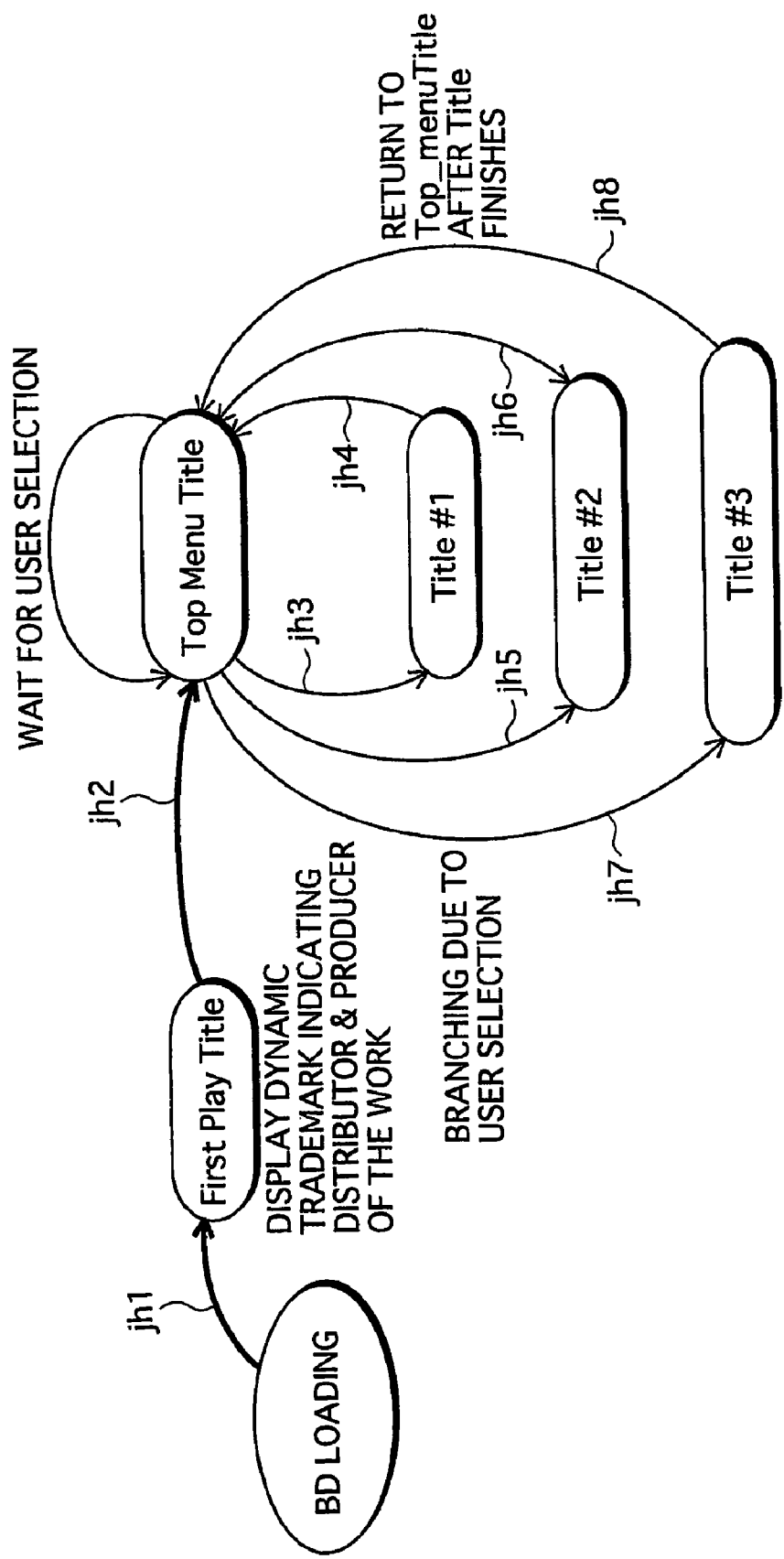
FIG. 21 shows a status transition resulting from title changes.

The status transition shown in FIG. 21 can be realized by repeatedly performing title changes. The oval windows in FIG. 21 represent titles.

The titles include a "FirstPlayTitle" for playback when a BD-ROM is first loaded, a "Top_menuTitle" constituting a top menu, and other general titles. The arrows jh1, jh2, jh3, jh4, jh5, jh6, jh7 and jh8 in FIG. 21 symbolically indicate branching between titles.

The status transition shown in FIG. 21 involves playing FirstPlayTitle when the BD-ROM is loaded, and then branching to Top_menuTitle and waiting for a selection from the top menu.

When the user selects from the menu, the respective title is played in accordance with the selection, before again returning to Top_menuTitle. The endless repetition of this processing until the disc is ejected is a status transition peculiar to disc contents. This status transition is realized under the control of module manager 33 described above.

This completes description of Java virtual machine 30, presentation engine 31, playback control engine 32, and module manager 33. The controls on playback control engine 32 by Java virtual machine 30 are performed via a virtual package. To realize controls on playback control engine 32 via a virtual package, the playback apparatus includes a network management module 37 and a virtual filesystem unit 38. These elements are describes next.

Network Management Module 37

Network management module 37 downloads data required for creating virtual packages from websites administrated by the providers of movie works in accordance with method calls from applications. This data includes files (PL information, clip information, AVClips, Java archive files etc.) that either replace or add to merge management information files, signature information files, and files on BD-ROM. When download requests are made by applications in work memory 54, network management module 37 downloads data required for creating virtual packages via a network and writes the downloaded data to local storage 18.

Virtual Filesystem Unit 38

Virtual filesystem unit 38 is an element belonging to the 2nd layer in FIG. 19 that creates virtual packages in accordance with method calls from applications. The creation of a virtual package includes processing to manage the status of AVClips constituting the virtual package and processing to generate virtual package information.

Virtual Package Information

Virtual package information expands the volume management information on BD-ROM. The volume management information referred to here defines the directory structure existing on recording media, and is composed of directory management information relating to directories and file management information relating to files.

Figure 22:
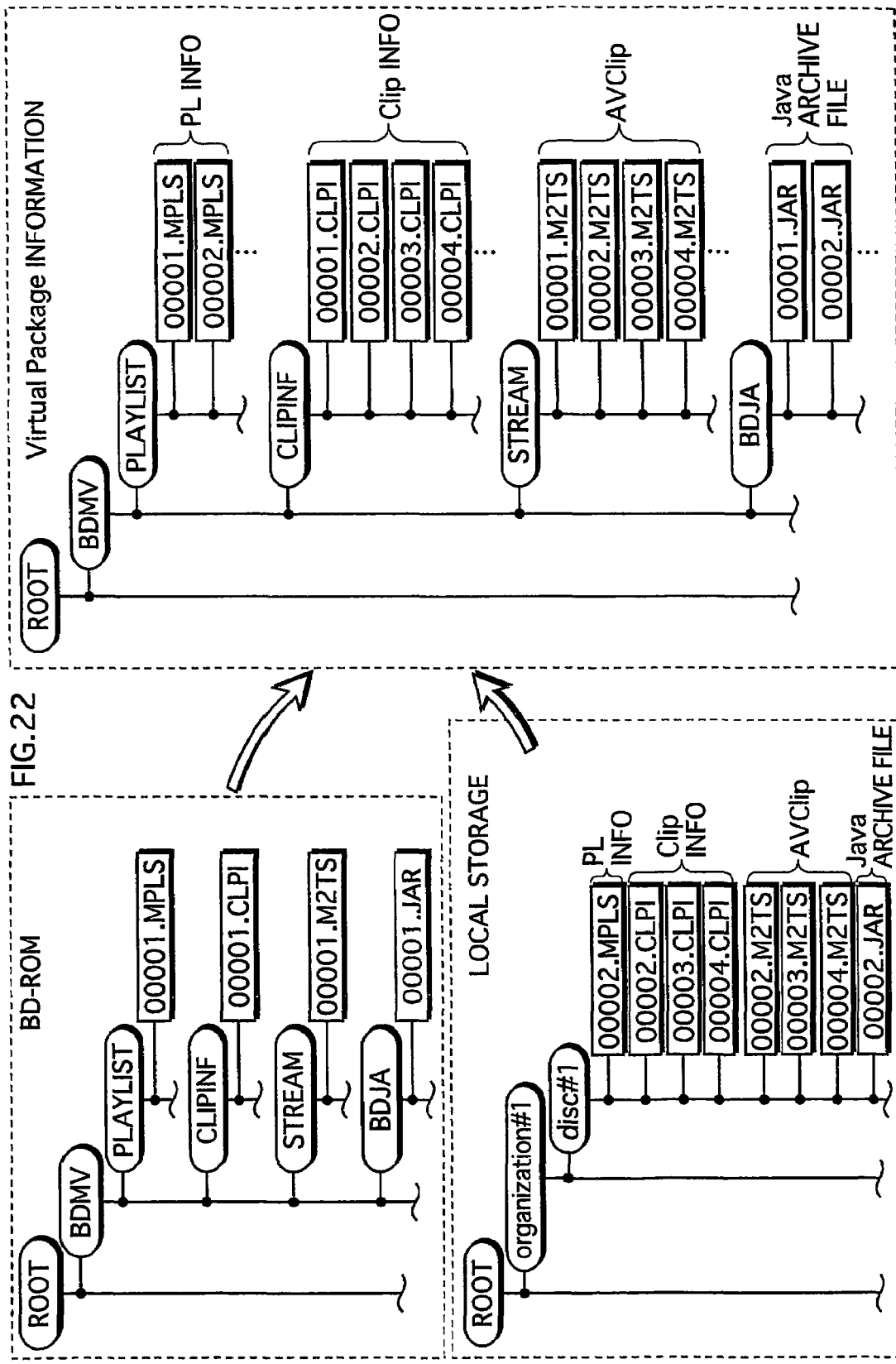
FIG. 22 shows an exemplary creation of virtual package information by a virtual filesystem unit 38.

Virtual package information expands the directory structure on BD-ROM by adding new file management information to the volume management information showing the directory structure. The file management information added to the volume management information relates to PL information, clip information, AVClips and Java archive files existing in local storage 18. Creating virtual package information to which this file management information has been added and providing this virtual package information to playback control engine 32 enables the playback control engine to recognize PL information, clip information, AVClips and Java archive files stored in local storage 18 as existing on BD-ROM. FIG. 22 shows an exemplary creation of virtual package information by virtual filesystem unit 38. At the top left of FIG. 22 is the directory structure on BD-ROM, this being the same as FIG. 2. At the bottom left is the directory structure in local storage 18, this being the same as FIG. 14. File management information relating to PL information, clip information, AVClips, and Java archive files in local storage 18 are added to the volume management information on BD-ROM.

Specifically:

i) file management information relating to playlist information#2 (00002.mpls) in local storage 18 is added to the directory management information in the PLAYLIST directory;

ii) file management information relating to clip information#2, #3 and #4 (00002.clip, 00003.clip, 00004.clip) in local storage 18 is added to the directory management information in the CLIPINF directory;

iii) file management information relating to AVClips#2, #3 and #4 (00002.m2ts, 00003.m2ts, 00004.m2ts) in local storage 18 is added to the directory management information in the STREAM directory; and iv) file management information relating to the Java archive file "00002.jar" in local storage 18 is added to the directory management information for the BDJA directory.

Virtual package information is thus obtained. In other words, virtual package information is volume management information that has been added to in the above manner.

This virtual package information is then provided to playback control engine 32, which is thereby able to treat PL information, clip information, AV clips, and Java archive files in local storage 18 on an equal basis with PL information, clip information, AVClips, and Java archive files on BD-ROM. The generation of virtual package information is as described above.

The following describes the timing at which virtual package information is updated.

Assume that the BD-ROM is ejected after branching performed in the numerical order of the reference signs indicated by the arrows jh1, jh2, jh3, jh4 etc. in FIG. 21. This enables the contiguous timeslot from the loading to the ejecting of the BD-ROM to be viewed as a single time axis. This time axis is taken as the time axis for the entire disc. FIG. 23A shows the time axis for the entire disc, while FIG. 23B shows the structure of this time axis. As shown in FIG. 23B, the time axis for the entire disc is composed of intervals during which FirstPlayTitle is played, intervals during which Top_menuTitle is played, and intervals during which general titles (Title#1 etc.) are played. As for the manner in which the playback intervals of these titles are defined, since each title is constituted from only one BD-J object, the period during which any given BD-J object is valid can be regarded as the playback interval of a title. The space between these playback intervals, or rather the interval for changing from one title to another (i.e. "title change"), is when the virtual package information is updated.

Figure 24:
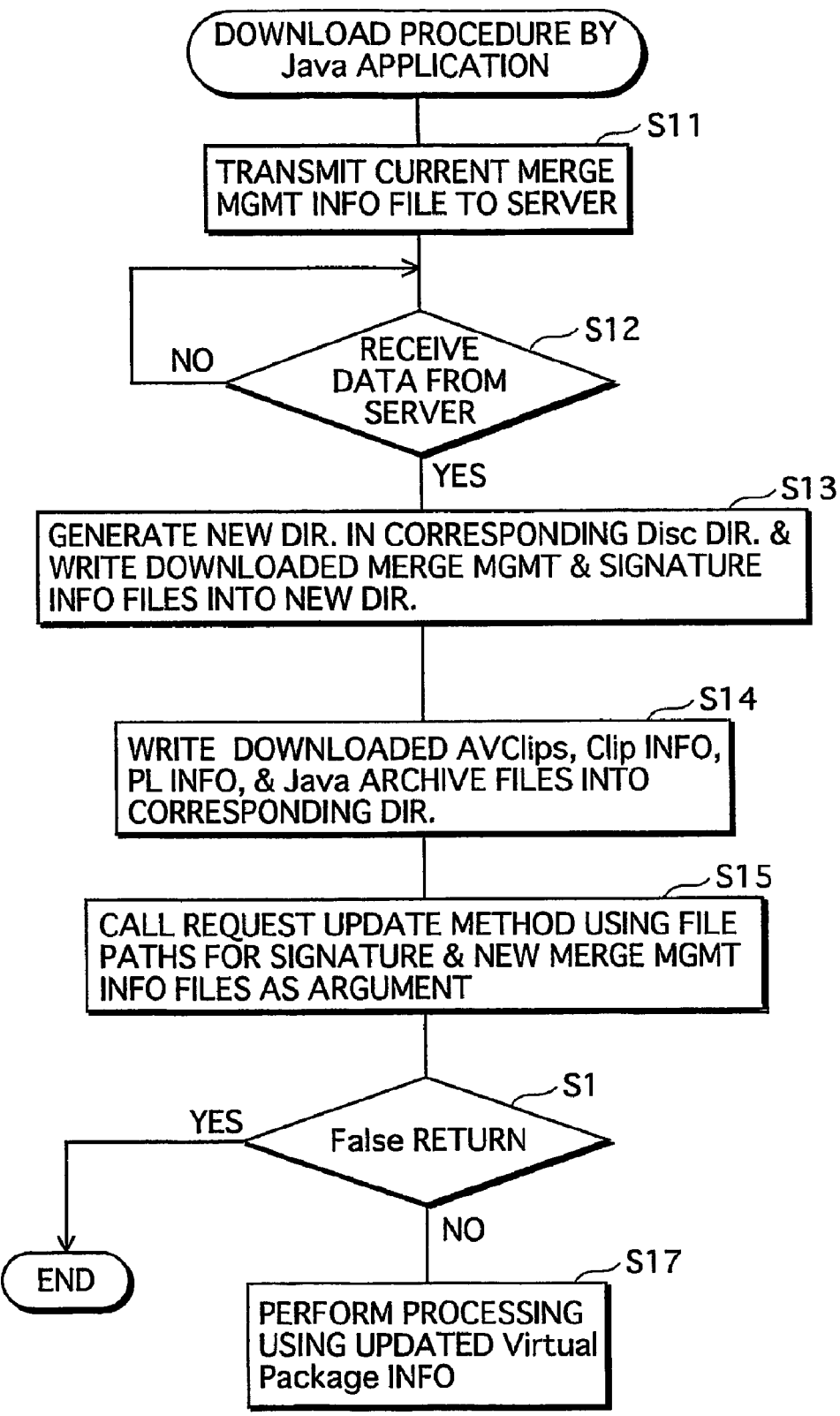
FIG. 24 is a flowchart of download processing by a Java application.

A procedure for downloading new merge management and signature information files and content files by a Java application is described next using FIG. 24.

The Java application firstly sends the current merge management information file to the server (step S11), thereby requesting a download, and judges whether data has been received from the server (step S12) When data is downloaded, the Java application creates a new directory in a corresponding disc directory and writes the downloaded merge management information file and signature information file to the new directory (step S13). Note that if the filenames of the downloaded merge management and signature information files do not coincide with the existing merge management and signature information files in the disc directory, the downloaded files may be placed directly under the existing directory (disc#1 directory) without creating a new directory.

Downloaded AVClipS/clip information, PL information, and Java archive files are written to the corresponding directory (step S14). The Java application then calls an update request method using the file paths of the new merge management and signature information files as arguments (Step S15). The Java application judges whether the return value is false (step S16), and terminates the processing if false. If the return value is not false, the Java application executes processing using the updated virtual package information (step S17).

Note that while the above processing is described in terms of the Java application sending the current merge management information file to the server when requesting a download, the Java application may send only the ID of the merge management information file.

An update "preparing" procedure performed by virtual filesystem unit 38 upon receipt of an update request is described next using FIG. 25.

Virtual filesystem unit 38 firstly reads the new merge management and signature information files using the file paths that serve as arguments when calling a method (step S21), and verifies the signature in order to check whether the new merge management information file has been tampered with (step S22). Exceptional termination is carried out if the signature cannot be verified. If the signature is verified, virtual filesystem unit 38 checks the authority of the calling application (step S23). Exceptional termination is carried out if the calling application is unauthorized. If the calling application is authorized, virtual filesystem unit 38 judges whether files specified by the new merge management information file actually existing in local storage (step S24). Exceptional termination is carried out if these files do not exist. If these files do exist, virtual filesystem unit 38 changes the new merge management and signature information files and all the files in local storage referenced from the new merge management information file to read-only (step S25).

Figure 26:
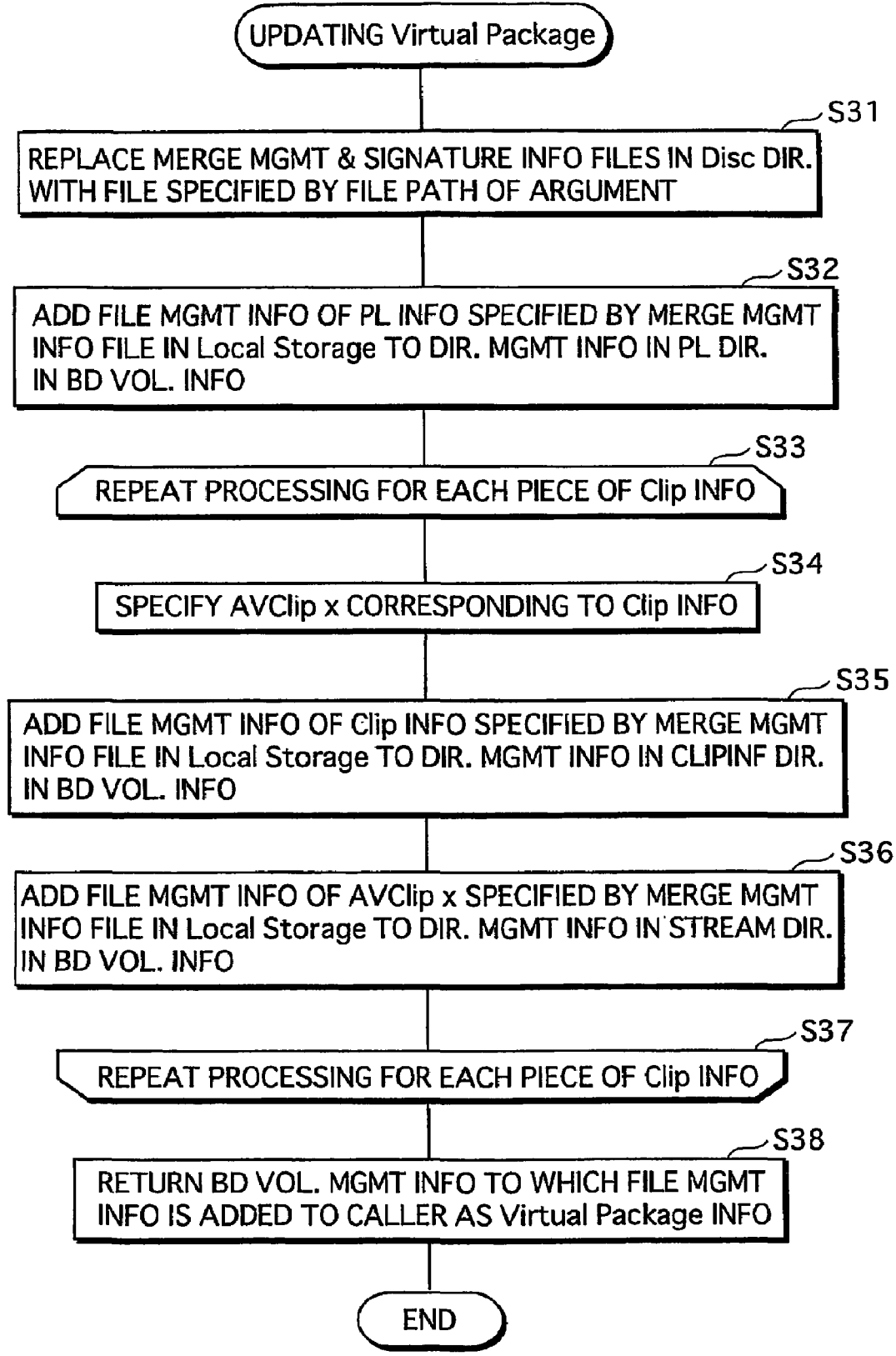
FIG. 26 is a flowchart of a virtual package "updating" procedure.

FIG. 26 is a flowchart of virtual package "updating" processing by virtual filesystem unit 38. Virtual filesystem unit 38 firstly identifies the disc directory corresponding to the loaded BD-ROM and replaces the merge management and signature information files in the disc directory with the new merge management and signature information files specified by the file paths that serve as arguments when the Java application calls the update request method (step S31). Virtual filesystem unit 38 then adds the file management information of PL information specified by the merge management information file in local storage 18 to the directory management information in the PLAYLIST directory (Step S32), and executes the loop of steps S33 to S37. This loop involves repeating steps S34 to S36 for each piece of clip information existing in, local storage 18. Here, a piece of clip information targeted for loop processing is given as clip information x. Virtual filesystem unit 38 identifies an AVClip corresponding to clip information x (step S34), adds the file management information of clip information x specified by the merge management information file in local storage 18 to the directory management information in the CLIPINF directory (step S35), and adds the file management information of AVClip x specified by the merge management information file in local storage 18 to the directory management information in the STREAM directory (step S36). By repeating the above processing for all clip information and AVClips in local storage 18, file management information relating to the clip information and AVClips is added to the volume management information. The volume management information thus obtained is virtual package information. Virtual filesystem unit 38 provides this virtual package information to the application that made the virtual package call (step S38), and ends the processing.

Figure 27:
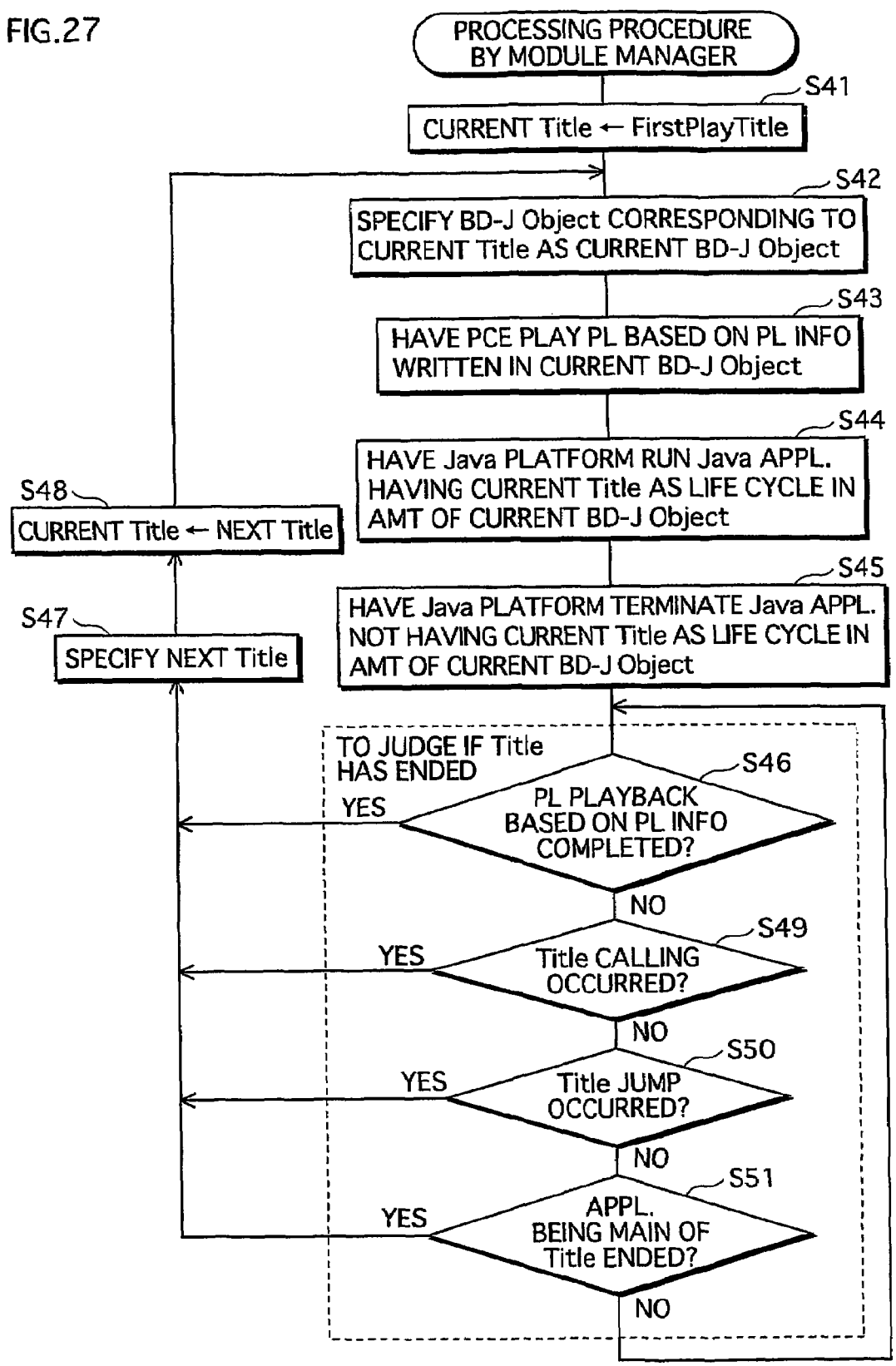
FIG. 27 is a flowchart of processing by a module manager.

FIG. 27 is a flowchart of the processing by module manager 33.

Module manager 33 firstly chooses FirstPlayTitle as the current title (step S41), specifies the BD-J object corresponding to the current title as the current BD-J object (step S42), and has playback control engine 32 execute PL playback based on PL information described in the current BD-J object (step S43). Module manager 33 then has Java platform 29b run Java applications whose lifecycle is the current title in the application management table of the current BD-J object (step S44), and has Java platform 29b terminate Java applications whose lifecycle is not the current title (step S45). Module manager 33 then judges whether PL playback based on the current PL information has been completed (step S46) and if completed, module manager 33 identifies the next title (step S47), and chooses this title as the current title (step S48). If current PL playback is not yet completed, module manager 33 judges whether a title call has occurred (step S49) and moves to step S47 if this is the case. If a title call has not occurred, module manager 33 judges whether a title jump has occurred (step S50), and moves to step S47 if this is the case. If a title jump has not occurred, module manager 33 judges whether a main application of the current title has ended (step S51) and moves to step S47 if this is the case. If the main application has not yet ended, module manager 33 returns to step S46.

Figure 28:
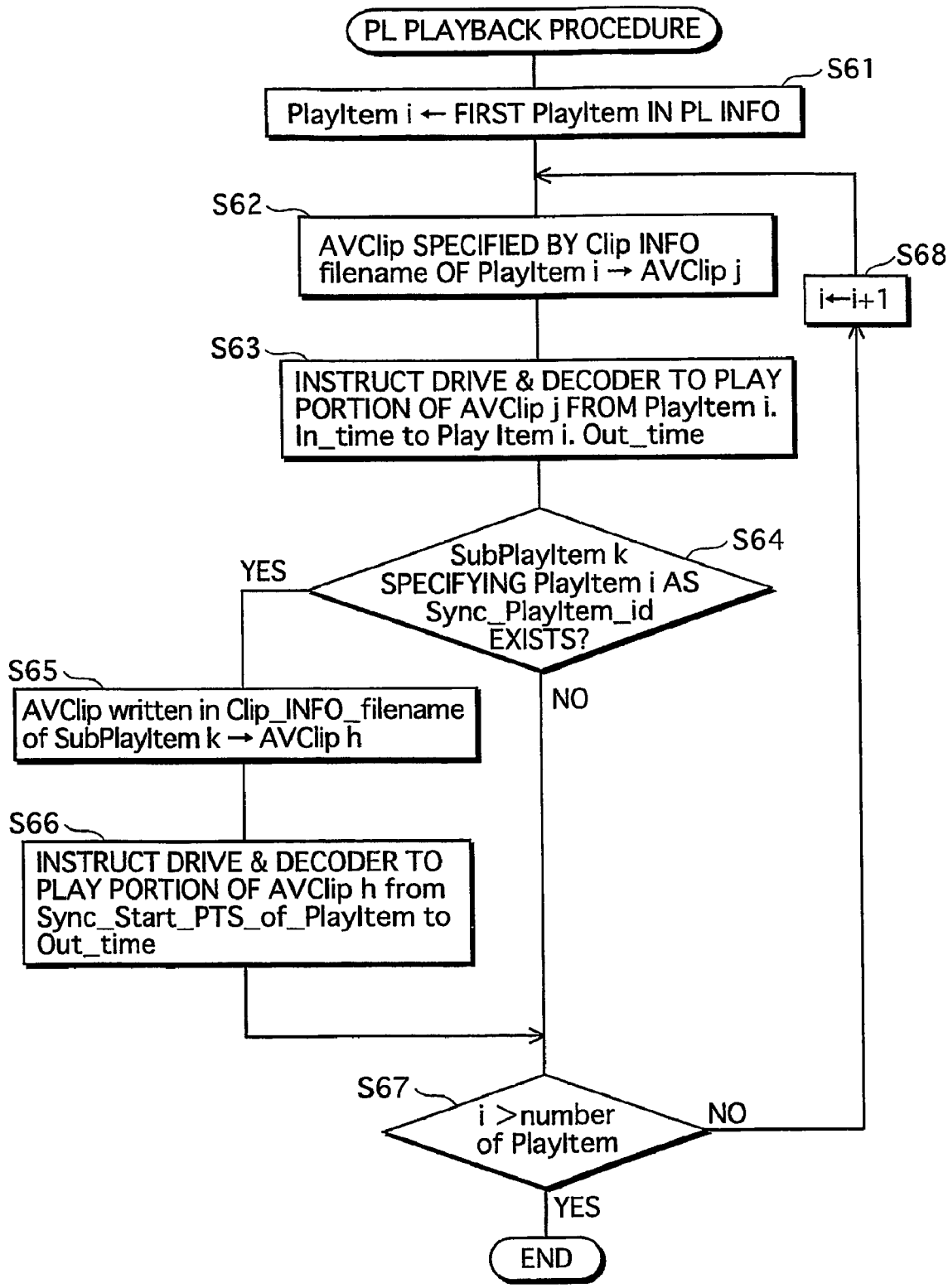
FIG. 28 is a flowchart of a PL playback procedure.

FIG. 28 is a flowchart of playback processing by playback control engine 32. Playback control engine 32 executes the loop of steps S62 to S68 after setting the first piece of PlayItem information in the current PL information as PlayItem i (step S61). The control variable in this loop is variable i. Playback control engine 32 increments control variable i by "1" at step S68 after executing steps S62 to S66 until variable i exceeds the number of play items (step S67).

Steps S62 to S66 are described next. Playback control engine 32 sets the AVClip described in Clip_information_file_name in PlayItem i as AVClip j (step S62), and instructs the drive device and decoder to play AVClip j from the PlayItem. In_time to PlayItem.Out_time (step S63). Playback control engine 32 judges whether there exists a SubPlayItem k specifying PlayItem i in Sync_PlayItem_Id (step S64), and moves directly to step S67 if this SubPlayItem does not exist. If SubPlayItem k does exist, playback control engine 32 sets the AVClip described by Clip_information_file_name of SubPlayItem k as AVClip h (step S65), instructs the drive device and decoder to playback AVClip h from Sync_Start_PTS_of_PlayItem to Out_time (step S66), and moves to step S67.

A stream sequence defined by the PL information is played as a result of this processing being repeated for all of the PlayItem information constituting the PL information.

Figure 29:
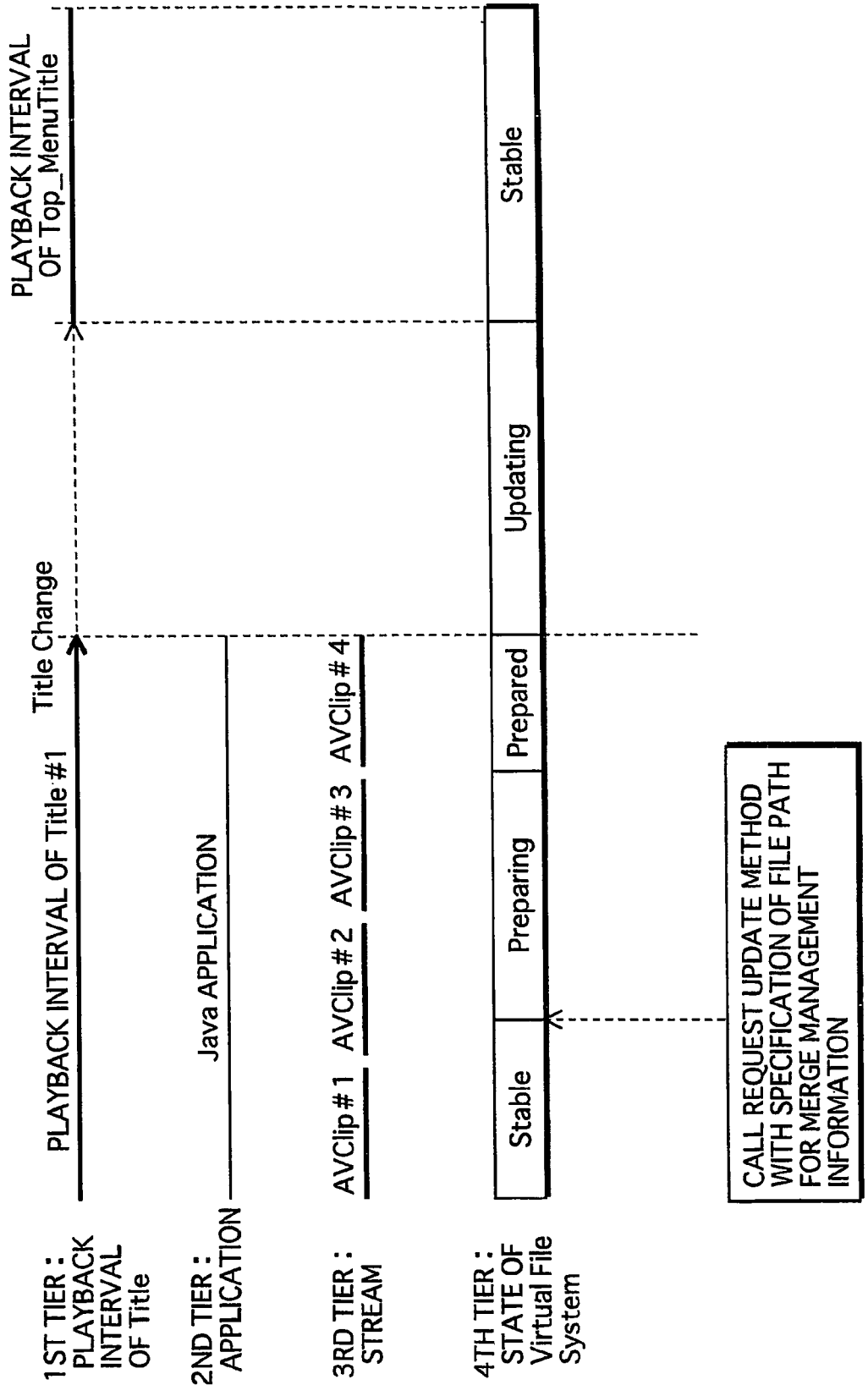
FIG. 29 shows how virtual package information is updated during a title change.

FIG. 29 shows how virtual package information is updated during a title change.

The 1st tier in FIG. 29 shows title playback intervals on the time axis, the 2nd tier shows a Java application whose lifecycle is Title#1, the 3rd tier shows a digital stream, and the 4th tier shows the status of virtual filesystem unit 38.

Figure 25:
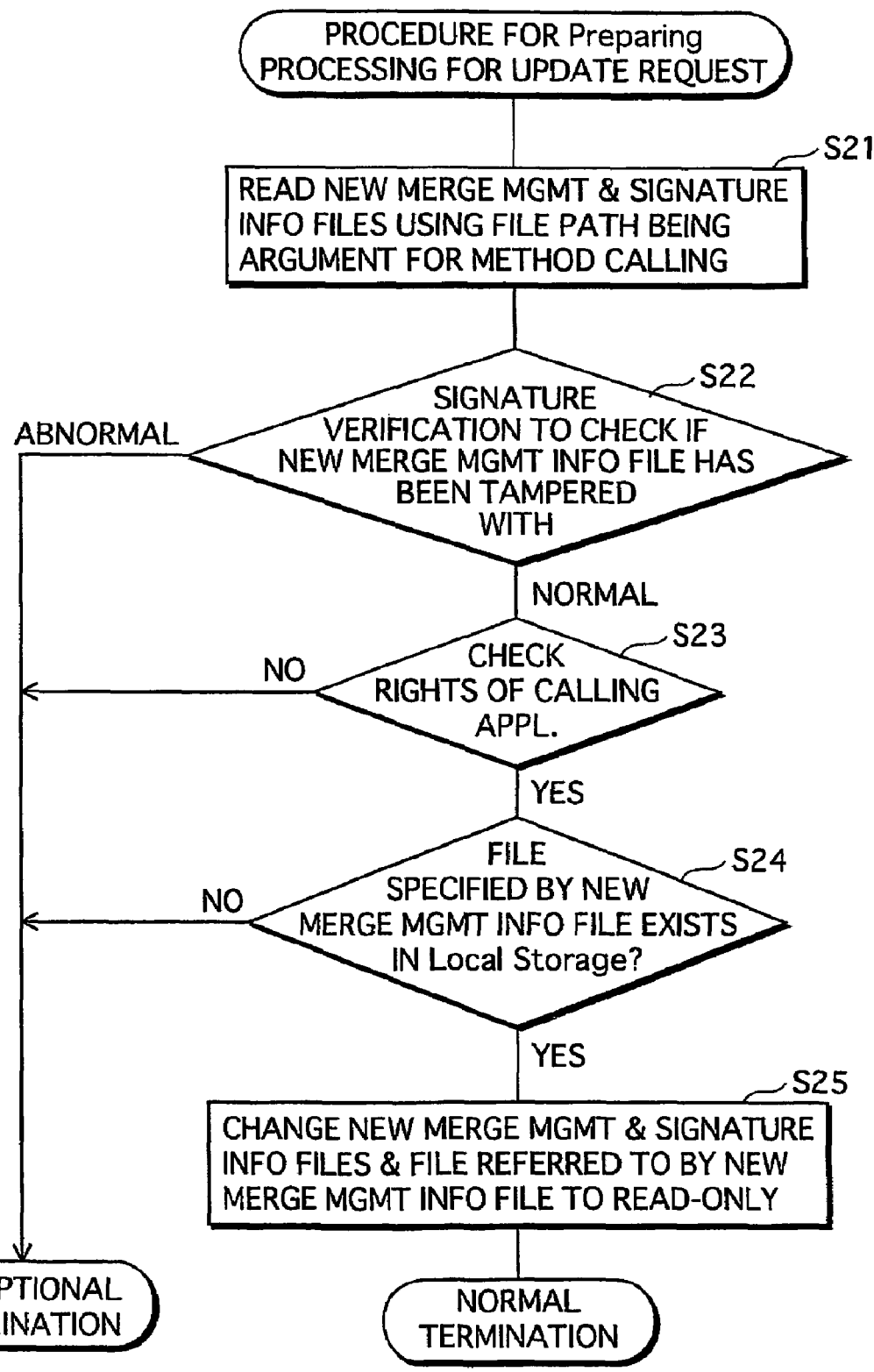
FIG. 25 is a flowchart of an update "preparing" procedure.

Virtual filesystem unit 38 is placed in a "preparing" state upon receipt of an update request from the Java application, and performs the processing shown in FIG. 25.

After performing this processing, virtual filesystem unit 38 waits in a "prepared" state for a title change. When a title change occurs, virtual filesystem unit 38 is placed in an "updating" state, and executes the processing shown in FIG.

26 to update the virtual package, before reverting back to a "stable" state. If Title#1 is again selected from Top_menu-Title after virtual filesystem unit 38 has reverted back to a "stable" state, Title#1 is played using the updated virtual package.

Here, a title change occurs when module manager 33 chooses a different title as the current title due, for instance, to playback of a stream sequence ending or a menu being called by a user.

The above processing is schematically described using FIGS. 30 to 33.

Figure 30:
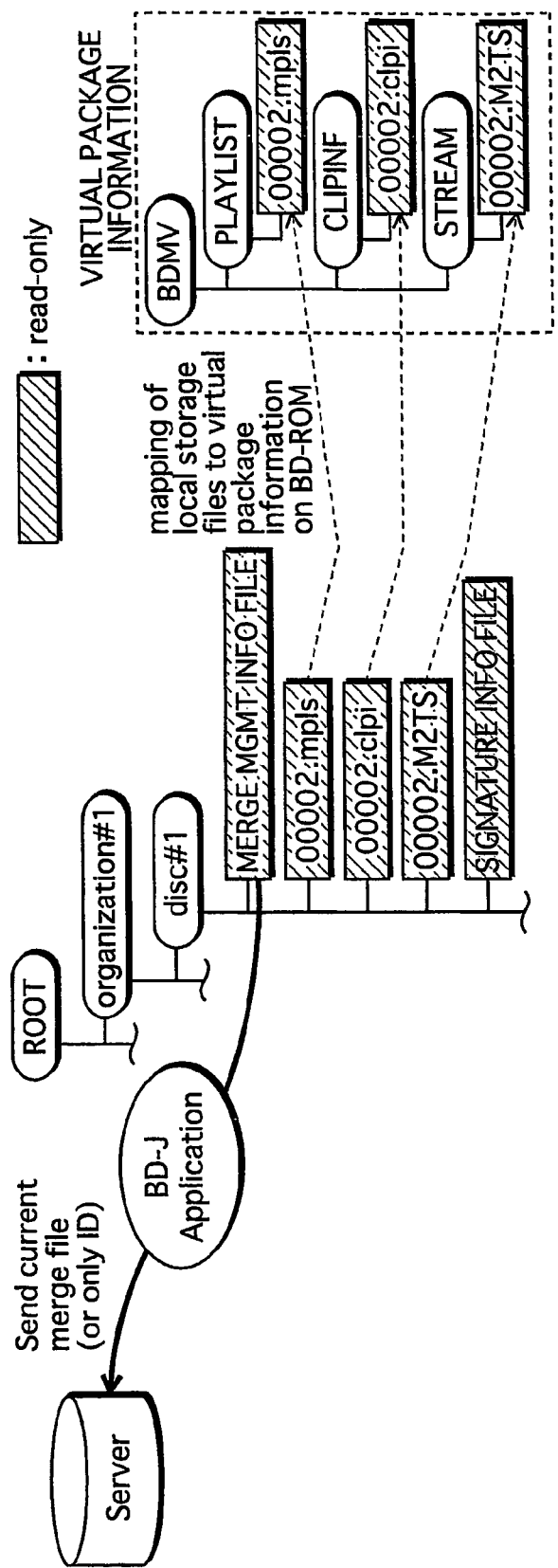
FIG. 30 shows a Java application sending a current merge management information file to a server.

FIG. 30 shows a Java application sending the current merge management information file to the server. The files shown under ROOT are located in local storage, while the files under BDMV are located in a virtual package.

Figure 31:
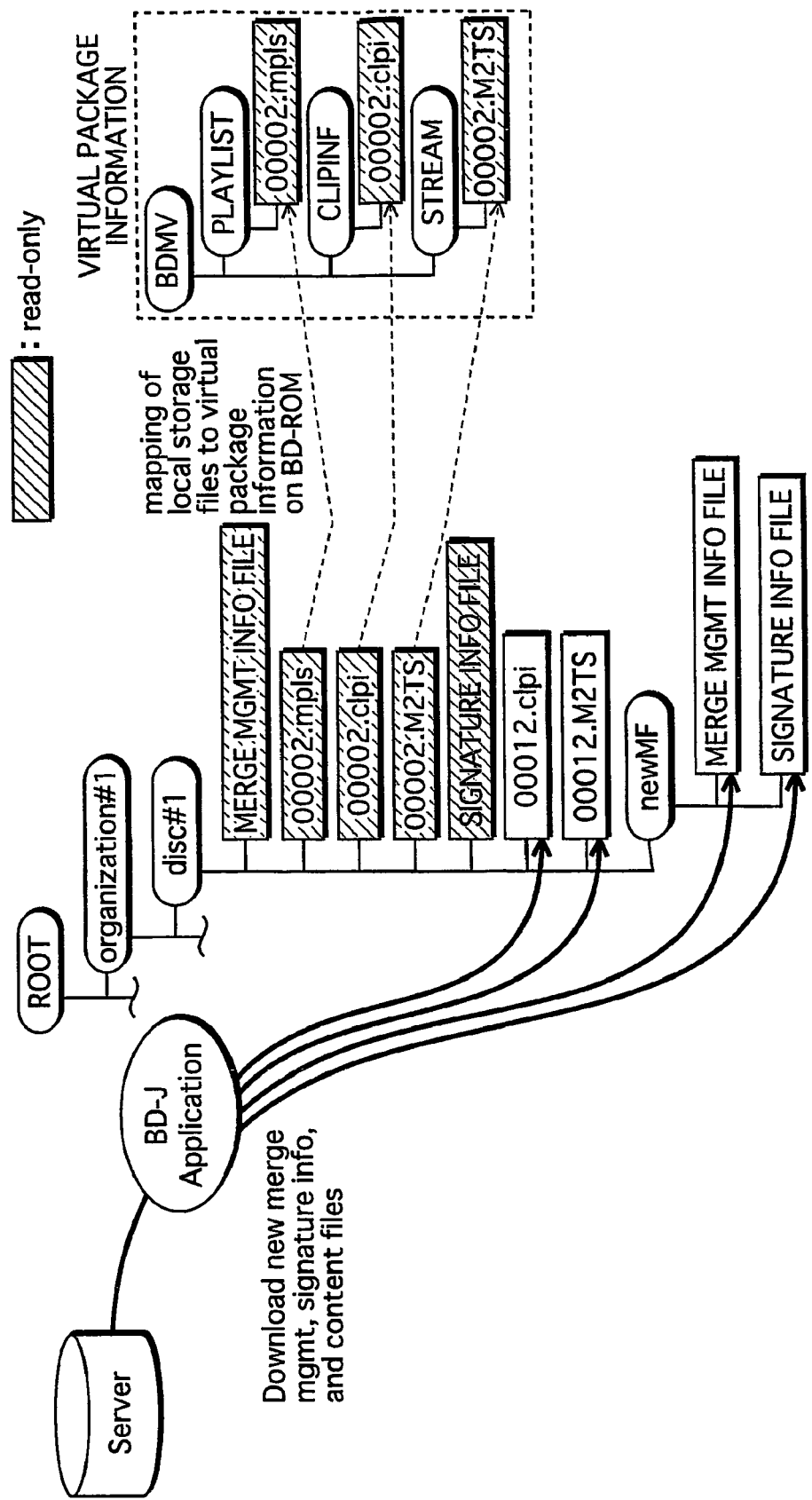
FIG. 31 shows a Java application downloading content files, a new merge management information file, and a new signature information file.

FIG. 31 shows the Java application downloading content files, a new merge management information file, and a new signature information file. "00012.clpi" and "00012.m2ts" are downloaded content files, while the merge management and signature information files stored in the newMF directory have been newly downloaded.

Figure 32:
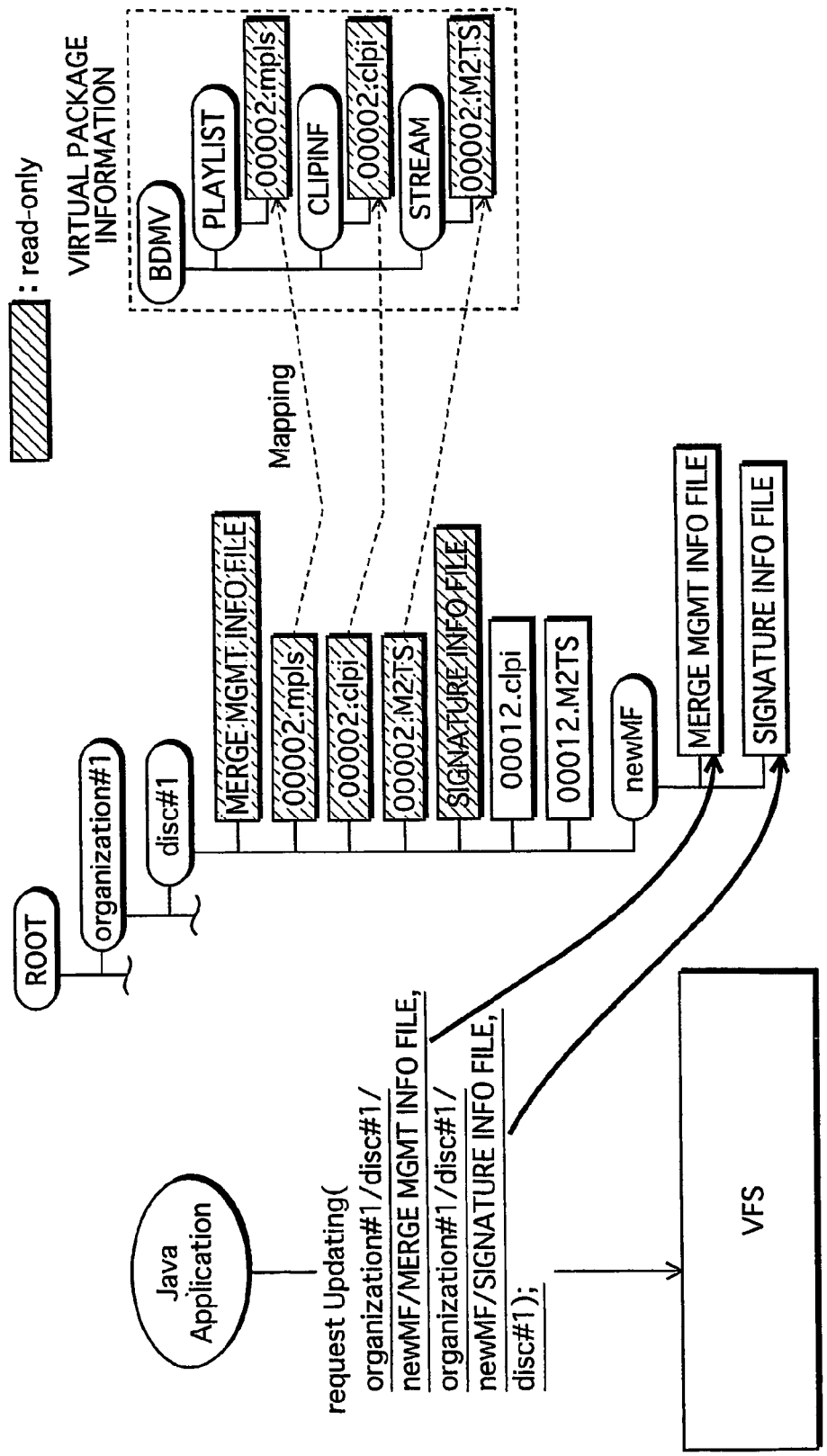
FIG. 32 shows a Java application making an update request to virtual filesystem unit 38.

FIG. 32 shows a Java application requesting virtual filesystem unit 38 to update the existing merge management and signature information files to the newly downloaded files. This update request is made by using the file paths to specify the new merge management and signature information files.

Figure 33:
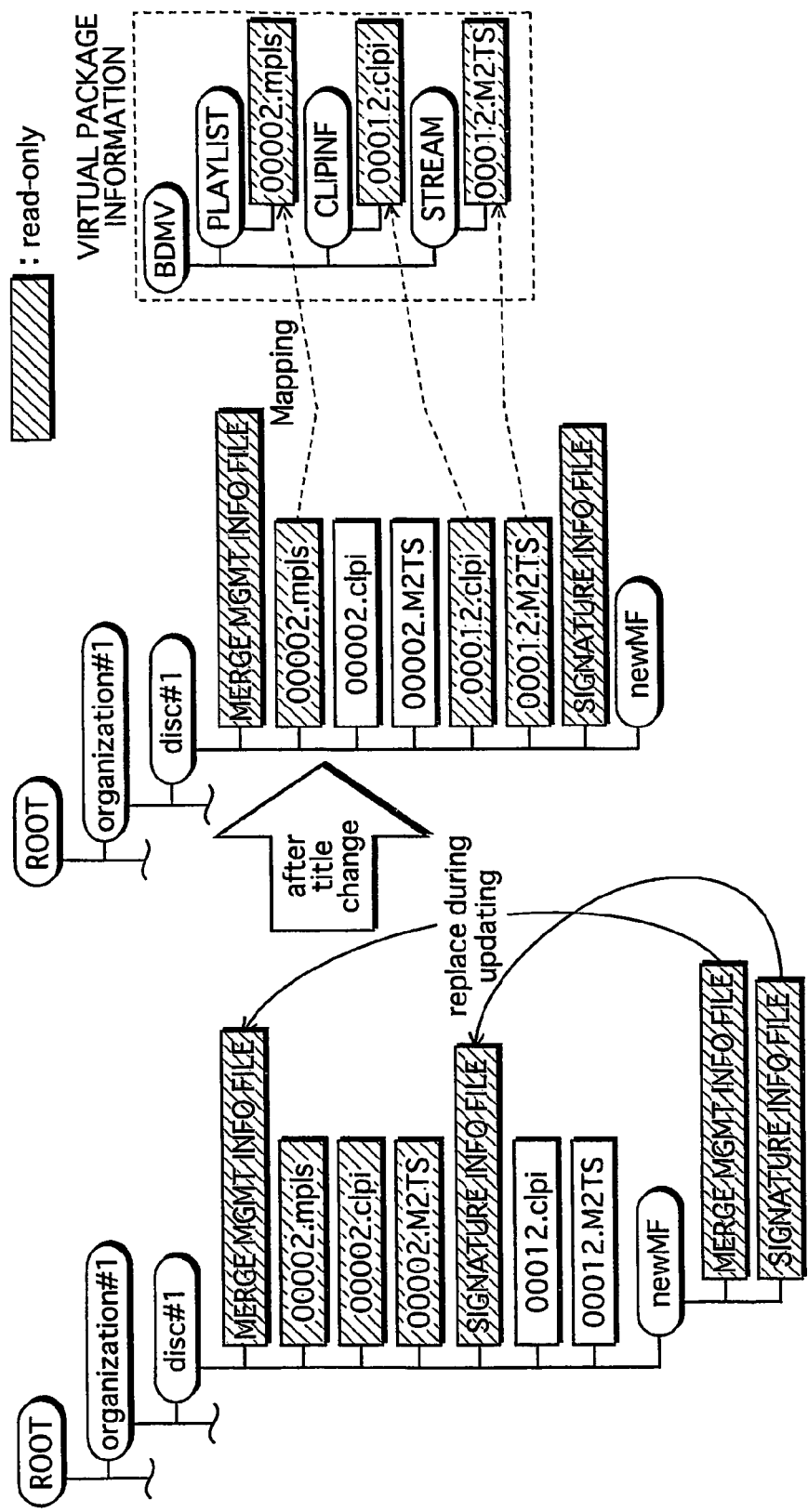
FIG. 33 shows the replacement of merge management and signature information files, and the mapping of content files.

FIG. 33 shows the replacement of merge management and signature information files and the mapping of content files. The replacement of the old merge management and signature information files during updating is shown on the left side of FIG. 33. The mapping of content files after the title change is shown on the right side of FIG. 33.

Note that the read-only attribute of files referenced from the old merge management information but not from the new merge management information is removed, making these files writable by a Java application.

The merge management information file includes information indicating the location of contents added to local storage. Information indicating the location of additional contents includes content IDs, the directory paths of directories in which the contents are stored, or the file paths of individual content files. Filename-mapping information may be described in the merge management information file when mapping these files to a virtual package, so as to enable these files to be accessed under different filenames in the virtual package. Here, filename-mapping information maps filenames (including file path) in a virtual package with filenames (including file path) in local storage.

In this case, virtual packages are created by virtual filesystem unit 38 as virtual package media constituted from files whose filenames in the virtual package described in the filename-mapping information have been added to the file structure on BD-ROM. Files in a virtual package accessed by a Java application are specified as files in the virtual package rather than as files, on BD-ROM or in local storage. When a Java application requests access to a file in a virtual package, virtual filesystem unit 38 switches the access destination to either local storage or BD-ROM based on the filename-mapping information. If the desired file is described in the filename-mapping information, the access destination is changed to a corresponding file in local storage. If the desired file is not described in the filename-mapping information, the access destination is changed to a corresponding file on BD-ROM.

In other words, the creator of a Java application need not be aware of the medium (BD-ROM or local storage) on which individual files are stored, since virtual filesystem unit 38 switches the access destination of a file specified in a virtual package by a Java application to the medium actually storing the file, thereby lightening the burden of program creation.

According to the present embodiment, a virtual package is updated during a title change, meaning that the replacement of a playback object will not cause abnormal operation of the playback apparatus.

Embodiment 2

The present embodiment relates to an improvement when title calls are performed. A title call results in the called title being played after firstly suspending the current title, and the original title then being resumed after playback of the called title has ended. Since title calls are premised on playback being resumed, playback control engine 32 saves system parameters for playback controls stored in PSRs to backup PSRs when a title is called, and restores the saved parameters to the PSRs after playback of the called title has ended.

The following is a list of system parameters stored in PSRs. PSR 0 to PSR 12 store system parameters showing playback status, PSR 13 to PSR 19 store system parameters set by the player as preferences, and PSR 20 to PSR 32 are backup PSRs.

PSR 0: I-Graphics Stream Number
PSR 1: Audio Stream Number
PSR 2: P-Graphics Stream/TextST Stream Number
PSR 3: Angle Number
PSR 4: Current Title Number
PSR 5: Current Chapter Number
PSR 6: Current Playlist ID
PSR 7: Current Playitem ID
PSR 8: Playback Time Information
PSR 9: Navigation Timer
PSR 10: Selection Key Information
PSR 11: Current Page ID in I-Graphics Stream
PSR 12: User Style ID in P-Graphics Stream & TextST Stream
PSR 13: Parental Level
PSR 14: Subtitle Support Information
PSR 15: Player Setting Value (Audio)
PSR 16: Language Code for Audio Stream
PSR 17: Language Code for P-Graphics Stream & TextST Stream
PSR 18: Language Code for Menu
PSR 19: Version Information of Player
PSR 20: Backup for PSR 0
PSR 21: Backup for PSR 1
PSR 22: Backup for PSR 2
PSR 23: Backup for PSR 3
PSR 24: Backup for PSR 4
PSR 25: Backup for PSR 5
PSR 26: Backup for PSR 6
PSR 27: Backup for PSR 7
PSR 28: Backup for PSR 8
PSR 29: Backup for PSR 9
PSR 30: Backup for PSR 10
PSR 31: Backup for PSR 11
PSR 32: Backup for PSR 12

Updating virtual package information during a title call result in differences in the virtual package information before and after the call.

Since the virtual package information will have changed when the original title is restored, errors may arise if playback control engine 32 attempts to play the original title using the backup values. This problem is avoided by clearing the backup PSRs when a Java application has requested updating.

However, given that the change may have no effect depending on the content of the merge management information file, the decision as to whether to clear the system parameter values can be left up to the Java application.

Figure 34B:
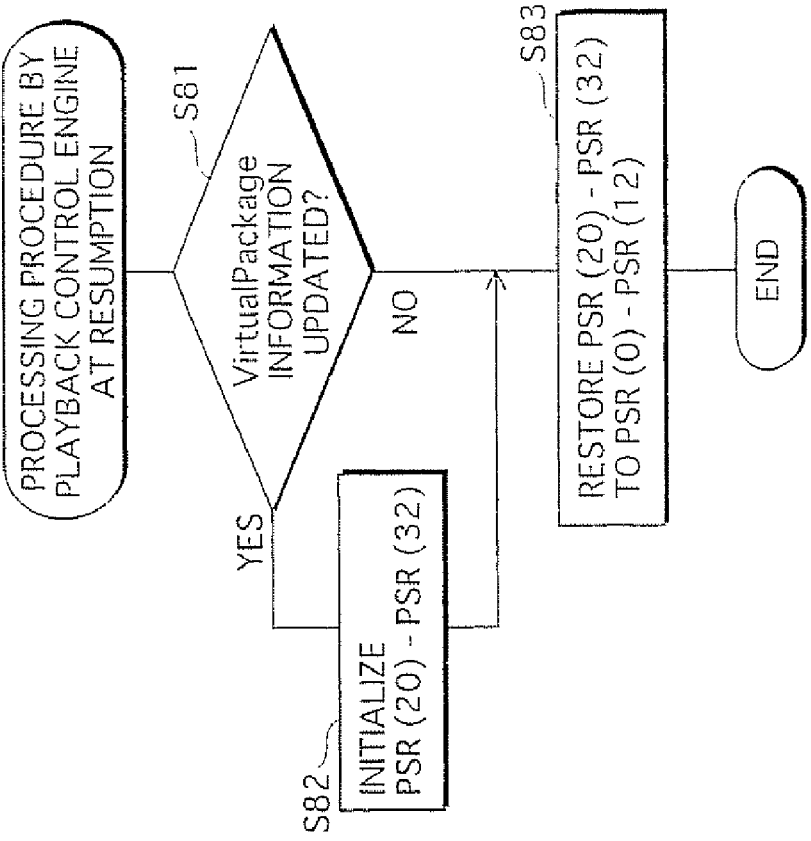
FIG. 34B is a flowchart of processing by the playback control engine when resuming playback of the original title after playback of the called title has ended.
Figure 34A:
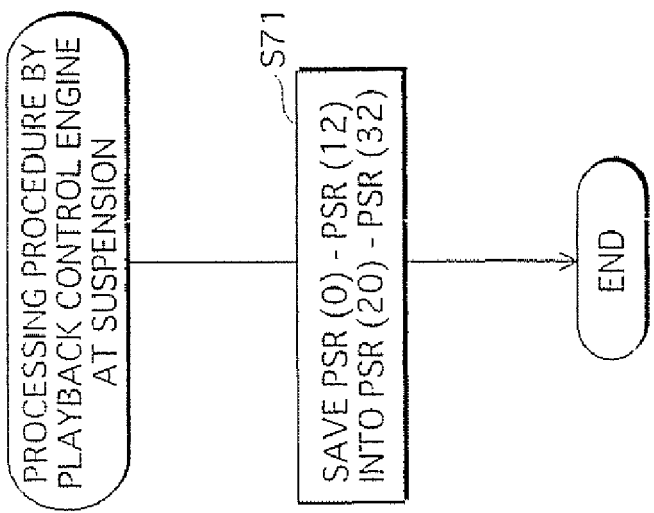
FIG. 34A is a flowchart of processing by a playback control engine when suspending playback of the current title after a title call.

FIG. 34A is a flowchart of processing by playback control engine 32 when suspending playback of the current title after a title call. FIG. 34B is a flowchart of processing by playback control engine 32 when resuming playback of the original title after playback of the called title has ended.

When current title playback is suspended, playback control engine 32 saves PSRs 0-12 to PSRs 20-32 (step S71).

When original title playback is resumed after playback of the called title has ended, playback control engine 32 firstly judges whether the virtual package information has been updated (step S81). PSRs 20-32 are restored to PSRs 0-12 (step S83) if not updated, while PSRs 20-32 are initialized (step S82) before performing step S83 if the virtual package information has been updated.

According to the present embodiment, backup PSRs are initialized when the virtual package information has been updated during a title call, thereby removing the danger of playback errors occurring when original title playback is resumed. The stable operation of playback control engine 32 is thus enabled.

Note that system parameter values in the PSRs may be mandatorily cleared when virtual package information is updated, rather than leaving this decision up the Java application.

Embodiment 3

Figure 35:
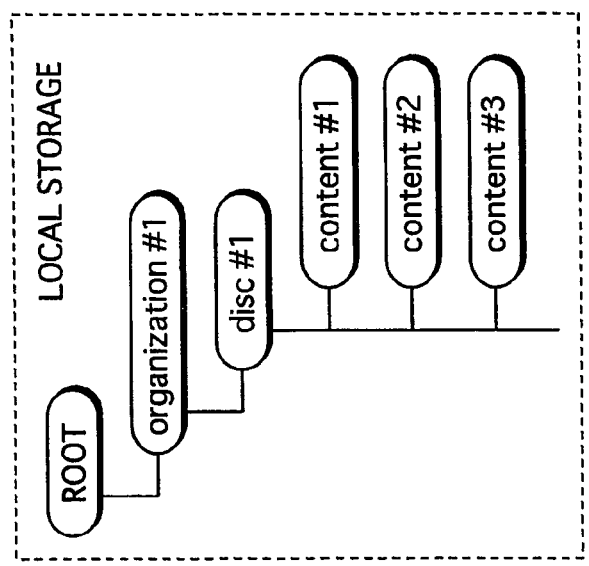
FIG. 35 shows a merge management information file in an embodiment 3.

The present embodiment relates to a method for managing the version of merge management information and specifying additional contents for merging from a resident application in the playback apparatus. FIG. 35 shows an exemplary content of a merge management information file pertaining to the present embodiment. In embodiment 1, the merge management information file (or rather the merge management information stored therein) is updated by overwriting the old merge management information, resulting in the old information being erased. In the present embodiment, new merge management information is continually added to the file without overwriting the old information even for the same disc ID. Thus, if virtual filesystem unit 38 cancels creation of a virtual package and reverts back to the original BD-ROM, information that reflects this state is retained in the merge management information file. In this case, the corresponding cell in the merge-target directory of the merge management information file is either left blank or inscribed with a character string indicating the original BD-ROM.

Retaining (a history of) previous merge management information in the merge management information file is enabled by not overwriting old merge management information when updating is performed, and then if the user wants an old version of a virtual package, the old version can be created with reference to previous merge management information. Furthermore, virtual packages previously created by the user can be created with reference to the merge management information file (or rather the old merge management information stored therein) from not only a Java application but also from a resident application in the playback apparatus.

Another example of the use of previous merge management information by a resident application involves displaying an additional contents list so that the user can delete unwanted additional contents from the resident application. Since the merge management information file can be used to distinguish directories storing additional contents, additional contents can also be retrieved and deleted from an application (i.e. a resident application) other than the Java application that stored the additional contents.

Figure 36:
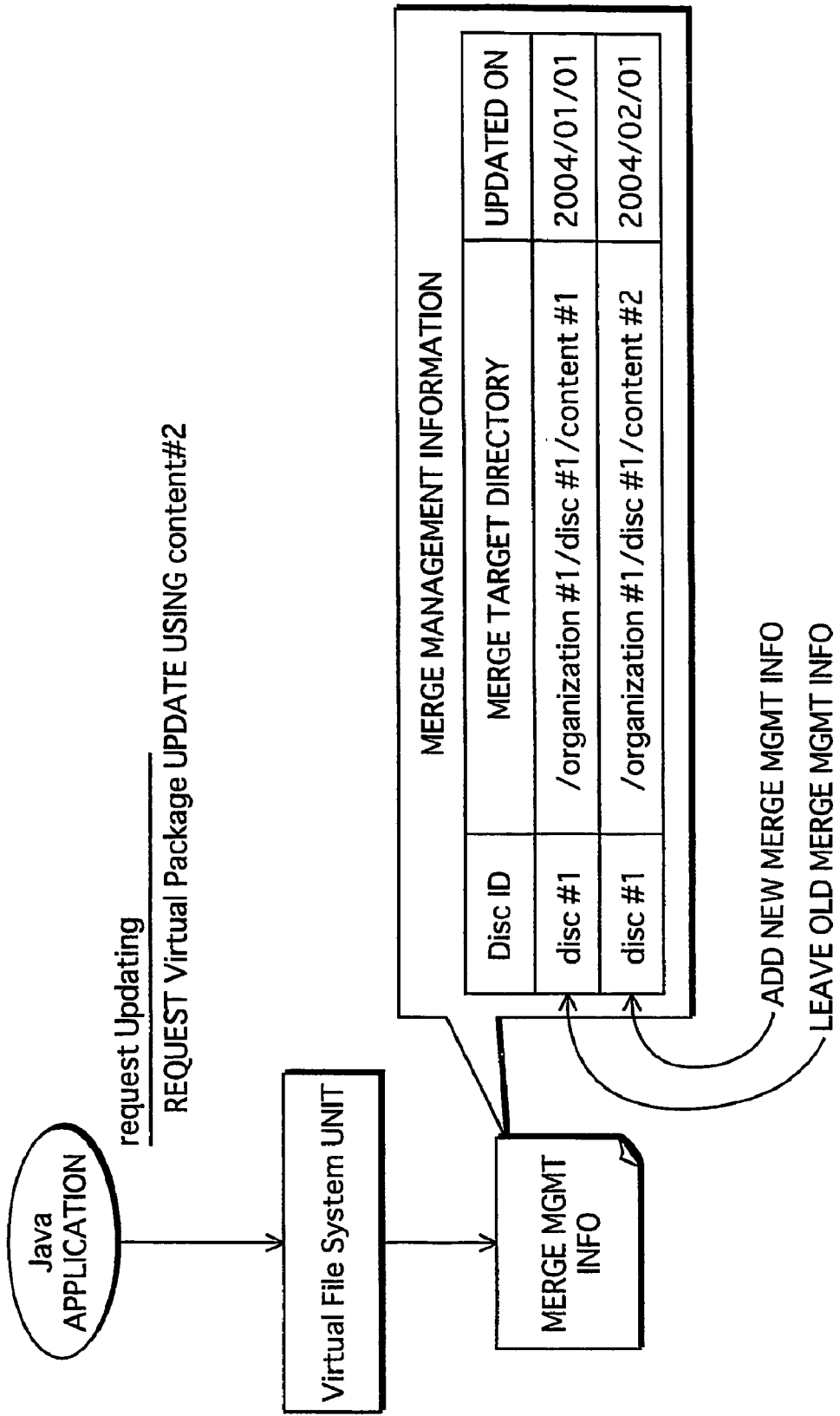
FIG. 36 shows a Java application pertaining to embodiment 3 requesting the update of a virtual package.

FIG. 36 shows a Java application pertaining to the present embodiment requesting a virtual package update. A difference with embodiment 1 lies in the fact that merge management information is continually added without overwriting the old information even when merge management information for the targeted disc ID already exists. The Java application allows the latest piece of merge management information in the merge management information file to be identified by appending date information when a virtual package update is requested. Date information is not limited to being a date, and may simply be a consecutive number.

Figure 37:
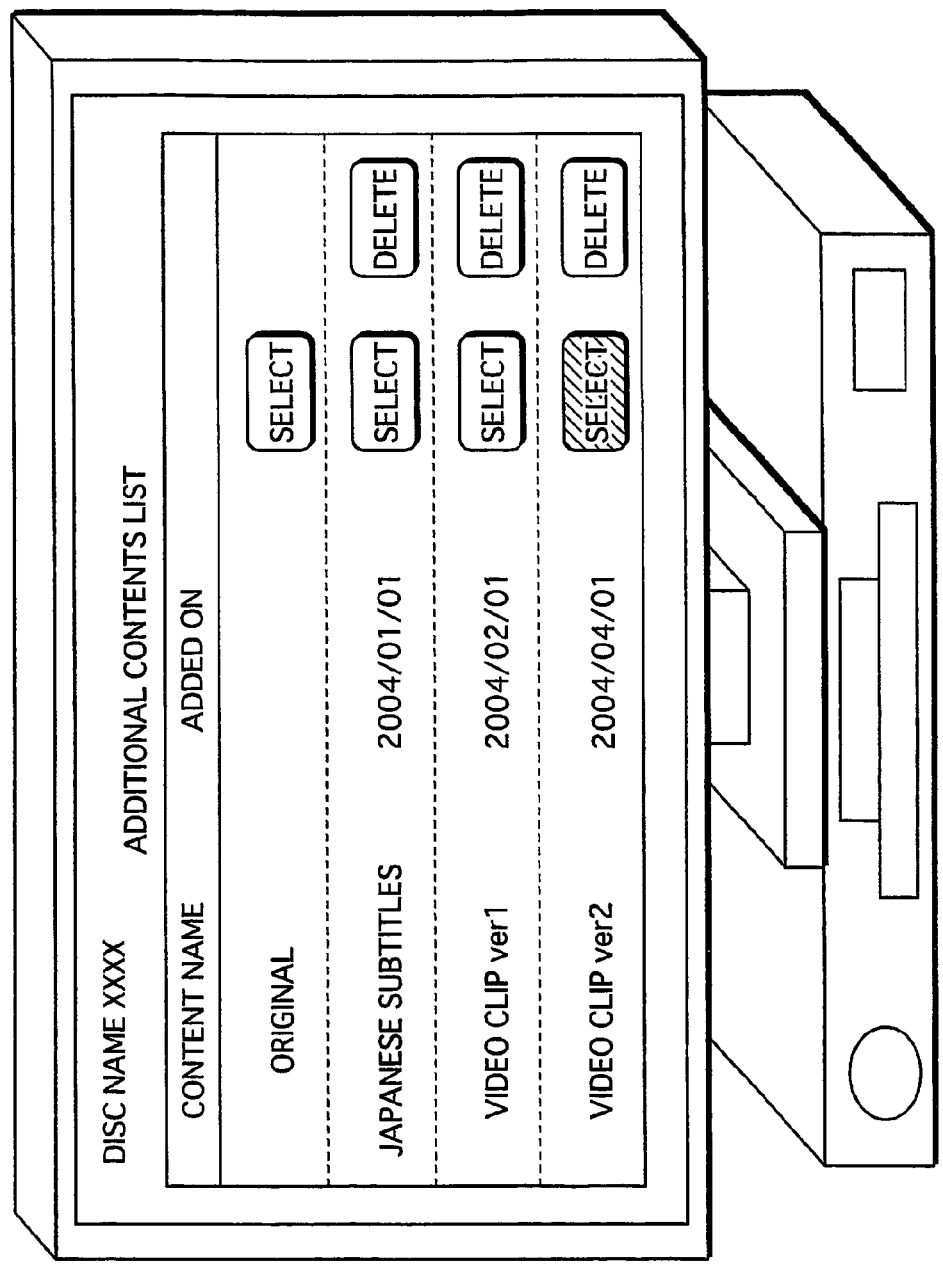
FIG. 37 shows an exemplary additional contents list displayed to the user by a resident application using a merge management information file.

FIG. 37 shows an exemplary additional contents list displayed to the user by a resident application using a merge management information file. Here, the displayed additional contents list is based on the merge management information file shown in FIG. 35. It is desirable to display information that enables the user to grasp what the additional contents relate to. The additional contents in FIG. 37 are displayed as content names. While only date information is added to the merge management information in FIG. 36, synopses of the additional contents may also be added, since resident applications are able to perform such display. In this case, synopses of the additional contents are provided for input together with content IDs when the Java application requests a virtual package update. These synopses may specify file paths to files containing respective synopses, rather than simply involving the direct input of character strings. The merge management information thus stores content synopses in addition to update dates, and a resident application is able to display these synopses in the additional contents list together with the date information.

Rather than having the Java application specify content synopses, meta-information showing what specific contents are about may be appended to the contents themselves, and a resident application may read this information and display synopses based on the read information.

The "ADDED ON" column in FIG. 37 shows the dates on which respective additional contents were first merged with the BD-ROM. This information may also be read from the merge management information.

Note that the dates on which additional contents were first merged may be held separately to the merge management information. These dates may also be determined from the dates on which directories for storing the additional contents were created. When one of the select buttons displayed in the additional contents list is depressed, the resident application writes the directory path/disc ID of the selected content and the selection date to the merge management information file as corresponding merge management information. In other words, the additional content most recently selected becomes the latest merge management information. If the original BD-ROM is selected, either a value indicating the original BD-ROM or a blank cell is inserted in the merge-target directory of the merge management information file. When one of the delete buttons displayed in the additional contents list is depressed, the resident application reads the directory of the additional content for deletion with reference to the merge management information file, and deletes this directory. Merge management information corresponding to the content ID of this content is also deleted from the merge management information file.

Figure 38:
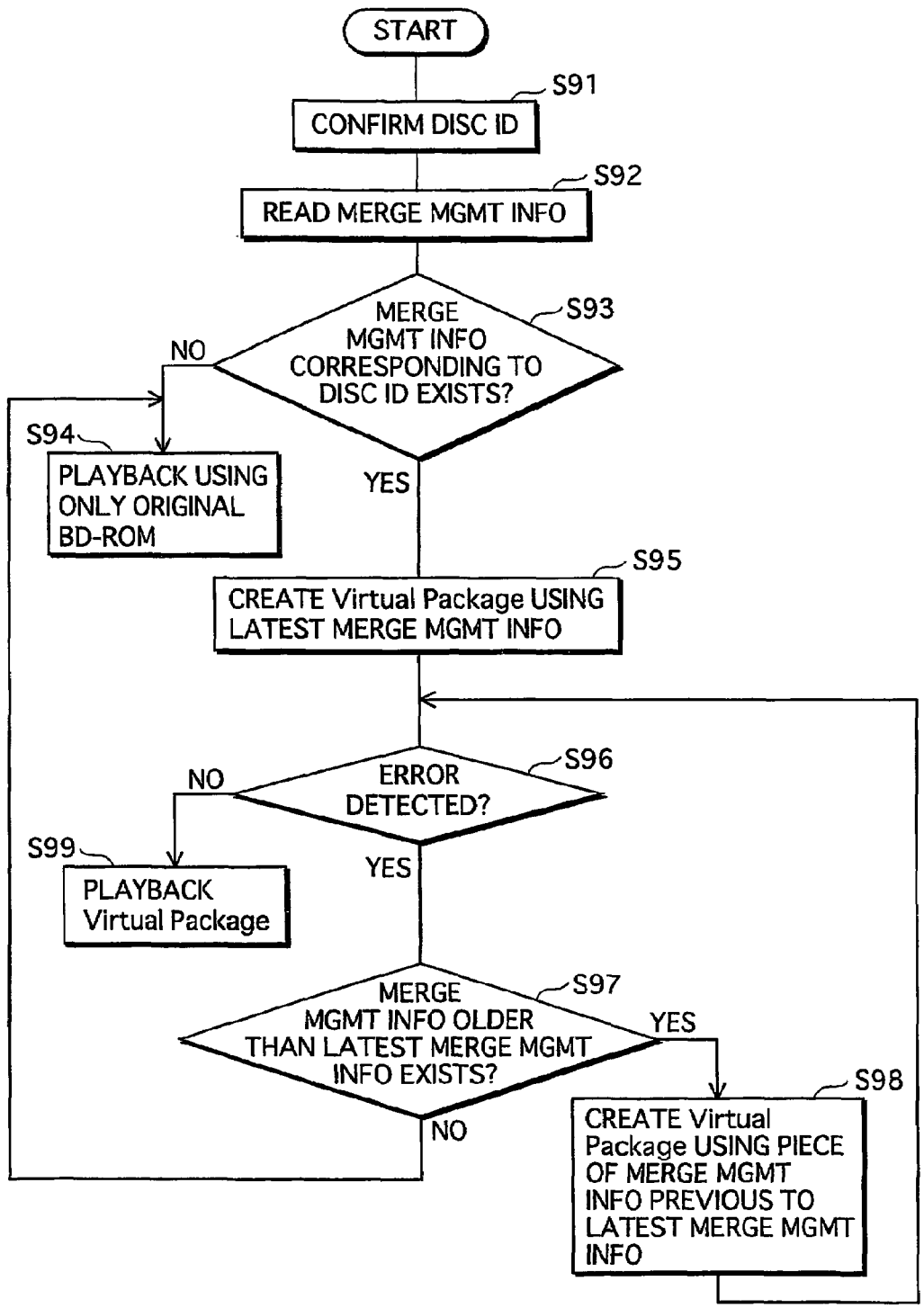
FIG. 38 is a flowchart of the processing flow pertaining to embodiment 3 from the loading of a BD-ROM until playback.

FIG. 38 is a flowchart of the processing flow pertaining to the present embodiment from the loading of a BD-ROM until playback. Virtual filesystem unit 38 firstly checks the disc ID of the loaded BD-ROM (step S91), reads the merge management information file (step S92), and judges whether there exists merge management information corresponding to the disc ID of the loaded BD-ROM (step S93). If judged in the negative (step S93=NO), playback: is performed using only the original BD-ROM (step S94). If judged in the affirmative (step S93=YES), a virtual package as created using the latest merge management information (step S95). During creation of a virtual package, virtual filesystem unit 38 judges whether an error has been detected (step S96). If judged in the affirmative (step S96=YES), virtual filesystem unit 38 judges whether there exists prior merge management information that corresponds to the disc ID of the BD-ROM (step S97). If judged in the affirmative (step S97=YES), a virtual package is created using the version of merge management information preceding the latest merge management information (step S98). If judged in the negative (step S97=NO), playback is performed using only the original BD-ROM (step S94). If an error is not detected at step S96, playback is performed using the created virtual package (step S99). Exemplary errors include mistakes in the latest merge management information and the non-existence of streams referenced from a playlist etc.

According to the present embodiment, virtual packages can be created from a resident application in the playback apparatus using old versions of merge management information with reference to the content history of the merge management information file, by holding previous merge management information in the merge management information file. If an error occurs during the creation of a virtual package, the problem can be avoided by creating an old version of a virtual package as an alternative course of action.

Embodiment 4

The present embodiment relates to a method for specifying the valid period of a virtual package when a virtual package update is requested by a Java application, and using the virtual package to perform playback only within the valid period.

Figure 39:
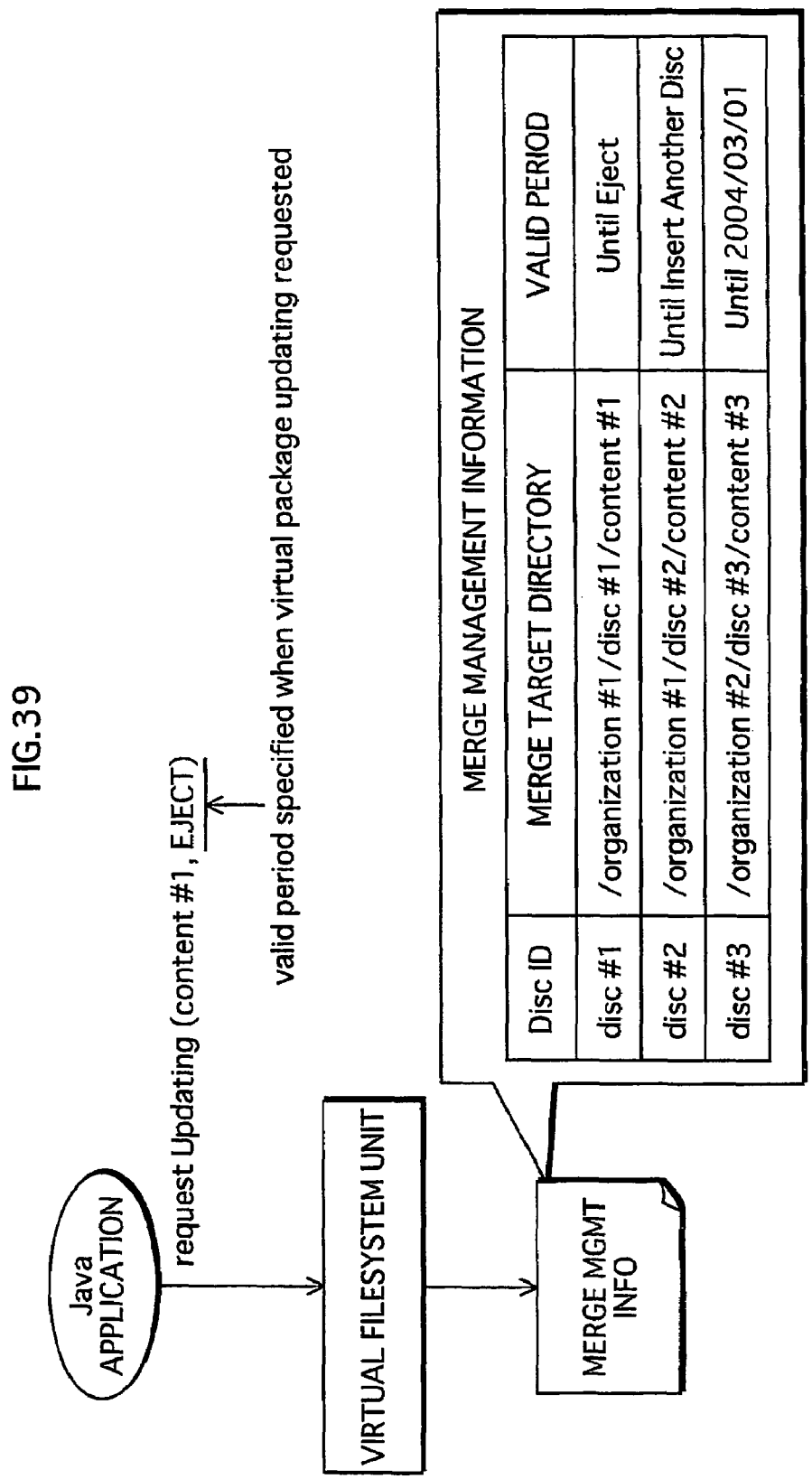
FIG. 39 shows a valid interval being specified when a virtual package update is requested.

FIG. 39 shows a valid interval being specified when a virtual package update is requested. The Java application specifies both the content ID of an additional content for merging and a valid period for use of the virtual package. For example, if the user wants to play contents as a virtual package until the disc is ejected and then play contents using only the original BD-ROM after reloading the disc, a value indicating that the virtual package is valid until the disc is ejected is specified in an argument when a virtual package update is requested from the Java application.

Figure 40:
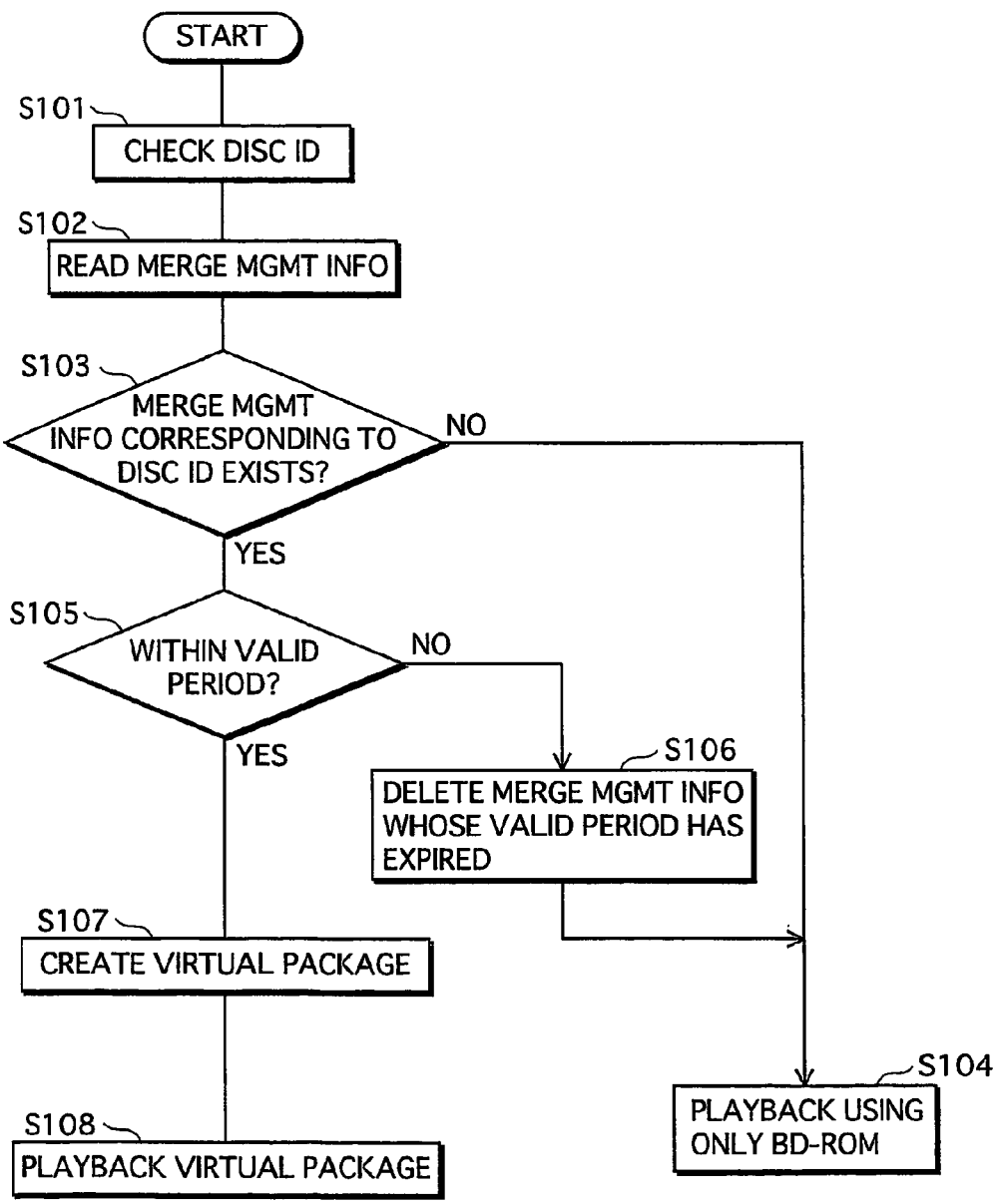
FIG. 40 is a flowchart of the processing flow pertaining to an embodiment 4 from the loading of a BD-ROM (or rebooting of the playback apparatus) until playback.

FIG. 40 is a flowchart of the processing flow pertaining to the present embodiment from the loading of a BD-ROM (or rebooting of the playback apparatus) until playback. Virtual filesystem unit 38 firstly checks the disc ID of the loaded BD-ROM (step S101), reads the merge management information file (step S102), and judges whether there exists merge management information corresponding to the disc ID of the loaded BD-ROM (step S103). If judged in the negative (step S103=NO), playback is performed using only the original BD-ROM (step S104). If judged in the affirmative (step S103=YES), virtual filesystem unit 38 judges whether the corresponding merge management information is within the valid period (step S105). If no longer valid, the corresponding merge management information is deleted (step S106), and playback is performed using only the original BD-ROM (step S104). If still valid, the corresponding merge management information is used to create a virtual package (step S107), and playback is performed using the virtual package (step S108).

Note that a pattern in which Java mode only virtual packages are created is also conceivable as an application of the present embodiment. If Java mode only is specified when virtual package creation is requested from a Java application, virtual filesystem unit 38 creates a virtual package when there is a transition from DVD-like mode to Java mode, and then shifts to Java mode. Conversely, when there is a transition from Java mode to DVD-like mode, virtual filesystem unit 38 shifts to DVD-like mode after canceling the virtual package and reverting back to the original BD-ROM.

According to the present embodiment, it is possible to specify a valid period for playback using a virtual package, thereby enabling playback using once-only virtual packages (i.e. virtual packages that are disabled once the BD-ROM is ejected), and creation of virtual packages with use period limitations.

Note that while in the present embodiment a valid period is specified when a virtual package update is requested, a valid period may also be specified when virtual package creation is requested after loading a BD-ROM.

Embodiment 5

The following is a detailed description regarding the authority of the calling application at step S23 in FIG. 25 of embodiment 1. Specifically, the present embodiment relates to a method of denying virtual package update requests from unauthorized Java applications.

Figure 41:
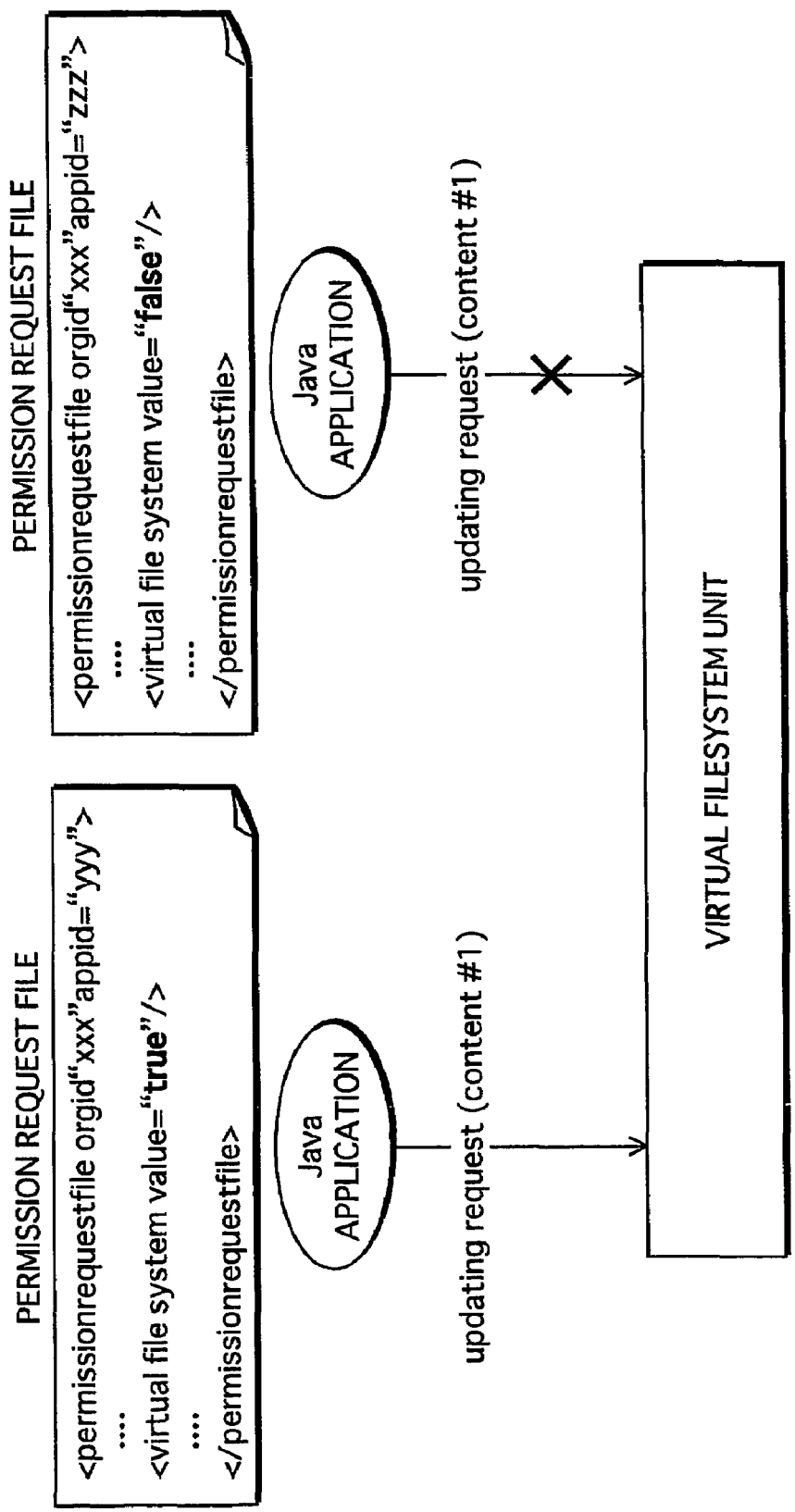
FIG. 41 shows permission request files being used to screen virtual package update requests.

FIG. 41 shows permission request files being used to screen virtual package update requests. As described above, a virtual package update is performed on the basis of update requests from Java applications. However, when updating is performed on the basis of a request from an unauthorized Java application, there is a danger of the content of the disc being illegally updated in terms of viewing restrictions being changed or the playback of video clips that can only be viewed under certain conditions being enabled. In view of this, a virtual package update according to the present embodiment can only be requested from Java applications that hold updating permission, which is information showing that permission to request updating has been granted. Whether or not updating permission is held is judged by checking the content of a permission request file corresponding to a Java application that issues a request. Specifically, a class loader restricts the functions of Java applications in accordance with the content of respective permission request files. For example, an update request is processed if an update attribute value in the permission request file is "true" but denied if "false".

Figure 42:
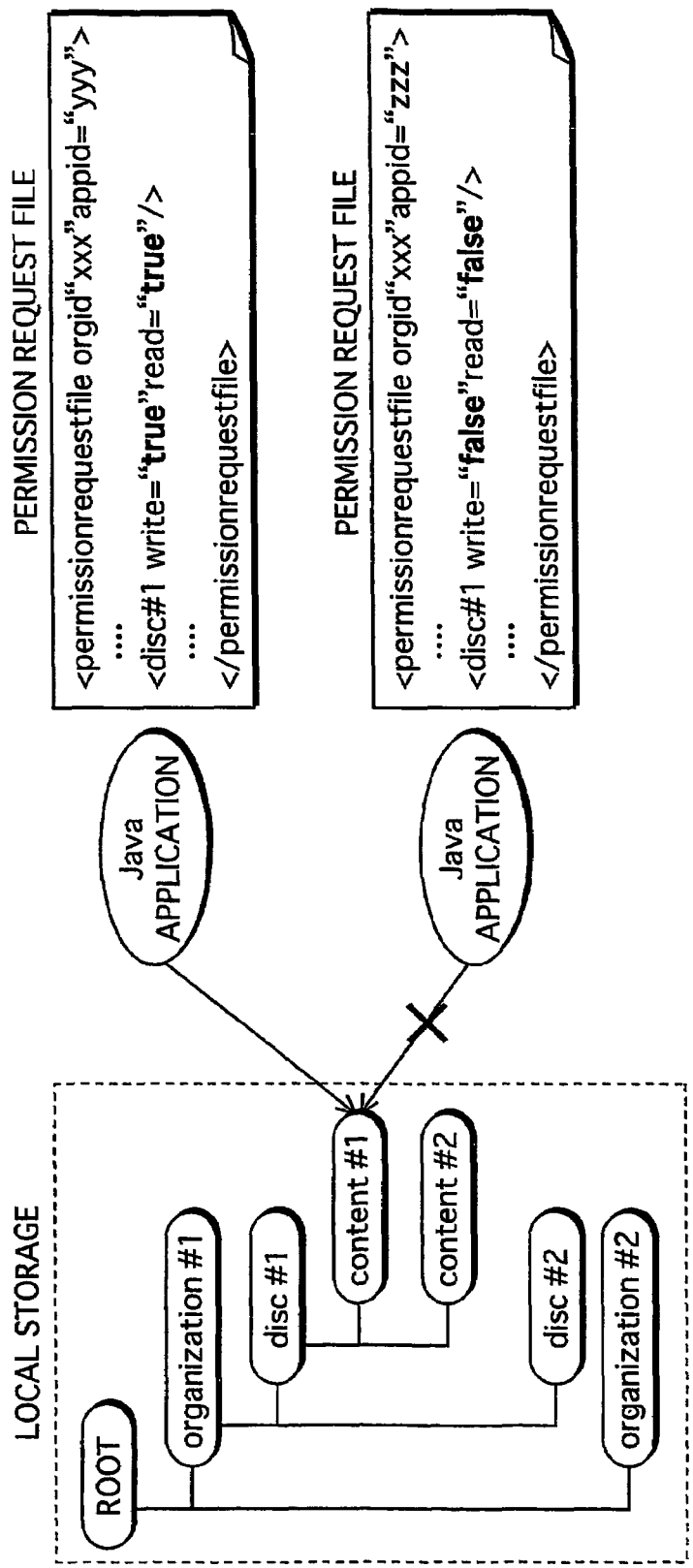
FIG. 42 shows access restrictions imposed on a directory in local storage targeted for merging.

FIG. 42 shows access restrictions imposed on a directory in local storage targeted for merging. If the content of a directory targeted for merging is altered by an unauthorized Java application, there is a danger of the content of the virtual package being illegally changed despite update requests being screened. In view of this, permission to access local storage is also restricted on the basis of the content of respective permission request files. For example, if both the read and write attribute values in a permission request file are "true", downloaded contents can be written and stored files can be read and edited. File access restrictions will be imposed, however, on Java applications with a permission request file in which either or both of the read and write attribute values are "false", or Java applications without a permission request file.

According to the present embodiment, unauthorized Java applications can be prevented from having virtual packages updated and changing the content of directories in local storage.

The following is a specific example of the use of permission request files to restrict virtual package updating. Consider an example in which directories are allocated in local storage to specific providers of movie works. Specifically, assume that contents provided by A Studios, B Studios and C Inc. are stored both in local storage and on BD-ROM. Here, C Inc. is the provider of digital magazines. It would be problematic when merging contents in local storage with BD-ROM if, for instance, contents provided by B Studios were merged with contents provided by A Studios In view of this, updating permission is only granted to C Inc. (i.e. update attribute value in permission request file set to "true"), thereby enabling various services to be made available. A Studios and B Studios are only able to merge their own contents.

Embodiment 6

The present embodiment relates to a method for updating a virtual package during a title change in the case of Java applications that operate across a plurality of titles.

Figure 43:
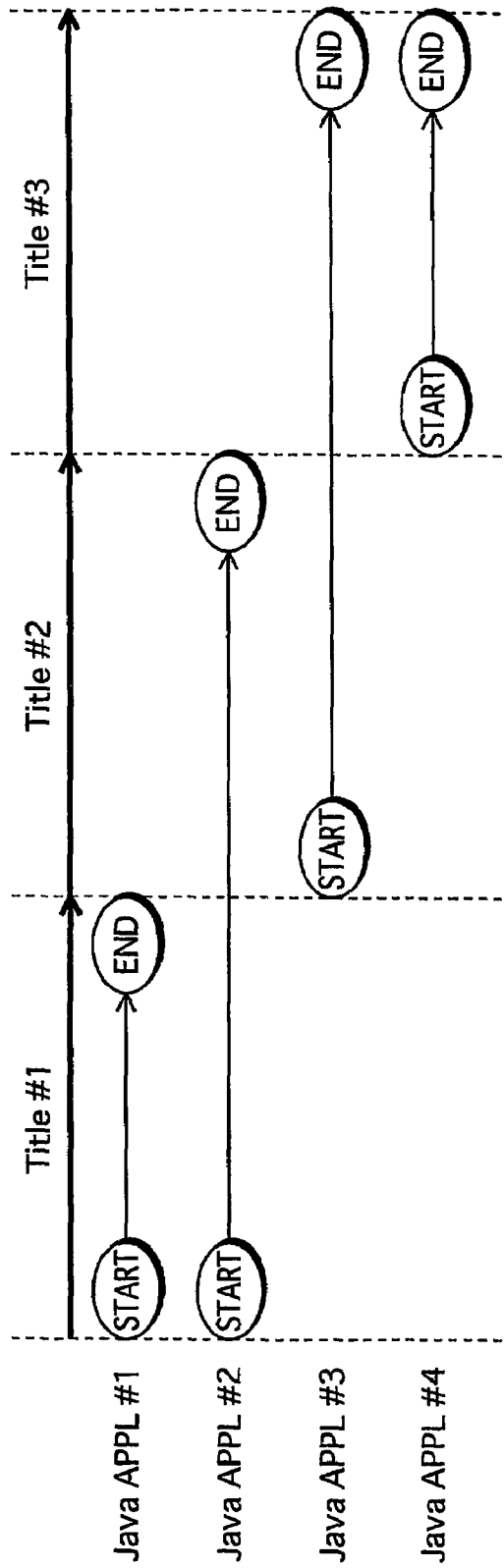
FIG. 43 shows both Java applications whose lifecycle is limited to a single title and Java applications whose lifecycle extends over a plurality of titles.

FIG. 43 shows both Java applications whose lifecycle is limited to a single title and Java applications whose lifecycle spans a plurality of titles. The life cycles of Java applications are shown in application management information, and module manager 33 manages the start and end of Java applications in accordance with this application management information. Java applications includes those that can only exist within the title in which they were started (hereinafter "title-bound applications") and those that can exist over a plurality of titles (hereinafter "title-unbound applications"). The application management information contains title numbers, application IDs and information showing whether particular Java application are bound or unbound.

In the application management information shown in FIG. 43, for example, Java application#1 is bound and Java application#2 is unbound in title#1. Module manager 33 terminates bound Java application#1 together with the end of title#1. On the other hand, unbound Java application#2 is allowed to live past the end of title#1, with the decision of whether or not to terminate this application being made according to the application management information of the next title. Since the application management information in the FIG. 43 example shows that Java application#2 can exist in both title#1 and title#2, this application is allowed to live through the transition from title#1 to title#2. Because Java application#2 is title-bound in title#2, however, module manager 33 terminates the application together with the end of this title.

Figure 44:
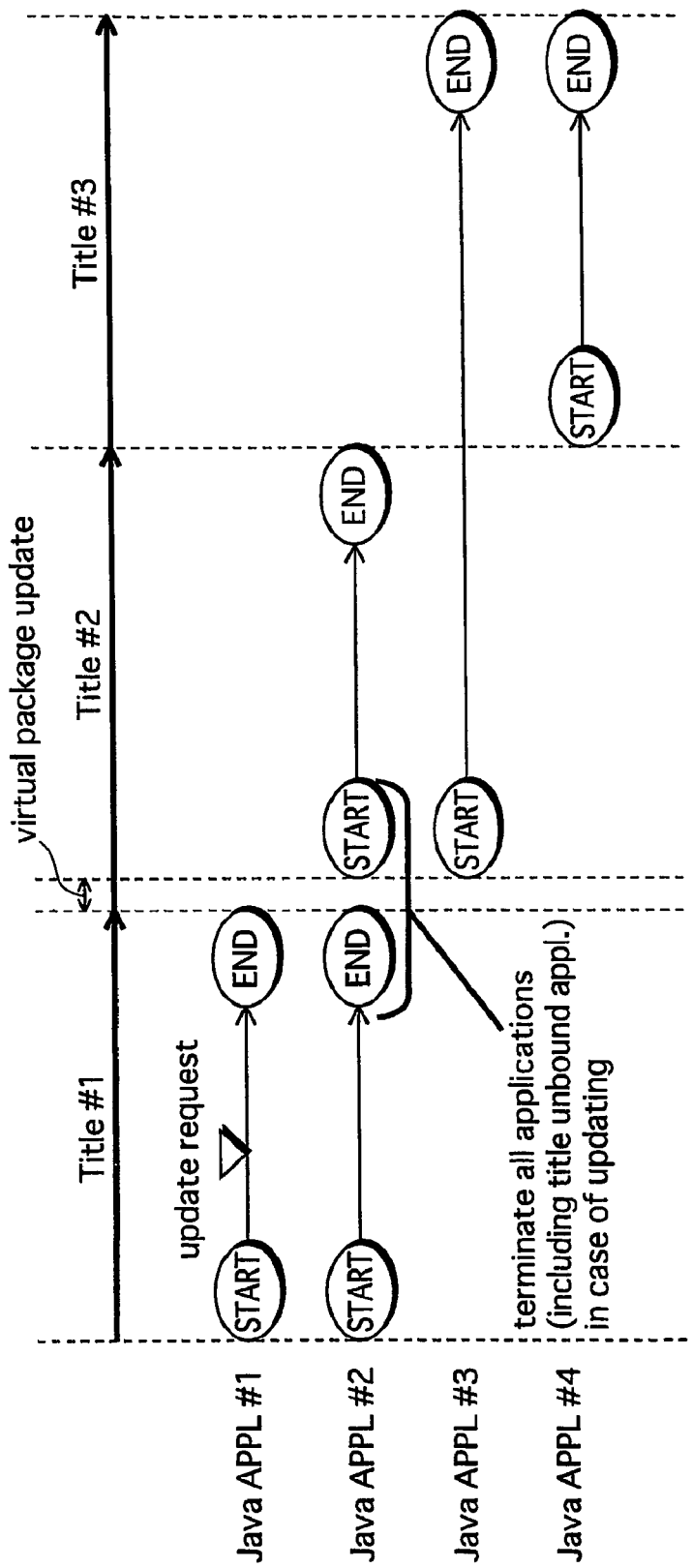
FIG. 44 shows processing performed on a title-unbound application when a virtual package is updated during a title change.

FIG. 44 shows processing performed on a title-unbound application when a virtual package is updated during a title change. As shown in FIG. 43, title-unbound applications that can exist in both the title before and the title after a title change continue operating through the title change. However, if a virtual package update is requested, all applications including title-unbound applications are terminated during a title change. After the virtual package has been updated, title-unbound applications are then restarted together with title-bound applications belonging to the next title.

Figure 45:
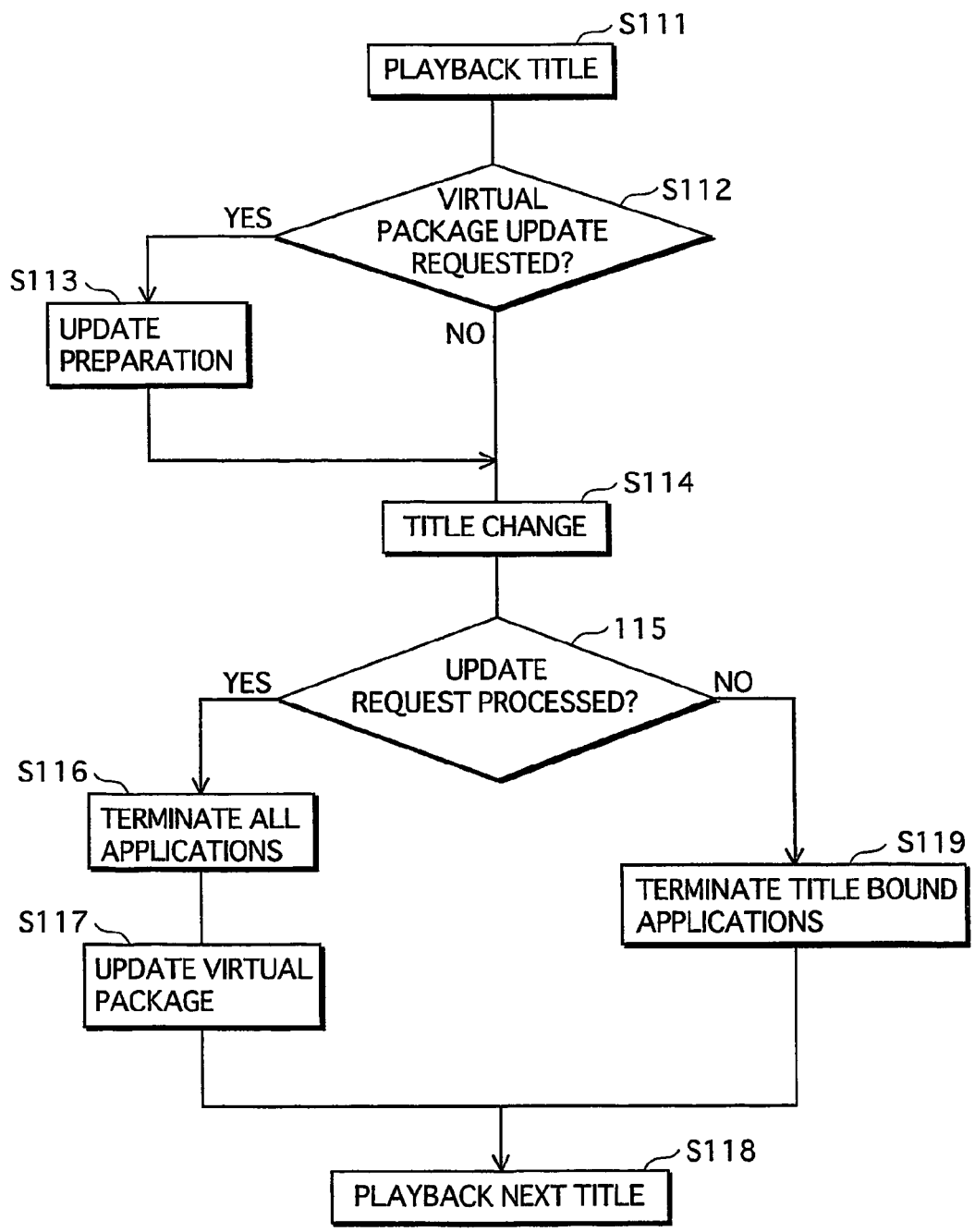
FIG. 45 is a flowchart of title change processing that takes title-unbound applications into consideration.

FIG. 45 is a flowchart of title change processing that takes title-unbound applications into consideration. When title playback is started (step S111), virtual filesystem unit 38 firstly judges whether a virtual package update has been requested from a Java application during current title playback (step S112). If judged in the affirmative (step S112=YES), virtual filesystem unit 38 performs update preparation (step S113). When a title change occurs (step S114), virtual filesystem unit 38 judges whether the update request has been processed (step S115). If judged in the affirmative (step S115=YES), all applications including title-unbound applications are terminated (step S116), and the virtual package is updated (step S117). The next title is then played after the title change (step S118). If a virtual package update has not been requested at step S112 or if an update request has not been processed at S115, module manager 33 terminates only title-bound application when a title change occurs (step S119).

Since the present embodiment ensures that all applications are terminated during the updating of virtual packages, it is possible to prevent any loss of consistency after the completion of virtual package updating in terms of references to old pre-update files remaining or new files existing along side old files still in cache.

Note that if a Java application capable of existing over a plurality of discs ("disc-unbound application") is operating when a title change occurs after virtual package updating has been requested, the disc-unbound application can continue operating without being forcibly terminated by treating the virtual package update in the same manner as a disc changing operation.

Note also that module manager 33 may manage the start and end of a title-unbound application after a title change has occurred, in accordance with application management information updated after the completion of virtual package updating, without terminating the title-unbound application during the update. In this case, the title-unbound application is made to reference the pre-update virtual package until the updating is completed.

Embodiment 7

The present embodiment relates to virtual package updating following a change in an INDEX.BDMV file. Upon receiving a virtual package update request from a Java application, virtual filesystem unit 38 confirms that an INDEX.BDMV file exists in the directory targeted for merging. If an INDEX.BDMV file exists, virtual filesystem unit 38 reads the INDEX.BDMV file in preparation for the updating. The existing INDEX.BDMV file is then invalidated and a new INDEX.BDMV file is validated. This new INDEX.BDMV file is then used prior to a title change if, for example, a resident application of the BD player performs a title search or a Java application acquires title information. In other words, informing Java applications and users beforehand of the post-updating title structure makes it possible to prevent title changes to titles that will cease to exist after the update or title changes to unexpected titles.

Figure 46:
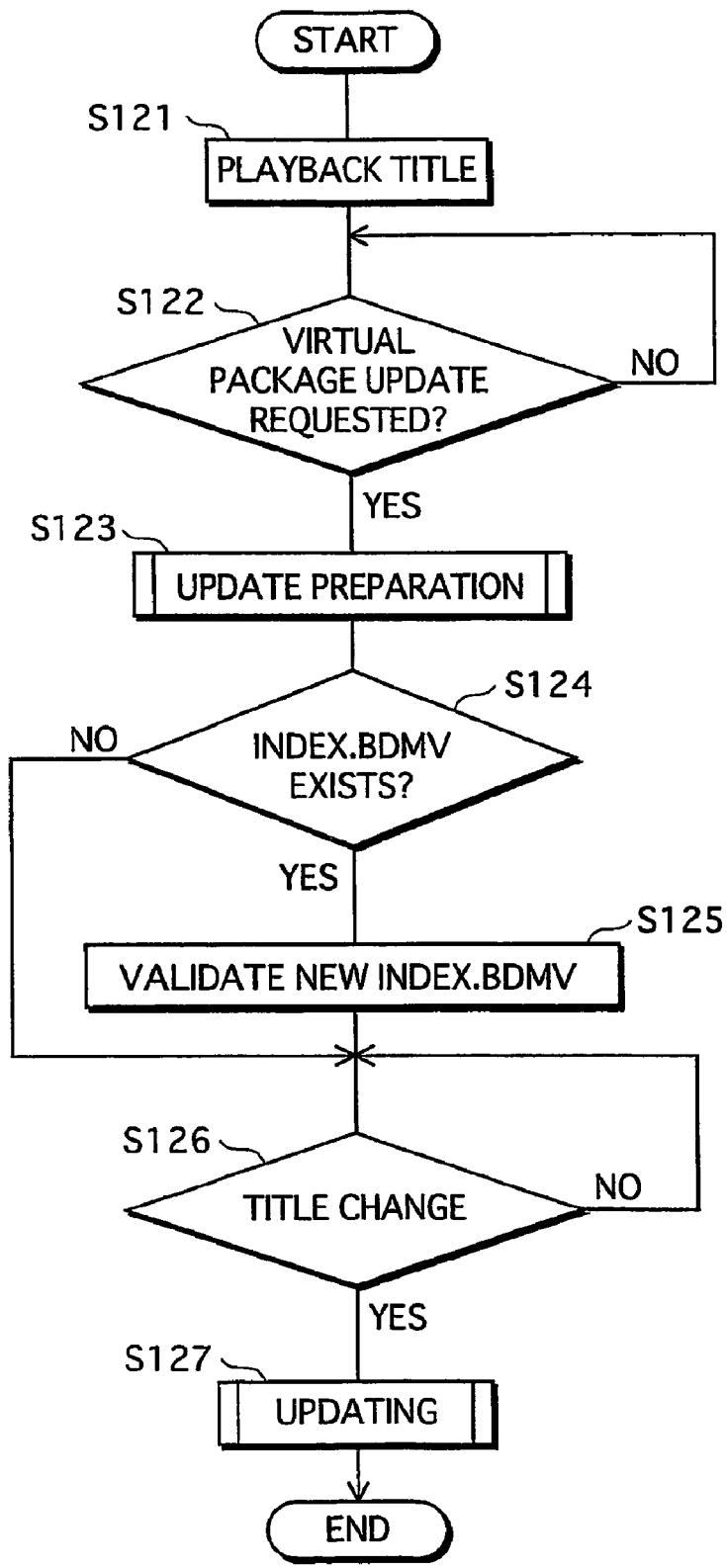
FIG. 46 is a flowchart of virtual package updating following a change in an INDEX.BDMV file.

FIG. 46 is a flowchart of virtual package updating following a change in an INDEX.BDMV file. Firstly, when a title in Java mode is played (step S121), virtual filesystem unit 38 judges whether a Java application has requested a virtual package update (step S122), and if there has been a request, virtual filesystem unit 38 receives the request and performs update preparation (step S123). At the same time as checking whether the file and directory structure are correct, virtual filesystem unit 38 judges whether an INDEX.BDMV file exists (step S124). If an INDEX.BDMV file exists, virtual filesystem unit 38 invalidates the existing INDEX.BDMV file and validates a new INDEX.BDMV file (step S125), before judging whether a title call has occurred (step S126). A title change from a resident application in the BD player or from a Java application is performed with reference to the new INDEX.BDMV file validated in step S125. Virtual filesystem unit 38 performs the updating when a title change occurs (step S127).

Thus, while virtual package updating is not performed until a title change occurs after an update request, the new INDEX.BDMV file is made available prior to the title change. This means that after an update request, the title list displayed during a title search will have changed prior to a title change occurring.

Since the user then selects titles based on the altered title list, errors resulting from the selection of a title that will cease to exist after updating can be prevented. The virtual package can thus be updated without a problem during a title change even if the title structure is altered due to the updating.

Note that virtual package updating following a change in an INDEX.BDMV file may be performed when the BD player is rebooted.

Variations

A playback apparatus pertaining to the present invention is described above based on the preferred embodiments, although the present invention is of course not limited to these embodiments.

The above embodiments are described in relation to a playback apparatus whose only function is to play recording media, although the present invention is not limited to this. For example, the present invention may be a recording/playback apparatus with recording and playback functions.

Files can be placed in local storage using any kind of structure, provided that the correspondence with files on BD-ROM targeted for merging is clearly shown.

In the above embodiments, Java (registered trademark) is used as the programming language of the virtual machine, although programming languages other than Java may be used, examples of which include Perl Script, ECMA Script and B-Shell, which is used with UNIX (registered trademark) operating systems and the like.

The above embodiments are described in relation to a playback apparatus that plays BD-ROM, although of course the same effects as above are achieved in the case of requisite data on BD-ROM as described in the above embodiments being recorded on a writable optical recording medium.

Furthermore, the same effects as above are of course achieved in the case of requisite data on BD-ROM as described in the above embodiments being recorded on a portable recording medium other than an optical recording medium (e.g. SD card, compact flash etc).

INDUSTRIAL APPLICABILITY

A playback apparatus constituting the present invention can be administratively, as well as continuously and repeatedly manufactured and retailed in manufacturing industries. This playback apparatus is particularly applicable in movie and consumer appliance industries that pertain to the production of video contents.

The invention claimed is:

1. A playback apparatus for playing a digital stream in conjunction with an application executing in the playback apparatus, comprising:
   a package manager operable to generate package information by merging a first file recorded on a first recording medium and a second file recorded on a second recording medium, in accordance with merge management information recorded on the second recording medium, the merge management information indicating the second file on the second recording medium for merging with the first file on the first recording medium;
   a selector operable to detect a plurality of titles from the package information and to select one of the detected titles as a current title;
   an application executor operable to execute an application associated with the current title, the application being operable to request the package manager to generate new package information using new merge management information, the new merge management information referencing a third file on the second recording medium for merging with the first file on the first recording medium; and
   a playback controller operable to control playback of the digital stream associated with the current title, wherein
   the package manager sets the third file to read-only when the application requests generation of the new package information, and
   the package manager generates the new package information when the digital stream playback stops due to a change of the current title.

2. A playback method employed by a playback apparatus for playing a digital stream in conjunction with an application executing in the playback apparatus, comprising:
   generating, with a package manager provided in the playback apparatus, package information by merging a first file recorded on a first recording medium and a second file recorded on a second recording medium, in accordance with merge management information recorded on the second recording medium, the merge management information indicating the second file on the second recording medium for merging with the first file on the first recording medium;
   detecting, with a selector provided in the playback apparatus, a plurality of titles from the package information and selecting one of the detected titles as a current title;
   executing, with an application executor provided in the playback apparatus, an application associated with the current title, the application being operable to request the package manager to generate new package information using new merge management information, the new merge management information referencing a third file on the second recording medium for merging with the first file on the first recording medium; and
   controlling, with a playback controller provided in the playback apparatus, playback of the digital stream associated with the current title, wherein
   the third file is set, by the package manager, to read-only when the application requests generation of the new package information, and
   the new package information is generated, by the package manager, when the digital stream playback stops due to a change of the current title.

3. A program recording medium embodying a playback program that causes a playback apparatus to play a digital stream in conjunction with an application executing in the playback apparatus, the playback program comprising program code segments that cause the playback apparatus to execute:
   generating package information by merging a first file recorded on a first recording medium and a second file recorded on a second recording medium, in accordance with merge management information recorded on the second recording medium, the merge management information indicating the second file on the second recording medium for merging with the first file on the first recording medium;

detecting a plurality of titles from the package information and selecting one of the detected titles as a current title;

executing an application associated with the current title, the application being operable to request the package manager to generate new package information using new merge management information, the new merge management information referencing a third file on the second recording medium for merging with the first file on the first recording medium; and controlling playback of the digital stream associated with the current title, wherein the third file is set to read-only when the application requests generation of the new package information, and the new package information is generated when the digital stream playback stops due to a change of the current title.

* * * * *